(12) United States Patent
Miyamoto et al.

(10) Patent No.: US 6,515,790 B2
(45) Date of Patent: Feb. 4, 2003

(54) REVERSIBLE IMAGE DISPLAY MEDIUM AND IMAGE DISPLAY METHOD

(75) Inventors: Hidetoshi Miyamoto, Takatsuki (JP); Keyaki Yogome, Kyoto (JP); Masahiko Matsuura, Suita (JP); Hiroshi Mizuno, Ikoma (JP); Takaji Kurita, Osakasayama (JP)

(73) Assignee: Minolta Co., Ltd., Osaka (JP)

( * ) Notice: Subject to any disclaimer, the term of this patent is extended or adjusted under 35 U.S.C. 154(b) by 127 days.

(21) Appl. No.: 09/770,648

(22) Filed: Jan. 29, 2001

(65) Prior Publication Data

US 2002/0024620 A1 Feb. 28, 2002

(30) Foreign Application Priority Data

| Jan. 28, 2000 | (JP) | 2000-020047 |
| Jan. 28, 2000 | (JP) | 2000-020807 |
| Jan. 31, 2000 | (JP) | 2000-021274 |
| Jan. 31, 2000 | (JP) | 2000-021482 |
| Jan. 31, 2000 | (JP) | 2000-022933 |
| Dec. 7, 2000 | (JP) | 2000-372845 |

(51) Int. Cl.$^7$ .......................................... G02B 26/00
(52) U.S. Cl. ................................. 359/296; 345/107
(58) Field of Search ............................. 359/296, 237, 359/290; 345/107, 84; 347/112, 111

(56) References Cited

U.S. PATENT DOCUMENTS 4,297,866 A   11/1981  Sakauye et al. ............. 72/186
5,239,735 A   8/1993   Tamaka et al. ............... 29/6.1
6,407,763 B1 * 6/2002  Yamaguchi et al. ......... 345/107

FOREIGN PATENT DOCUMENTS

EP          0150913 A2     8/1985

OTHER PUBLICATIONS

Gugrae–Jo et al., "Image Display Using Conductive Toner and Charge Transport Layer", Japan Hardcopy '99, The Thesis Book of The Annual Conference of the Imaging Society of Japan, Jul. 21–23, 1999, pp. 249–252.

* cited by examiner

Primary Examiner—Hung Xuan Dang
(74) Attorney, Agent, or Firm—McDermott, Will & Emery

(57) ABSTRACT

A reversible image display medium including two sheets; one or more developer accommodating cells formed between the two sheets, and each having a periphery surrounded by a partition wall; and dry developer contained in each of the cell(s), wherein the dry developer contains at least two kinds of frictionally chargeable dry developer particles having different chargeable polarities and different optical reflection densities. The image is displayed by forming a predetermined electrostatic field for each pixel in accordance with the image to be displayed and thereby moving the developer particles in a frictionally charged state. The image formed on the reversible image display medium can be erased, e.g., by an image erasing device.

24 Claims, 22 Drawing Sheets

REVERSIBLE IMAGE DISPLAY MEDIUM AND IMAGE DISPLAY METHOD

The invention is based on patent application Nos. 2000-20047 Pat., 2000-20807 Pat., 2000-21274 Pat., 2000-21482 Pat., 2000-22933 Pat. and 2000-372845 Pat. filed in Japan, the contents of which are hereby incorporated by reference.

BACKGROUND OF THE INVENTION

1. Field of the Invention

The present invention relates to an image display medium and an image display method, and particularly relates to a reversible image display medium, in which image displaying and image erasing operations can be repeated, and an image display method utilizing the medium.

2. Description of the Background Art

At present, image display is performed, e.g., in the following manners. A person uses a pencil, a pen, paints or the like, and manually writes or draws characters, pictures or the like on an image display medium such as paper sheet. Also, a computer, a word processor or the like is used to display text, graphics or the like on a display such as a CRT display, or output them on a medium such as a paper sheet via a printer for display.

A copying machine or the like may be used for producing duplication, on a medium of paper or the like, of the texts, pictures, graphics or the like, which are produced on the medium of paper or the like by a person or by a printer. A facsimile machine may be used for sending such contents (texts, pictures graphics and others) prepared in the above manner for producing duplication on another medium of paper or the like.

The above image display, which is performed to display the texts, pictures or the like on the image display medium of paper or the like by a pencil, pen or the like, or by an image forming apparatus such as a printer, a copying machine or a facsimile machine operating in a electrophotographic method, an ink-jet method, a heat transfer method or the like, can achieve clear image display in a high resolution, and thus can achieve easy-on-the-eyes display.

However, it is impossible to repeat display and erasure of the images on the image display medium of paper or the like. In the case where the paper is used for writing characters or the like by a pencil, the characters can be erased by an eraser to a certain extent. However, it is difficult to erase completely the characters or the like written in an ordinary density, although it may be possible when written in a light density. The medium of paper or the like cannot be reused except for the case of using the rear surface of the medium, which is not yet used for the image display.

Accordingly, the medium of paper or the like bearing images will be abandoned or burnt when it is not longer required. This results in consumption of a large mount of resources. The printer, copying machine or the like also consume consumable products or materials such as toner or ink. For obtaining the new display medium of paper or the like as well as toner, ink or the like, energies and resources are required for producing them. This is contrary to the current demand for reduction in environmental loads.

In contrast to the above, the image display by a display such as a CRT display can repeat the image display and the image erasure. However, the resolution, clarity and precision of images are restricted, as compared with the images displayed by the printer or the like on the paper medium or the like. Due to the relatively low resolution and the light emission from the display, operations for a long time are likely to be hard to eyes.

Electrophoretic display has been proposed as an image display method allowing repetition of the image display and image erasure. In the electrophoretic display method, two substrates including at least one transparent substrate are opposed together with a spacer therebetween to form a closed space therebetween, and the space is filled with a display liquid formed of a dispersion medium and electrophoretic particles, which are dispersed in the dispersion medium and are different in color from the medium. The image display is performed by an application of an electrostatic field and in a color of the particles or a color of the dispersion medium.

The display liquid is usually formed of isoparaffin-contained dispersion medium, particles of titanium dioxide or the like, dyes applying contrast in color to the particles, and an additive such as a surface active agent, or a charge applying agent.

In the electrophoretic display, the display is performed by utilizing contrast between particles of a high refractive index (e.g., titanium dioxide particles) and colored insulating liquid, and therefore the particles cannot hide the colored liquid to a high extent, resulting in a low contrast. Further, settling and condensation of particles are liable to occur due to a very large difference in specific gravity between the particles and the dispersion medium in the display liquid. This is liable to lower the display contrast. Further, it is difficult to display the images with high stability for a long time, and remaining of last images is liable to occur. Further, the degree of charging of the particles in the liquid significantly changes with time, which also impairs the stability of the image display.

SUMMARY OF THE INVENTION

Accordingly, an object of the invention is to provide reversible image display medium and an image display method, which allow repeating of image display and image erasure, and thereby can reduce consumption of image display media of paper or the like relating to the conventional image display and consumable materials such as developer and ink so that a current demand for reduction in environmental loads can be satisfied.

Another object of the invention is to provide a reversible image display medium and an image display method, which allow display of images in good contrast and high quality.

Still another object of the invention is to provide a reversible image display medium and an image display method, which allow display of images in high resolution and high quality.

Yet another object of the invention is to provide a reversible image display medium and an image display method, which allow stable display of high-quality images for a long time.

Further another object of the invention is to provide a reversible image display medium and an image display method, which can suppress remaining of last images, and therefore can exhibit good reversibility so that images of good quality can be displayed.

A further another object of the invention is to provide a reversible image display medium and an image display method, which can reduce a drive voltage required for image display.

A further object of the invention is to provide a reversible image display medium and an image display method, which can suppress irregularities in displayed images.

The invention provides reversible (in other words, reusable) image display mediums and image display methods described below.

(1) First Reversible Image Display Medium and First Image Display Method (1-1) First Reversible Image Display Medium A reversible image display medium including:

two sheets opposed to each other with a predetermined gap therebetween;

one or more developer accommodating cells formed between the two sheets, and each having a periphery surrounded by a partition wall; and dry developer contained in each of the cell(s), wherein the dry developer contains at least two kinds of frictionally chargeable dry developer particles having different chargeable polarities and different optical reflection densities.

(1-2) First Image Display Method

An image display method including the steps of:

preparing the above first reversible image display medium having at least two kinds of the dry developer particles forming the dry developer within the developer accommodating cell(s), and frictionally charged to have the charged polarities different from each other; and displaying an image by forming a predetermined electrostatic field for each pixel in accordance with the image to be displayed and thereby moving the developer particles, with the developer particles contained in each of the cell(s) being in the frictionally charged state.

(2) Second Reversible Image Display Medium and Second Image Display Method (2-1) Second Reversible Image Display Medium A reversible image display medium including:

two sheets opposed to each other with a predetermined gap therebetween;

one or more developer accommodating cells formed between the two sheets, and each having a periphery surrounded by a partition wall;

dry developer contained in each of the cell(s);

an electrode formed on an inner surface of one of the sheets; and an electrode formed on an inner surface of the other sheet, and opposed to the electrode, wherein the dry developer contains at least two kinds of frictionally chargeable dry developer particles having different chargeable polarities and different optical reflection densities.

The electrode on the inner surface of one of the sheets may be formed of a group of independent electrodes formed for the respective pixels.

(2-2) Second Image Display Method

An image display method including the steps of:

preparing the above second reversible image display medium having at least two kinds of the dry developer particles forming the dry developer within the developer accommodating cell(s), and frictionally charged to have the charged polarities different from each other; and displaying an image by forming a predetermined electrostatic field for each pixel in accordance with the image to be displayed by applying a voltage across the electrodes and thereby moving the developer particles, with the developer particles contained in each of the cell(s) being in the frictionally charged state.

In the reversible image display medium used in this image display method, the electrode on the inner surface of one of the sheets may be formed of a group of independent electrodes formed for the respective pixels.

(3) Third to Fifth Reversible Image Display Mediums and Third Image Display Method (3-1) Third Reversible Image Display Medium A reversible image display medium including:

two sheets opposed to each other with a predetermined gap therebetween;

one or more developer accommodating cells formed between the two sheets, and each having a periphery surrounded by a partition wall; and dry developer contained in each of the cell(s), wherein the dry developer contains at least two kinds of frictionally chargeable dry developer particles having different chargeable polarities and different optical reflection densities, each of the sheets has a thickness from 5 $\mu$m to 100 $\mu$m, the gap between the sheets is in a range from 20 $\mu$m to 300 $\mu$m, and the medium has a whole thickness of 30 $\mu$m to 500 $\mu$m.

(3-2) Fourth Reversible Image Display Medium

A reversible image display medium including:

two sheets opposed to each other with a predetermined gap therebetween;

one or more developer accommodating cells formed between the two sheets, and each having a periphery surrounded by a partition wall; and dry developer contained in each of the cell(s), wherein the dry developer contains at least two kinds of frictionally chargeable dry developer particles having different chargeable polarities and different optical reflection densities, and at least one of the two sheets has a surface resistance of $10^{10}$ ohm/square–$10^{16}$ ohm/square ($10^{10}$ ohm/□–$10^{16}$ ohm/□) on its outer surface.

(3-3) Fifth Reversible Image Display Medium

A reversible image display medium including:

two sheets opposed to each other with a predetermined gap therebetween;

one or more developer accommodating cells formed between the two sheets, and each having a periphery surrounded by a partition wall; and dry developer contained in each of the cell(s), wherein the dry developer contains at least two kinds of frictionally chargeable dry developer particles having different chargeable polarities and different optical reflection densities, and at least one of the two sheets has a surface resistance of $10^7$ ohm/square ($10^7$ ohm/□) or less on its outer surface.

(3-4) Third Image Display Method

An image display method including the steps of:

preparing one of the above third to fifth reversible image display mediums having at least two kinds of the dry developer particles forming the dry developer within the developer accommodating cell(s), and frictionally charged to have the charged polarities different from each other; and displaying an image by forming a predetermined electrostatic field for each pixel in accordance with the image to be displayed and thereby moving the developer particles, with the developer particles contained in each of the cell(s) being in the frictionally charged state.

(4) Sixth Reversible Image Display Medium

A reversible image display medium including:

two sheets opposed to each other with a predetermined gap therebetween;

one or more developer accommodating cells formed between the two sheets, and each having a periphery surrounded by a partition wall; and dry developer contained in each of the cell(s), wherein the dry developer contains at least two kinds of frictionally chargeable dry developer particles having different chargeable polarities and different optical reflection densities, and at least one kind of the developer particles are electrically nonconductive particles.

(5) Seventh Reversible Image Display Medium

A reversible image display medium including:

two sheets opposed to each other with a predetermined gap therebetween;

one or more developer accommodating cells formed between the two sheets, and each having a periphery surrounded by a partition wall; and dry developer contained in each of the cell(s), wherein the dry developer contains at least two kinds of frictionally chargeable dry developer particles having different chargeable polarities and different optical reflection densities, and at least one kind of the developer particles are magnetic particles.

(6) Eighth Reversible Image Display Medium

A reversible image display medium including:

two sheets opposed to each other with a predetermined gap therebetween;

one or more developer accommodating cells formed between the two sheets, and each having a periphery surrounded by a partition wall; and dry developer contained in each of the cell(s), wherein the dry developer contains at least two kinds of frictionally chargeable dry developer particles having different chargeable polarities and different optical reflection densities, and a rate Sn/So of an area Sn of a non-image portion with respect to a medium unit area So is in a range from 0.0001 to 0.5.

(7) Ninth Reversible Image Display Medium

A reversible image display medium including:

two sheets opposed to each other with a predetermined gap therebetween;

one or more developer accommodating cells formed between the two sheets, and each having a periphery surrounded by a partition wall; and dry developer contained in each of the cell(s), wherein the dry developer contains at least two kinds of frictionally chargeable dry developer particles having different chargeable polarities and different optical reflection densities, and a value of (1−Sa/Sb) in a range from 0.0001 to 0.5 is obtained from arbitrary one of the developer accommodating cell(s) or arbitrary two or more successively arranged developer accommodating cells, assuming that Sa represents an area of an image display region provided by the above one developer accommodating cell or the cell group including the plurality of successively arranged developer accommodating cells, and Sb represents an area surrounded by a center line of the partition wall defining an outer periphery of the one developer accommodating cell or an area surrounded by a center line of the partition wall defining an outer periphery of the above cell group including the plurality of developer accommodating cells.

In this ninth reversible image display medium, a rate of the image display region is defined from a viewpoint different from that of the eighth reversible image display medium.

(8) Tenth Reversible Image Display Medium

A reversible image display medium including:

two sheets opposed to each other with a predetermined gap therebetween;

one or more developer accommodating cells formed between the two sheets, and each having a periphery surrounded by a partition wall;

dry developer contained in each of the cell(s); and a developer movement suppressing member arranged between the two sheets for suppressing movement of the dry developer within the developer accommodating cell(s), wherein the dry developer contains at least two kinds of frictionally chargeable dry developer particles having different chargeable polarities and different optical reflection densities.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 8(A) is a cross section of the reversible image display medium before the image display, and FIG. 8(B) is a cross section showing an example of the image display state;

FIG. 19(A) shows the equivalent circuit in the state where an image carrier and an image display medium are spaced, FIG. 19(B) shows the equivalent circuit in the state where electrostatic induction is caused by locating the image carrier close to the image display medium, FIG. 19(C) shows the equivalent circuit in the state where charges move due to insulation breakdown, and FIG. 19(D) shows the equivalent circuit in the state where the image carrier is spaced from the medium after the movement of charges;

FIG. 32(A) shows the equivalent circuit in the state where an image carrier and an image display medium are spaced, FIG. 32(B) shows the equivalent circuit in the state where electrostatic induction is caused by moving the image carrier close to the image display medium, FIG. 32(C) shows the equivalent circuit in the state where charges move due to insulation breakdown, FIG. 32(D) shows the equivalent circuit in the state where the image carrier is spaced from the medium after the movement of charges, and FIG. 32(E) shows the equivalent circuit in the state where an opposed electrode roller is grounded.

DESCRIPTION OF THE PREFERRED EMBODIMENTS

Figure 1A:
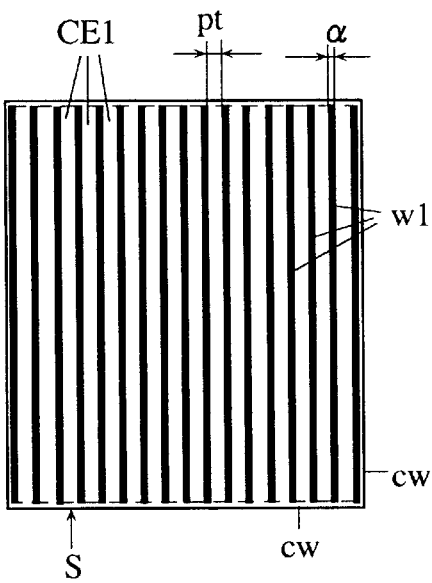
FIGS. 1(A)–1(I) show examples of a configuration of a developer accommodating cell, respectively.

A reversible (in other words, reusable) image display medium of a preferred embodiment of the invention basically has the following structure.

A reversible image display medium includes two sheets opposed to each other with a predetermined gap therebetween, and including at least one sheet having light transparency; one or more developer accommodating cells formed between the two sheets, and each having a periphery surrounded by a partition wall; and dry developer contained in each of the cell(s). The dry developer contains at least two kinds of frictionally chargeable dry developer particles having different chargeable polarities and different optical reflection densities.

An image display method of a preferred embodiment of the invention utilizes the reversible image display medium described above, and is basically configured as follows:

An image display method includes the steps of preparing the reversible image display medium having at least two kinds of the dry developer particles forming the dry developer within the developer accommodating cell(s), and frictionally charged to have the charged polarities different from each other; and displaying an image by forming a predetermined electrostatic field for each pixel in accordance with the image to be displayed and thereby moving the developer particles, with the developer particles contained in each of the cell(s) being in the frictionally charged state.

According to the reversible image display medium and the image display method utilizing the same, a predetermined electrostatic field corresponding to the image to be displayed is formed for each pixel and is applied on the frictionally charged developer particles of the image display medium. Thereby, a Coulomb force acting between the electrostatic field and the charged developer particles can move the developer particles to display the image in predetermined contrast.

After displaying the image, a different electrostatic field may be formed, or an alternating electric field or the like may be formed so that the image can be erased. Also, the image can be rewritten by forming a different electrostatic field. Accordingly, it is not necessary to abandon the image display medium, on which the image is already displayed. The developer particles are contained in the cell, and therefore external supply or addition of the developer is not required. Owing to these facts, it is possible to reduce remarkably the use of the image display medium such as paper sheets as well as consumable materials such as developer in the prior art. In contrast to the image formation of the electrophotographic type or the like in the prior art, it is not necessary to melt the toner for fixing it onto a sheet of paper or the like, and a majority of the image forming energy, which is required in such an image forming apparatus in the prior art, is not required.

Owing to the above features, the medium and method can satisfy a current demand for reduction in environmental loads.

The developer contained in the cell includes at least two kinds of developer particles having different optical reflective densities, and in other words, exhibiting different contrasts or different colors. Further, the developer particles are dry particles, and one kind of the developer particles can appropriately screen or hide the other kind of developer particles. Therefore, image display in good contrast can be achieved.

The developer contained in the cell includes at least two kinds of the chargeable dry developer particles, which can be frictionally charged to have different chargeable polarities. For image display, the developer particles which are mutually reversely charged by the frictional charging are moved by the Coulomb force. This also achieves the display in good contrast, and can suppress remaining of the last image.

The dry developer particles can suppress settling and condensation as compared with, e.g., electrically conductive toner in a display liquid used for electrophoretic image display, because liquid is not present. This also suppress lowering of the contrast of the image display, and thereby can perform stable image display for a long time. Since the settling and condensation of the developer particles are suppressed, the remaining of the last image can be suppressed. As compared with toner in liquid, the dry developer particles can perform stable image display also for the reason that the charging performance thereof changes with time to a smaller extent.

As compared with the image display by a conventional CRT display or the like, easy-on-the-eyes image display in high resolution can be performed.

Since the image display is performed by forming the electrostatic field for the developer particles in such a state that at least two kinds of the developer particles contained in each cell are charged to have mutually opposite polarities by frictional charging, this promotes movement of the particles so that the drive voltage required for the image display can be low.

The electrostatic field can be formed based on an electrostatic latent image, which is formed on the outer surface of one of the two sheets. The electrostatic field may be formed simultaneously with formation of the electrostatic latent image, or may be formed after formation of the electrostatic latent image. The electrostatic field may be formed by placing a predetermined potential on the sheet, which is opposite to the sheet for carrying the electrostatic latent image. This predetermined potential can be placed by applying the bias voltage to the above opposite sheet, or grounding the opposite sheet.

The reversible image display medium may be provided with an electrode.

More specifically, an electrode (preferably, transparent electrode) may be formed on the inner surface of the sheet having the light transmittance, and an electrode opposed to the above electrode may be arranged on the inner surface of the other sheet.

In the reversible image display medium provided with the electrodes as well as the image display method utilizing the same, a predetermined electrostatic field corresponding to the image to be displayed is formed for each pixel and between the electrodes by applying a voltage across the electrodes while the developer particles contained in each cell of the image display medium are frictionally charged. Thereby, a Coulomb force acting between the electrostatic field and the charged developer particles can move the developer particles to perform the development and thereby display the image in predetermined contrast. Also, the image can be erased and rewritten.

The electrode on the inner surface of the other sheet may be formed of a group of independent electrodes formed for the respective pixels.

In any one of the foregoing reversible image display mediums (including the display medium employed in the image display methods), the developer particles contained in the cell(s) are frictionally charged, and this state can be achieved by frictionally charging the developer particles by mixing or stirring operations prior to the accommodation of the developer particles in the cell(s), or by frictionally charging the developer particles by the mixing or stirring operations, which is executed by application of an appropriate energy, after the accommodation of the developer particles in the cell(s). Also, both the manners described above can be employed for frictionally charging the developer particles.

As specific examples of the mixing and stirring operations of the developer particles, such manners may be employed for executing the mixing and/or stirring operations that an alternating electric field (e.g., AC electric field) is applied to the developer particles, a magnetic force is employed if at least one kind of the developer particles are magnetic particles, and ultrasonic or mechanical vibrations are applied to the developer particles. Only one of these manners may be selected, and also two or more of them may be used in combination.

By sufficiently mixing and stirring the developer particles, these can be charged sufficiently so that the contrast can be further improved, and the drive voltage can be further lowered.

In any one of the foregoing reversible image display mediums (including the display medium employed in the image display methods), each of the two sheets has a large area compared with its thickness, and provides an expanded plane. These sheets may be selectively made of various materials such as synthetic resin, glass or the like, and may be soft, flexible or less flexible (e.g., glass). At least one of the two sheets, which is located on the image observation side, has light transparency for allowing viewing of images. Both the sheets may have the light transparency.

A developer movement suppressing member for suppressing lateral movement of the developer particles in the developer accommodating cell may be arranged between the two sheets. Naturally, the partition wall defining the cell suppresses the lateral movement of the developer.

The partition wall defining the developer accommodating cell and/or the developer movement suppressing member may also serve as spacers for maintaining the predetermined gap between the two sheets. A spacer dedicated to the function of maintaining the predetermined gap between the two sheets may be employed independently of the partition wall and the developer movement suppressing member.

Provision of the developer movement suppressing member suppresses local collection of the developer particles in the cell so that images of high quality can be displayed with less image irregularities. Since the spacer maintains the predetermined gap between the two sheets, image display with less image irregularities can be achieved. The developer movement suppressing member may have any form such as a columnar form or a wall-like form.

Regardless of whether the electrodes are present or not, specific restrictions are not imposed on the number of the developer accommodating cells in the reversible image display medium as well as the size, form, distribution, arrangement (regularity or irregularity) or the like, provided that the image display can be performed. The same can be true with respect to the developer movement suppressing member and the dedicated spacer.

Each of the partition wall, the developer movement suppressing member and the dedicated spacer may be entirely or partially fixed by an adhesive or the like to at least one of the two sheets, or may be formed integrally with the sheet by molding or the like. However, each of the partition wall, developer movement suppressing member and the dedicated spacer may be arranged between the sheets without being adhered by the adhesive to one or both of the two sheets, or without being integrated with the sheet, and may be simply arranged to be unmovable with respect to at least one of the sheets.

Figure 1B:
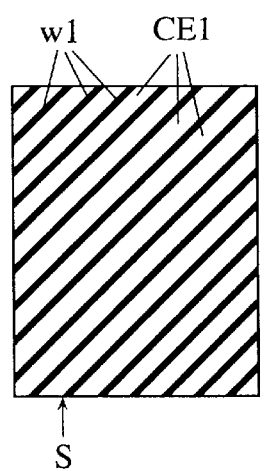
Figure 1C:
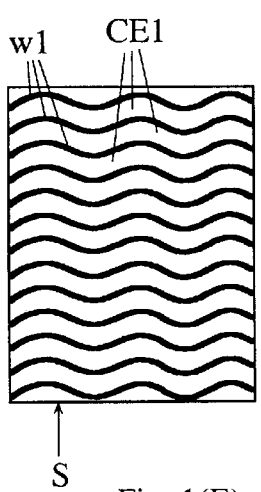

The developer accommodating cell may be basically of a continuous groove type or an independent type. As shown at FIGS. 1(A), 1(B) and 1(C), a cell CE1 of the continuous groove type has a partition wall w1 which does not cross another partition wall w1. For example, the cell extends between sealing portions cw, which are located on the periphery of the medium S and are opposed to each other. In this case, the sealing portion cw can also serve as the partition wall defining the cell. The cell CE1 of the continuous groove type may extend parallel to the two parallel sides of the medium S (FIG. 1(A)), may extend across the respective sides of the medium S (FIG. 1(B)), or may extend along a wavy form (FIG. 1(C)) or another form.

Figure 1D:
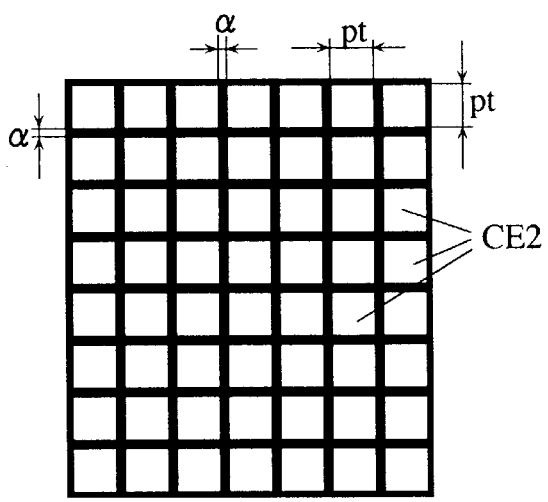
Figure 1E:
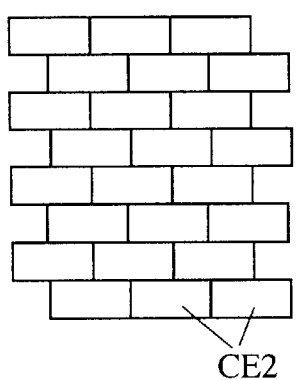
Figure 1F:
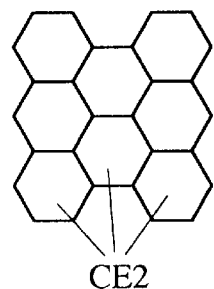
Figure 1G:
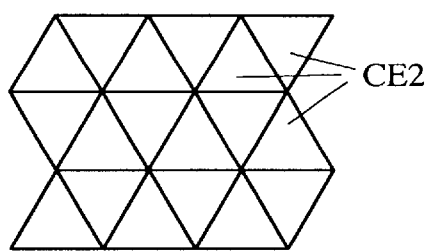
Figure 1H:
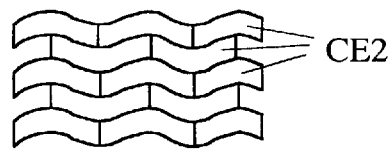
Figure 1I:
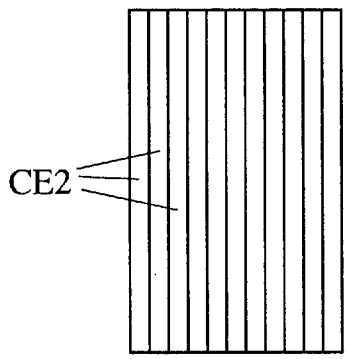

Cells CE2 of an independent type may be arranged, e.g., in a grid-like form (FIG. 1(D)), a brick-wall form (FIG. 1(E)), a honeycomb form (FIG. 1(F)), a triangle-combination form (FIG. 1(G)), a wavy-section-combination form (FIG. 1(H)), or a form of a series or combination of continuous grooves each surrounded by a partition wall.

In these figures, $\alpha$ represents a thickness of the partition wall, and pt represents a distance between the neighboring partition walls.

Each cell may neighbor to the other cells without a space therebetween as shown in FIGS. 1(A)–1(I), and may also be spaced from the other cells. The cells may be arranged regularly or irregularly. The cell may be one in number. The partition wall w1 may also serve as a spacer for maintaining the predetermined gap between the sheets.

The pixels for image display may be configured such that one pixel is present for one cell, a plurality of pixels are present for one cell or one pixel is present over the plurality of cells.

The developer movement suppressing member may have any form such as a columnar form (having a circular, square or triangular section), a conical form, a pyramidal form, a truncated conical form or a truncated pyramidal form, a wall-like form or the like. Various types of developer movement suppressing members may be employed. These may be arranged regularly or irregularly. A columnar member can be advantageously employed in view of firm connection to the sheets. A long wall-like member can generally achieve an effect of suppressing movement of the developer to a large extent. A thin plate-like member among the wall-like members is advantageous in view of ensuring accommodation of a desired amount of developer.

The developer movement suppressing member may have an arbitrary height. Accordingly, it is merely required to be unmovable with respect to one of the sheets. If the developer movement suppressing member has a height equal to a distance between the sheets, it may serve also as the spacer for maintaining the predetermined gap between the sheets.

FIGS. 2(A)–2(H) show examples of configurations and arrangement of the developer movement suppressing member.

Figure 2A:
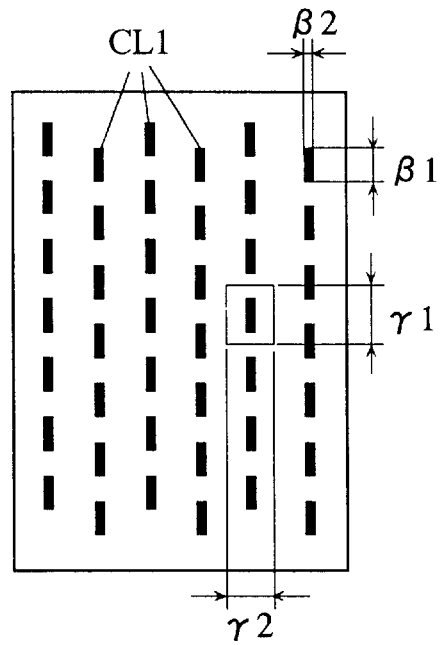
FIGS. 2(A)–2(H) show examples of a configuration and arrangement of a developer movement suppressing member.
Figure 2B:
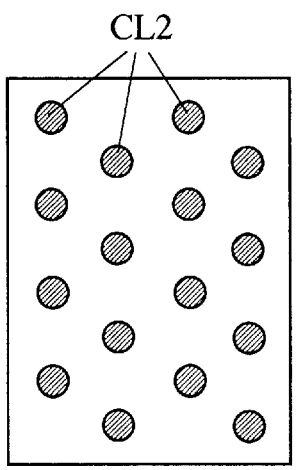
Figure 2C:
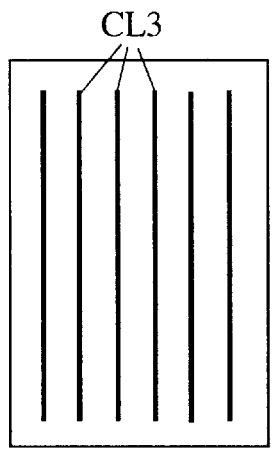
Figure 2D:
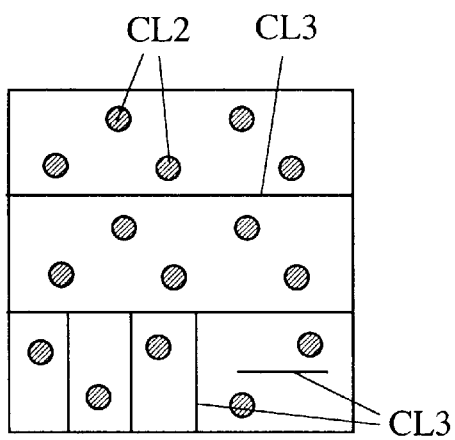
Figure 2E:
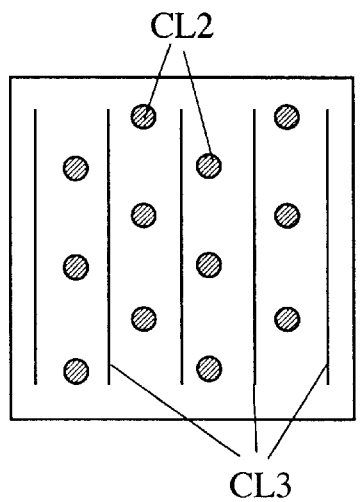
Figure 2F:
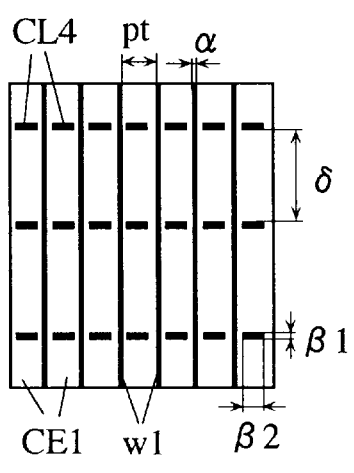
Figure 2G:
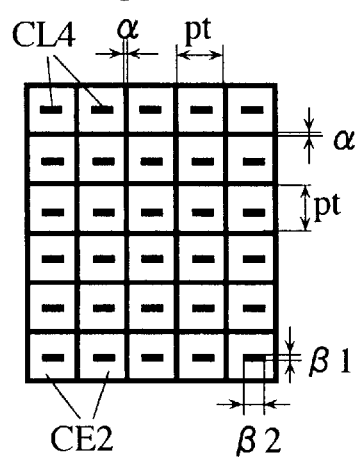

FIG. 2(A) shows columnar suppressing members CL1 each having a rectangular section. These members CL1 form a plurality of parallel spaced rows each including the plurality of members CL1 spaced in the longitudinal direction from each other. FIG. 2(B) shows columnar suppressing members CL2 arranged in a dispersed positions and each having a circular section. FIG. 2(C) shows thin plate-like (wall-like) suppressing members CL3 which are parallel to each other. FIG. 2(D) shows a structure, in which the columnar suppressing members CL2 and the thin plate-like (wall-like) suppressing members CL3 having different lengths are irregularly dispersed. FIG. 2(E) shows a structure, in which the columnar suppressing members CL2 and the thin plate-like (wall-like) suppressing members CL3 of the same length are dispersed with certain regularity. FIG. 2(F) shows a structure, in which a plurality of columnar suppressing members CL4 each having a rectangular section are distributed in each of the cells of the continuous groove type shown in FIG. 1(A). FIG. 2(G) shows a structure, in which one columnar suppressing member CL4 having the rectangular section is disposed within each of the independent cells CE2 arranged in the grid-like pattern shown in FIG. 1(D). Each of the suppressing members CL1, CL2, CL3 and CL4 can serve also as a spacer. In FIGS. 2(A)–2(G), P1 and P2 represent longitudinal and lateral sizes of the columnar suppressing member, respectively. Also, $\gamma 1$ and $\gamma 2$ represent longitudinal and lateral sizes of one unit of the image display region, respectively. In FIG. 2(F), delta($\delta$) shows a distance between the neighboring members CL4.

The image display medium includes a non-image display region due to the partition wall, the developer movement suppressing member, spacer and others described above. If the non-image display regions have an excessively large total area, these impede the image display and lower the image quality. If the non-image display region is excessively small, this reduces an area of the region for arranging the spacers so that the gap between the sheets may be irregular, and thereby image irregularities may occur.

Figure 2H:
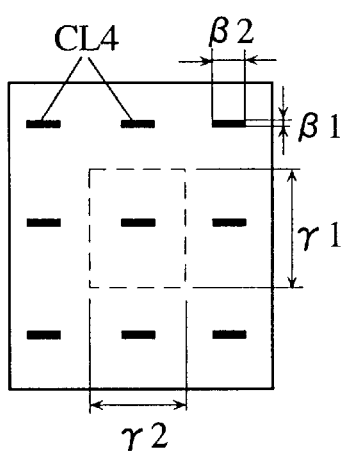

Regardless of whether the electrodes are present or not, it is preferable that a rate Sn/So of an area Sn of the non-image portion in a unit area So (e.g., a region of $\gamma 1 \times \delta 2$ at FIG. 2(A) and FIG. 2(H)) provided by the image display medium is in a range from 0.0001 to 0.5. The unit area So can be arbitrarily determined to include a region for actually displaying an image and a non-image portion region. More specifically, the unit area So is determined such that both the region for actual display of the image and the non-image portion region are included, and the region of the unit area So repetitively appear on the medium.

Figure 2I:
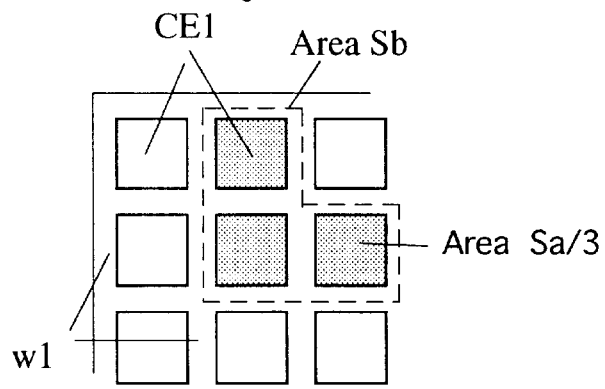
FIG. 2(I) shows by way of example a medium unit area Sb and an image portion area Sa of the cells in the area Sb.

Alternatively, Sa may represent an area of the image display region, which is provided by arbitrary one developer accommodating cell (or a group of the plurality of developer accommodating cells), in the arbitrary one developer accommodating cell (or the group of the plurality of successive developer accommodating cells). Also, Sb may represent an area surrounded by center line of the partition wall defining the outer periphery of the above one developer accommodating cell, or an area surrounded by center line of the partition wall defining the outer periphery of the above developer accommodating cell group. In this case, it is desired that a value of (1−Sa/Sb) relating to the one developer accommodating cell (or the group of the plurality of developer accommodating cells) is in a range from 0.0001 to 0.5 (see FIG. 2(I)).

According to the above structure, the image display region area not impeding the image display can be ensured, and the image of high quality can be displayed in good contrast. Further, it is possible to ensure the regions for the spacer such as the spacer provided by the partition wall, the spacer provided by the developer movement suppressing member and the exclusive spacer so that the predetermined gap can be maintained between the two sheets, whereby the image irregularities can be suppressed.

The image display medium with the electrodes is provided with leads for the electrodes. It is desired that the lead is arranged in the non-image display region where the partition wall or the like is present.

The sheet, cell partition wall, developer movement suppressing member, spacer and others may be made of various materials. However, in the case of, e.g., forming an electrostatic latent image for image display on the medium surface, at least the sheet carrying the electrostatic latent image is formed of an insulating sheet. The other sheet on the opposite side may be an insulating sheet or another kind of sheet, regardless of whether the electrode is provided or not. If the ground potential or a bias voltage must be placed on the other insulating sheet, an electrically conductive film may be formed on the outer surface of the sheet, or the sheet may be entirely made of an electrically conductive material or a material containing an electrically conductive material, although these are not essential. By employing the above manner or structure, the sheet can be easily grounded to carry the ground potential, or the bias voltage can be easily applied to the sheet. Regardless of whether the electrode is employed or not, an effect of externally shielding the electrical charges by the sheet on the opposite side can be achieved, if the sheet on the opposite side is an insulating sheet, and is provided at its outer surface with the electrically conductive film, or if the sheet itself on the opposite side is the electrically conductive sheet. Thereby, even in the case where the mediums on which images are displayed are overlapped together, collapsing of the images can be suppressed, and thereby the images can be stably held.

In the medium without an electrode, an excessively large gap between the sheets or an excessively large thickness of each sheet reduces the electric field applied to the developer between the sheets, and therefore impairs the development performance so that the contrast and resolution are lowered. If the gap between the sheets is excessively small, this reduces an amount of the developer, which can be accommodated in the developer accommodating cell, so that required contrast cannot be achieved without difficulty. If the thickness of each sheet is excessively small, and therefore the whole thickness of the medium affected by the thickness of each sheet is excessively small, the medium is liable to be curved so that the gap between the sheets cannot be uniform, and the image irregularities are liable to occur.

Accordingly, in the reversible image display medium without an electrode, it is preferable that each sheet has a thickness from 5 $\mu$m to 100 $\mu$m, the gap between the opposite sheets is in a range from 20 $\mu$m to 300 $\mu$m, and the whole thickness is in a range from 30 $\mu$m to 500 $\mu$m, although not restricted to these values. The above values allow the image display in good contrast and high resolution with less image irregularities.

Likewise, in the reversible image display medium with an electrode, such structures may be employed for ensuring an intended amount of the developer and the uniformity in gap between the sheets that each sheet has a thickness from 5 $\mu$m to 100 $\mu$m, the gap between the opposite sheets is in a range from 20 $\mu$m to 300 $\mu$m, and the whole thickness is in a range from 30 $\mu$m to 500 $\mu$m, although not restricted to these values.

In the reversible image display medium without an electrode, an electrostatic latent image may be formed, e.g., on the medium surface (sheet surface) for forming an electrostatic field based on the electrostatic latent image. In this case, if a surface resistance value of the sheet, and particularly the surface resistance value of the sheet on the side for forming the electrostatic field is small, the electrostatic latent image is liable to collapse when the electrostatic latent image is directly formed on the sheet surface for forming the electrostatic field for image display, and when the electrostatic latent image formed outside the medium is transferred onto the sheet surface.

In view of the above, it is preferable in the reversible image display medium that at least one of the two sheets has the surface resistivity from $10^{10}$ ohm/square–$10^{16}$ ohm/square($10^{10}$ Ω/□~$10^{16}$ Ω/□) on its outer surface. This allows reliable and easy image display, and enables stable image display for a long time.

If the resistance of the sheet surface, and particularly the surface resistance of the sheet on the side remote from the electric field formation side is excessively large, this impairs the image formation and image holding. In particular, the electrostatic latent charges cannot be stably or efficiently placed on the sheet surface of the electrostatic field formation side, if the electrostatic latent image is to be formed directly on the sheet surface. In the case where the electrostatic latent image which is externally formed is to be transferred, the uniform electric field cannot be formed without difficulty, and the image irregularities are liable to occur. Further, when the mediums on which the images are already formed are overlapped together, it is difficult to provide electrostatic shielding between the neighboring mediums so that the images are liable to collapse, and cannot be stably held without difficulty.

Accordingly, it is preferable that at least one of the two sheets has the surface resistivity of $10^7$ ohm/square ($10^7$ Ω/□) or less (equal to or lower than that of paper) on its outer surface. This allows reliable and easy image display, and enables stable image display for a long time. Also, image irregularities can be suppressed.

In view of the above, it is preferable in the reversible image display medium without an electrode that one of the two sheets has the surface resistivity from $10^{10}$ ohm/square–$10^{16}$ ohm/square on its outer surface, and the other sheet has the surface resistivity of $10^7$ ohm/square or less on its outer surface.

If no disadvantage is caused, each sheet may have a thickness from 5 $\mu$m to 100 $\mu$m, the gap between the opposite sheets may be in a range from 20 $\mu$m to 300 $\mu$m, the whole thickness may be in a range from 30 $\mu$m to 500 $\mu$m, one of the two sheets may have the surface resistivity from $10^{10}$ ohm/square–$10^{16}$ ohm/square on its outer surface, and the other sheet may have the surface resistivity of $10^7$ ohm/square or less on its outer surface.

The surface resistivity of each sheet may be adjusted, e.g., by adding an electrically conductive material (e.g., electrically conductive carbon) into a material of the sheet, or by applying a surface active agent onto the sheet surface.

In either of the reversible image display mediums with and without the electrode, the developer accommodated in the developer accommodating cell may contain at least two kinds of dry developer particles, which have mutually different chargeable polarities, and different optical reflective densities (in other words, of different contrasts or different colors). As a typical example, the developer may contain positively chargeable (or negatively chargeable) black particles having light absorbing properties and negatively chargeable (or positively chargeable) white particles having light reflecting properties.

Between the at least two kinds of developer particles forming the dry developer, at least one kind of the developer particles may be non-conductive particles. In this case, the presence of such non-conductive particles allows easy and reliable charging by friction of the two kinds of developer particles, regardless of whether the image display medium has the electrodes or not. Thereby, the image display can be further improved.

Between the two kinds of developer particles forming the dry developer, at least one kind of the developer particles may be magnetic particles. Regardless of whether the image display medium has the electrodes or not, the existence of such magnetic particles allows stirring the developer (developer particles) by the magnetic field (e.g., oscillating magnetic field). Owing to the stirring of the developer, the developer particles can easily move in the electrostatic field for image display when erasing the last image prior to the new image formation (display) or displaying the new image. Thereby, the image display is further improved.

In any one of the foregoing cases, if the developer particles are excessively small, they have an excessively large adhesivity, and therefore cause mutual adhesion of the particles and reduction in developing efficiency. Further, such excessively small developer particles carry a large amount of charges so that a large electric field is required for moving the particles for image display, and therefore, a high drive voltage is required.

If the developer particles are excessively large, the frictional charging cannot be performed in an intended manner so that the developer particle moving speed cannot be increased sufficiently in the electrostatic field for image display, and/or good contrast cannot be achieved.

In view of the above as well as the material and others for obtaining the predetermined characteristics of the developer particles, the appropriate particle diameter(volume average particle diameter) of the non-conductive developer particle is in a range from 1 $\mu$m to 50 $\mu$m, and the appropriate particle diameter(volume average particle diameter) of the magnetic developer particle is in a range from 1 $\mu$m to 100 $\mu$m.

One kind of the developer particles may be nonconductive and magnetic particles.

The developing particles can be formed, for example, from a binder resin and a coloring agent, etc. or with a coloring agent alone, etc. Those which are usable are described below.

Binder resin

The binder resin is not specifically limited in so far as it can disperse a coloring agent, magnetic substance, etc. and is usable usually as a binding agent. Binding resins which are usable for electrophotography toner are used as a representative example.

Examples of useful binder resins are polystyrene type resins, poly(meth)acrylic type resins, polyolefin type resins, polyamide type resins, polycarbonate type resins, polyether type resins, polysulfone type resins, polyester type resins, epoxy resins, urea resins, urethane resins, fluorine-containing resins, silicone resins and copolymers, block polymers, graft-polymers and polymer blend, etc. of these resins.

The binder resin may have a considerably high glass transition temperature (Tg) and needs not be a thermoplastic resin.

Coloring Agents

As the coloring agents, the following various kinds of organic or inorganic pigments and dyestuffs having various colors are usable.

Examples of black pigments are carbon black, copper oxide, manganese dioxide, Aniline Black and activated carbon, etc.

Examples of yellow pigments are chrome yellow, zinc yellow, cadmium pigment such as cadmium yellow or the like, yellow iron oxide, mineral Fast Yellow, Nickel Titan Yellow, Naphthol Yellow S, Hansa Yellow G, Hansa Yellow 10G, Benzidine Yellow G, Benzidine Yellow GR, Quinoline Yellow Lake, Permanent Yellow NCG and Tartrazine Lake, etc.

Examples of orange pigments are red chrome yellow, molybdenum orange, Permanent Orange GTR, Pyrazolone Orange, Vulcan Orange, Indanthrene Brilliant Orange RK, Benzidine Orange G and Indanthrene Brilliant Orange GK, etc.

Examples of red pigments are red iron oxide, cadmium pigment such as cadmium red or the like, red lead, mercury sulfide, Permanent Red 4R, Lithol Red, Pyrazolone Red, Watchung Red, Lake Red D, Brilliant Carmine 6B, eosine lake, Rhodamine Lake B, alizarin lake and Brilliant Carmine 3B, etc.

Examples of violet pigments are manganese violet, Fast Violet B and Methyl Violet Lake, etc.

Examples of blue pigments are prussian blue, cobalt blue, Alkali Blue Lake, Victoria Blue Lake, Phthalocyanine Blue, Phthalocyanine Blue containing no metal, partially chlorinated Phthalocyanine Blue, Fast Sky Blue and Indanthrene Blue BC, etc.

Examples of green pigments are chrome green, chromium oxide, Pigment Green B, Malachite Green Lake and Final Yellow Green G, etc.

Examples of white pigments are zinc white, titanium oxide, antimony white and zinc sulfide, etc.

Examples of extender pigments are barite powder, barium carbonate, clay, silica, white carbon, talc and alumina white, etc.

Examples of various kinds of dyestuffs such as basic, acid, disperse and substantive dye are Nigrosine, Methylene Blue, Rose Bengale, Quinoline Yellow and Ultramarine Blue, etc.

These coloring agents are usable alone or in a combination of plural of them.

Especially in white-black display, carbon black is preferable as a black coloring agent and titanium dioxide as a white coloring agent.

Especially in case of preparing developing particles from a mixture of a white pigment and a meltable binding resin(binder resin), it is preferable to use the white pigment in an amount of at least 10 parts by weight, more preferably at least 20 parts by weight, per 100 parts by weight of raw monomer of white particles, in order to obtain sufficient whiteness. It is desirable to use the white pigment in an amount of up to 60 parts by weight, more preferably up to 50 parts by weight, in order to secure sufficient dispensability of the white pigment. Over 60 parts by weight of the white pigment, the binding of the pigment and the binding resin will decrease and the dispersion of the pigment will deteriorate. Less than 10 parts by weight of the white pigment, the developing particles having a different color will not sufficiently be shaded by the pigment.

Although carbon black is preferable as the black coloring agent, it is possible to use magnetic particles or magnetic fine powder such as magnetite, ferrite, etc. as the coloring agent in order to provide magnetic character to the developing particles.

Other Additives

Examples of additives preferably usable other than the above binder resin or coloring agent are magnetic substance, charge-controlling agent, resistance adjusting agent, etc.

Charge-Controlling Agent

The charge-controlling agent is not specifically limited in so far as it provides a charge to the developing particles by friction-charging.

Examples of plus-charge-controlling agents are Nigrosine dye, triphenylmethane compound, quaternary ammonium salt compound, polyamine resin, imidazole derivative, etc.

Examples of minus-charge-controlling agents are salicylic acid-metal complex, metal-containing azo dye, metal-containing oil-soluble dye (including metal ion or metal atom), quaternary ammonium salt compound, calixarene compound, boron-containing compound (benzilic acid-boron complex), nitroimidazole derivative, etc.

Other than the above, as charge-controlling agents are usable metal oxides such as ultrafine silica particles, ultrafine titanium oxide particles, ultrafine alumina particles, etc., nitrogen-containing cyclic compounds such as pyridine or its derivative, salt, various organic pigments, resins containing fluorine, chlorine, nitrogen, etc.

Magnetic Substances

Magnetic particles and magnetic fine powder are usable. Examples of these substances are ferromagnetic elements, alloy or compounds containing the element. Examples thereof are those containing a conventionally known magnetic substance such as magnetite, hematite, ferrite or like alloys or compounds of cobalt, nickel, manganese, etc., other ferromagnetic alloy, etc. The magnetic powder may have various shapes such as particle, needle, thin flat shape, etc. and is suitably usable.

Resistance Adjusting Agent Resistance adjusting agents include similar compounds to the above magnetic powder and coloring agent.

Examples of resistance adjusting agents are metal oxides, graphite, carbon black, etc. having various shapes such as thin flat, fibrous or powder shape, etc.

Below is explained an example of preparing developing particles.

Each of prescribed amount of components selected from the above binder resin, magnetic powder, coloring agent, charge-controlling agent, resistance adjusting agent and other additives are mixed thoroughly. The mixture is further mixed with heating by use of press-kneader, twin-screw mixing device, etc. After cooled, the mixture is roughly pulverized with use of hammer mill, cutter mill, etc. and then finely pulverized with use of jet mill, angmill, etc. The resulting powder is classified by a wind classifier, etc. to a predetermined average particle size to obtain developing particles.

A developer having a predetermined amount of charges is obtained by mixing and stirring thus obtained particles having different chargeable polarities and contrasts(optical reflective densities) at a predetermined rate thereof. A third agent such as fluidization agent may be added thereto to improve fluidity of the developer.

Fluidization Agent

Examples of fluidity improving agents are silica, alumina, titanium oxide, barium titanate, magnesium titanate, calcium titanate, strontium titanate, zinc oxide, siliceous sand, clay, mica, wallastonite, diatomaceous earth, chromium oxide, cerium oxide, red iron oxide, antimony trioxide, magnesium oxide, zirconium oxide, barium sulfate, barium carbonate, calcium carbonate, silicon carbide, silicon nitride, etc.

Particularly preferable are fine powder of silica, aluminum oxide, titanium dioxide and magnesium fluoride. The fluidity improving agent is used singly or in a combination of them.

In the image display employing the reversible image display medium without an electrode, the electrostatic field to be applied to the developer particles can be formed based on the electrostatic latent image, which is formed, e.g., on the surface of one (e.g., on the image observation side) of the two sheets in accordance with the image to be displayed. The formation of the electrostatic field may be performed simultaneously with or after the formation of the electrostatic latent image. The formation of the electrostatic field is performed, e.g., by placing a predetermined potential, which is required for forming the electrostatic field, on the sheet opposite to the sheet, on which the electrostatic latent image is to be formed. The above predetermined potential can be placed by applying a bias to the opposite sheet, or by grounding the opposite sheet.

The electrostatic latent image may be formed directly on the medium surface (sheet surface), e.g., by a device for directly forming the electrostatic latent image, or may be formed by transferring the electrostatic latent image, which is formed outside the medium by an external electrostatic latent image forming device, onto the medium surface (sheet surface).

The direct electrostatic latent image forming device may be of various discharging types, in which the electrostatic latent image charges are placed by performing the discharge to the medium surface in accordance with the image to be displayed, or of various charge injection types, in which the electrostatic latent image charges are placed by injecting charges to the medium surface in accordance with the image to be displayed. For example, the devices of the former type may be of an ion flow type, and also may be of a multi-stylus type having an electrostatic record head, in which recording electrodes are arranged in a predetermined direction (e.g., main scanning direction for sheet scanning by the device). In an example of the latter type, the device of the multi-stylus type may be used, which includes an electrostatic record head, in which the recording electrodes are arranged in a predetermined direction (e.g., main scanning direction for sheet scanning by the device), and neighboring control electrodes are arranged close to the recording electrodes.

The external electrostatic latent image forming device may be configured such that the electrostatic latent image corresponding to the image to be displayed is formed on the electrostatic latent image carrier, and then is transferred onto the sheet surface. More specifically, the electrostatic latent image corresponding to the image to be displayed may be formed, e.g., on a photoconductive member such as a photosensitive member, and may be transferred onto the sheet surface. Alternatively, the electrostatic latent image corresponding to the image to be displayed may be formed on a dielectric member, and may be transferred onto the sheet surface.

The image display may be performed with the electric field forming device including one of the foregoing electrostatic latent image forming devices.

By forming the electrostatic latent image on the image display medium in the foregoing transfer manner or the direct formation manner, the image holding properties of the medium can be improved, as will be described later. In particular, the image holding properties can be improved in the case of using developer having high flowability or developer having flowability which can be increased by the developer stirring operation prior to the image display.

In the reversible image display medium having the electrodes, the electrostatic field for the image display can be formed by applying a voltage across the electrodes. The electrostatic field formation device for such medium will be described later.

In both the reversible image display mediums with and without the electrode, image erasing processing may be performed for erasing the previously displayed image prior to the new image display.

The image erasing processing can be performed, e.g., by forming an electric field, which can move the developer particles forming the developer in the image display medium, and/or applying a stirring force to the developer. The application of the stirring force can be performed, e.g., by forming an alternating magnetic field, forming an oscillating magnetic field, emitting ultrasonic waves, and/or applying mechanical vibrations.

For the image display, therefore, various kinds of image easing devices can be appropriately employed. Such image erasing devices may include the electric field forming device for forming the electric field moving the developer particles, the stirring device for applying a stirring force to the developer particles, or both the electric field forming device and the stirring device.

For example, under the electric field, one kind of the developer particles, which have the same optical reflection density (i.e., the same contrast or the same color), between the two kinds of developer particles described above may be collected to one of the sheets, and the other kind of developer particles having the same optical reflection density may be collected to the other sheet. Thereby, the image erasure can be performed. Further, the next image formation can be performed by moving the developer particles on only the image portion so that the image display can be performed smoothly and reliably in high quality.

For example, in the operation of stirring the developer (developer particles), the image is erased, and the amount of charges and the flowability of the developer particles are improved. Thereby, the next image formation can be performed smoothly and reliably in a high quality.

The electric field forming device may include a pair of electrodes (usually made of metal) or dielectric members, which are arranged on the opposite sides of the reversible image display medium, and a power supply device for applying a bias voltage across these electrodes or dielectric members.

In addition to the above, it is possible to employ various kinds of electric field forming devices of the discharging type, in which the electric field is formed by performing the discharging to the image display medium, and various kinds of electric field forming devices of the charge injection type, in which the electric field is formed by injecting the electric charges to the reversible image display medium. The devices of the former type may be specifically are a Corona charging device, an electric field forming device of an ion flow type, and an electric field forming device of the multi-stylus type having a head, in which electrodes are arranged in a predetermined direction. The device of a latter type may be specifically an electric field forming device of the multi-stylus type, in which electrodes are arranged in a predetermined direction, and neighboring control electrodes are arranged close to the electrodes.

The stirring device may be configured as follows:

Thus, the stirring device may be configured to form an alternating electric field applied to the reversible image display medium.

This device can be utilized if at least one kind of developer particles have the electrically insulating property.

Also, the stirring device may be configured to form an oscillating magnetic field applied to the reversible image display medium.

This device can be utilized if at least one kind of developer particles contain a magnetic material.

Further, the stirring device may be configured to emit ultrasonic waves to the reversible image display medium.

The stirring device may be configured to apply mechanical vibrations to the reversible image display medium.

The stirring device may be formed of a combination of the foregoing two or more structures.

As already described, the stirring of the developer (developer particles) improves the amount of charges and the flowability of the developer particles, and thereby can achieve smooth and reliable image display with high quality.

By stirring the developer prior to the image display, the amount of charges of the developer particles is stabilized. This likewise achieves good image display. Further, the allowable ranges of the chargeability and flowability of the developer can be widened.

For the image display using the reversible image display medium either with or without the electrode, the developer may be stirred also for the purpose of performing the foregoing image erasing processing, or independently of the image erasing processing.

When using the image display medium without an electrode, the developer may be stirred simultaneously with and/or before formation of the electrostatic field. For this, the electrostatic latent image corresponding to the image to be displayed may be formed, e.g., on the surface (sheet surface) of the image display medium, and the electrostatic field may be formed based on the electrostatic latent image simultaneously with or after the formation of the electrostatic latent image.

The formation of the electrostatic field and the stirring of the developer may be specifically as follows:

(1) The electrostatic field is formed in the image display step in such a manner that the electrostatic latent image in accordance with the image to be displayed is formed on the outer surface of one of the two sheets of the reversible image display medium, the electrostatic field is formed simultaneously with the formation of the electrostatic latent image based on the electrostatic latent image, and the stirring of the developer is performed simultaneously with the formation of the electrostatic field.

(2) The electrostatic field is formed in the image display step in such a manner that the electrostatic latent image in accordance with the image to be displayed is formed on the outer surface of one of the two sheets of the reversible image display medium, the electrostatic field is formed after the formation of the electrostatic latent image based on the electrostatic latent image, and the stirring of the developer is performed after the formation of the electrostatic latent image, and before or simultaneously with the formation of the electrostatic field.

(3) The electrostatic field is formed in the image display step in such a manner that the electrostatic latent image in accordance with the image to be displayed is formed on the outer surface of one of the two sheets of the reversible image display medium, the electrostatic field is formed simultaneously with or after the formation of the electrostatic latent image based on the electrostatic latent image, and the stirring of the developer is performed before the formation of the electrostatic latent image.

(4) Two or more of the above manners in the items (1)–(3) are combined for forming the electrostatic field and stirring the developer.

For the image display medium provided with the electrodes, a voltage may be applied across the electrodes to form the electrostatic field, and the developer may be stirred before or simultaneously with the formation of the electrostatic field.

Regardless of whether the electrode is employed or not, the developer can be stirred, e.g., by a stirring device, which is opposed to an image display medium transporting path, and is located in or upstream to the region for forming the electrostatic field by the electric field formation device in the relative transporting direction of the image display medium with respect to the electric field formation device.

The developer stirring device and method may be the same as or similar to those already exemplified in connection with the image erasing processing.

By stirring the developer for the image display, the contrast can be further improved, and the drive voltage can be further lowered.

For the image display employing the reversible image display medium without an electrode, the electrostatic latent image may be formed on the surface (sheet surface) of the image display medium in such a manner that the medium surface is uniformly charged to carry the predetermined potential before formation of the electrostatic latent image, and the electrostatic latent image in accordance with the image to be displayed is formed on the charged region. Based on the electrostatic latent image, the predetermined electrostatic field is formed for each of the pixels in accordance with the image to be displayed. Thereby, the developer particles may be moved for the image display.

The above image display method can be applied to the reversible image display medium, in which charged developer particles of a color different from a color of insulating liquid are dispersed in the insulating liquid, and the insulating liquid and the charged developer particles are confined between two sheets opposed to each other with a predetermined gap therebetween. At least one of the sheets has light transparency.

According to the above method, the surface of the image display medium is uniformly charged to carry the predetermined potential prior to the image display. Then, the electrostatic latent image is formed on the surface of the charged medium. Based on the electrostatic latent image, the predetermined electrostatic field is formed for each of the pixels in accordance with the image to be displayed and applied to the charged developer particles dispersed in the insulating liquid within the medium.

The image display method described above can be applied to the reversible image display medium, in which spherical developer particles each having an outer surface formed of halves being different in color and amount of absorbable ions from each other are surrounded by an insulating liquid layer, respectively, and are buried in an insulating property holding medium.

According to the above method, the surface of the image display medium is uniformly charged to carry the predetermined potential prior to the image display. Then, the electrostatic latent image is formed on the surface of the charged medium. Based on the electrostatic latent image, the predetermined electrostatic field is formed for each of the pixels in accordance with the image to be displayed and applied to the spherical developer particles so that the directions of the spherical developer particle surfaces of the different colors are controlled to perform the image display. More specifically, the spherical developer particles, which are surrounded by the insulating liquid layer and are rotatable, are inverted by an influence of the electrostatic field so that the image is displayed. The inversion of the spherical developer particle is caused by the fact that the opposite halves of the outer surface of the spherical developer particle are different in amount of the absorbable ions, and therefore the surface changes its direction depending on the direction of the electric field. Since the opposite halves of the outer surface of the spherical developer particle are different in color, the image display can be performed.

In any of the mediums employing the developer particles in the cell(s), the developer particles in the insulating liquid and the rotatable spherical particles, the formation of electrostatic latent image on the medium can be performed, e.g., by directly forming it on the medium surface charged in the charging step, or by transferring the electrostatic latent image formed on the electrostatic latent image carrier outside the medium onto the medium surface charged in the charging step.

The region of the electrostatic latent image formed on the medium may have such charging characteristics that the region is charged to carry the same polarity as or the polarity different from the charged polarity of the region of the medium surface, which is uniformly charged prior to the electrostatic latent image formation, or that the region of the latent image is charged to 0 V.

The electrostatic field may be formed simultaneously with the formation of the electrostatic latent image. Alternatively, the electrostatic field may be formed by applying a bias voltage to the medium, or by grounding the medium after formation of the electrostatic latent image.

According to the above manner, in which the electrostatic latent image is written onto the charged region formed by uniformly charging the surface of the image display medium to carry the uniform potential, the charged developer particles in the developer accommodating cell(s) or in the insulating liquid can be moved in accordance with the medium structure, or the spherical developer particles can be turned as described above. Further, such an electrostatic field, which is enough to hold the moved developer particles or the turned developer particles in the intended positions, is formed. In other words, after uniformly charging the surface of the image display medium to carry the predetermined potential, the electrostatic latent image is written onto the charged region, whereby the image holding properties are improved. Particularly, in the case of using the developer having high flowability or the developer having the flowability which can be increased by the developer stirring operation prior to the image display, the advantages relating to the image holding can be achieved. Owing to the above, images of good contrast and high quality can be stably displayed for a long time.

In any one of the mediums including the developer particles dispersed in the insulating liquid or the spherical developer particles, the image can be erased by forming a different electrostatic field or applying an alternating electric field. Also, by forming a different electrostatic latent image, the image can be rewritten.

According to the various reversible image display mediums and the image display methods described above, the images of good contrast, high resolution and high quality can be stably displayed for a long time. Further, remaining of last images can be suppressed, and therefore good reversibility can be achieved. These improve the quality of the displayed image. The drive voltage can also be lowered. The image display can be performed with fewer irregularities.

The image display with the display characteristics similar to that achieved with paper mediums can be achieved. The contrast can be higher than that achieved by electrophoresis display (EPD).

Specific examples of the developer particles and developer will now be described. Also, specific examples of the reversible image display medium, image display method and image forming apparatus will be described below with reference to the drawings.

<Developer Particles and Developer>
White developing particles WP

In a Henschel mixer were thoroughly mixed 100 parts by weight of thermoplastic polyester resin (softening point: 121° C., Tg: 67° C.), 40 parts by weight of titanium oxide (Ishihara Sangyo Co., Ltd.: CR-50) and 5 parts by weight of salicylic acid-zinc complex (minus-charge-controlling agent, Orient Chemical Co., Ltd.: Bontron E-84). The mixture was further mixed by a twin-axis extruder and then cooled. The mixture was roughly pulverized, then pulverized by a jet mill and classified with wind to obtain white fine powders which have volume average particle sizes of 0.7 μm, 2.1 μm, 10.1 μm, 46.2 μm and 55.3 μm.

To the white fine powders having each of above size was added 0.3 part by weight of hydrophobic silica particles (Nihon Aerosil Co., Ltd.: Aerosil R-972). The mixture was mixed by a Henschel mixer to prepare white developing particles WP (WP1–WP5) substantially having the following particle size.

Particle WP1: volume average particle diameter=0.7 μm
Particle WP2: volume average particle diameter=2.1 μm
Particle WP3: volume average particle diameter=10.1 μm
Particle WP4: volume average particle diameter=46.2 μm
Particle WP5: volume average particle diameter=55.3 μm These white developer particles are nonconductive particles.
Black developing particles BP In a Henschel mixer were thoroughly mixed 100 parts by weight of styrene-n-butyl methacrylate resin (softening point: 132° C., Tg: 65° C.), 4 parts by weight of carbon black (Lion Oil & Fat Co., Ltd.: Ketchen Black EC), 1.5 parts by weight of silica (Nihon Aerosil Co., Ltd.: #200) and 500 parts by weight of magnetic powder containing magnetite (RB-BL, Titan Kogyo Co., Ltd.). The mixture was further mixed by a kneeder and then cooled.

The mixture was roughly pulverized by a feather mill, then finely pulverized by a jet mill and classified with wind to obtain black particles BP (BPo, BP1–BP5).

Particle BPo: volume average particle diameter=25.0 μm.
Particle BP1: volume average particle diameter=0.8 μm
Particle BP2: volume average particle diameter=3.0 μm
Particle BP3: volume average particle diameter=25.1 μm
Particle BP4: volume average particle diameter=87.7 μm
Particle BP5: volume average particle diameter=121.0 μm These black developer particles are magnetic particles.
Developer DL The white particles WP3 (10.1 μm) and the black particles BPo (25.0 μm) were put into a polyethylene bottle at a rate of 20 grams of the white particles and 80 grams of black particles. The bottle was rotated by a ball mill pedestal to perform the kneading and mixing for 30 minutes so that the developer DL (DLo) was obtained.

The white and black particles were combined at the following rates, and 20 grams of the white particles and 80 grams of black particles were put into a polyethylene bottle, and were rotated by a ball mill pedestal to perform the kneading and mixing for 30 minutes so that developer DL (DL1–DL9) were obtained. Also, the following developer De1De16 were prepared as comparative developer.

In any kind of developer, the white particles were charged negatively, and the black particles were charged positively.

Developer DL1: WP2 (2.1 μm)+BP2 (3.0 μm)
Developer DL2: WP3 (10.1 μm)+BP2
Developer DL3: WP4 (46.2 μm)+BP2
Developer DL4: WP2+BP3 (25.1 μm)
Developer DL5: WP3+BP3
Developer DL6: WP4+BP3
Developer DL7: WP2+BP4 (87.7 μm)
Developer DL8: WP3+BP4
Developer DL9: WP4+BP4
Comparative Developer De1: WP1 (0.7 μm)+BP1 (0.8 μm)
Comparative Developer De2: WP2 (2.1 μm)+BP1
Comparative Developer De3: WP3 (10.1 μm)+BP1
Comparative Developer De4: WP4 (46.2 μm)+BP1
Comparative Developer De5: WP5 (55.3 μm)+BP1
Comparative Developer De6: WP1 (0.7 μm)+BP2 (3.0 μm)
Comparative Developer De7: WP5 (55.3 μm)+BP2
Comparative Developer De8: WP1 (0.7 μm)+BP3 (25.1 μm)
Comparative Developer De9: WP5 (55.3 μm)+BP3
Comparative Developer De10: WP1 (0.7 μm)+BP4 (87.7 μm).
Comparative Developer De11: WP5 (55.3 μm)+BP4
Comparative Developer De12: WP1 (0.7 μm)+BP5 (121 μm)
Comparative Developer De13: WP2 (2.1 μm)+BP5
Comparative Developer De14: WP3 (10.1 μm)+BP5
Comparative Developer De15: WP4 (46.2 μm)+BP5
Comparative Developer De16: WP5 (55.3 μm)+BP5

The following developer liquid was also prepared as comparative developer.
Developing Liquid d1 for Comparison Into 100 ml of isoparaffin hydrocarbons (Isoper G, Exon Chemical Co., Ltd.) was mixed and dissolved 1 g of Sudan Black X60 (BASF AG) to obtain a colored liquid.

To the solution were added 10 g of titanium dioxide particles (Ishihara Sangyo Co., Ltd.: CR-50) and 70 g of IP Solvent 1620 solution containing 0.5% of Sulfol Ba-30N (Matsumura oil Research Corp., barium sulfonate). The mixture was subjected to wet grinding treatment in ⅛ GL vessel equipped with a water jacket at cooling temperature of 20° C. and disc revolution of 2000 rpm for 15 hours with use of a sand grinder (IGARASHI KIKAI SEIZO CO., Ltd.) and glass beads of 1 mm diameter as media (1500 cc).

The resulting liquid developer having a high concentration (100 parts by weight) was diluted with an addition of 900 parts by weight of IP Solvent 1620. The solution was subjected to dispersion treatment at 10000 rpm for 5 minutes with use of T.K. Autohomomixer M (Tokushu Kika Kogyo Co., Ltd.) to obtain developing liquid d1.

<Reversible Image Display Medium>
Reversible image display medium 11

Figure 3:
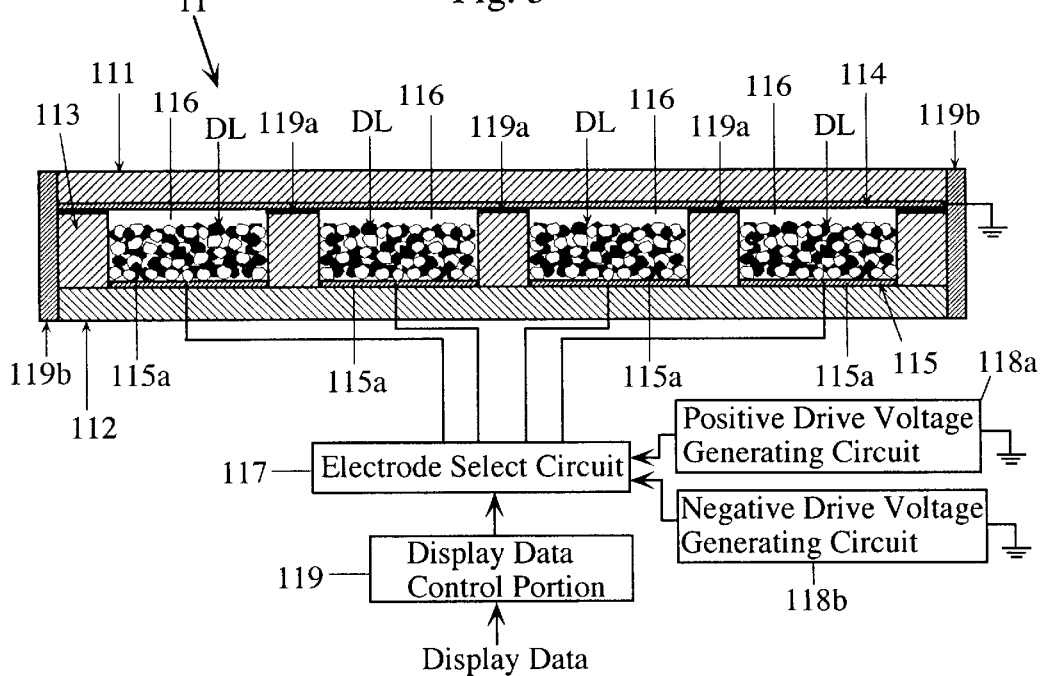
FIG. 3 is a cross section showing an example of a reversible image display medium with electrodes before display of the image.
Figure 4:
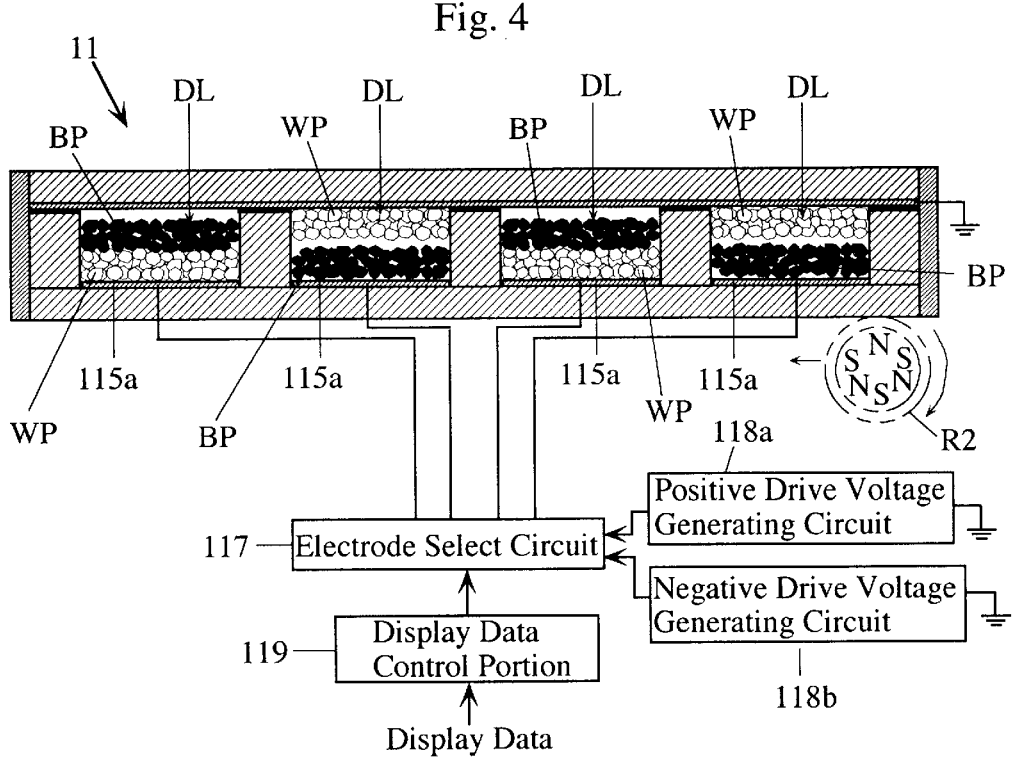
FIG. 4 is a cross section showing an image display state of the medium shown in FIG. 3.

FIGS. 3 and 4 show an example of the reversible image display medium. A medium 11 shown in FIGS. 3 and 4 includes first and second sheets 111 and 112. These sheets 111 and 112 are opposed to each other with a predetermined gap therebetween. A partition 113 is arranged between the sheets 111 and 112 for keeping a predetermined gap between the sheets. The partition 113 serves also as a spacer between the sheets 111 and 112. The partition 113 couples and fixes the sheets 111 and 112 together.

The first sheet 111 is formed of a light-transparent plate such as a glass plate, a transparent resin film or the like. The sheet 111 is located on the image observation side.

A first electrode 114 is formed on the inner surface of the sheet 111 opposed to the second sheet 112. The first electrode 114 extends continuously throughout an image display region of the inner surface of the sheet 111. The first electrode 114 is a transparent electrode made of, e.g., indium tin oxide (ITO).

The second sheet 112 is not essentially required to be transparent, but is formed of a light-transparent plate such as a glass plate, a resin film or the like.

The second sheet 112 is provided at its inner surface opposed to the first sheet 111 with a second electrode 115.

The second electrode 115 in this example is formed of a plurality of independent electrodes 115a arranged in a grid-like form. Each independent electrode is not essentially required to be transparent, but is formed of, e.g., a transparent ITO film.

Figure 5:
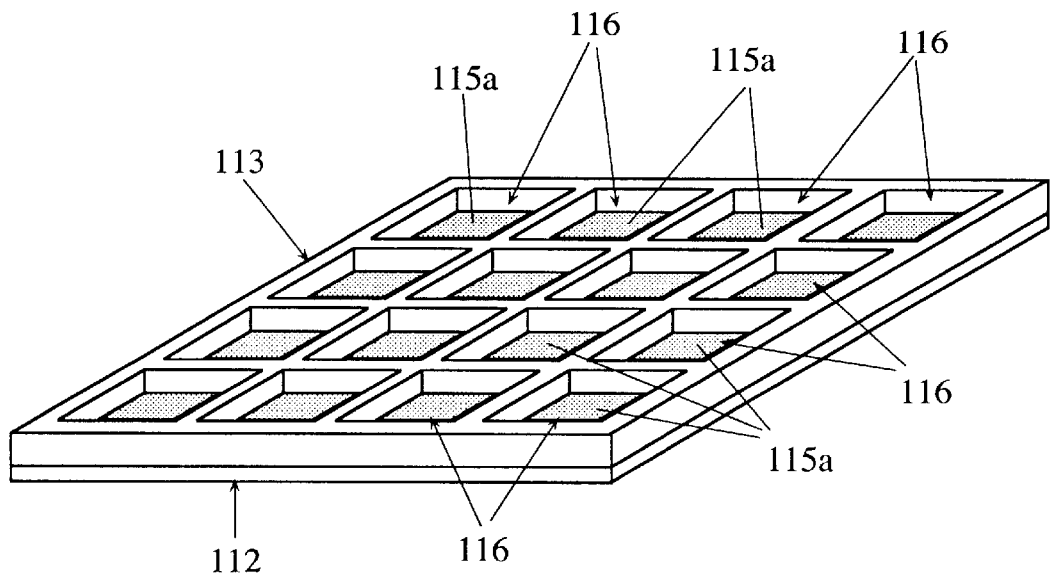
FIG. 5 is a perspective view of a second sheet in the medium shown in FIG. 3 as well as a structure including a grid-like partition formed on the second sheet.

The partition 113 arranged on the inner surface of the second sheet 112 has a grid-like form and a section extending perpendicularly to the inner surface, as shown in FIG. 5. Thereby, the partition 113 defines a plurality of developer accommodating cells. 116, each of which has a square form and is surrounded by a portion of the partition 113. One of the independent electrodes 115a is arranged in each cell 116. Thus, one cell corresponds to one pixel.

Each cell accommodates the dry developer DL including the white and black developer particles WP and BP, which are mutually and frictionally charged.

Each cell is sealed so that the developer DL does not leak from the cell.

The gap between the sheets, the height of the partition 113 and the distance between the first and second electrodes 114 and 115 are in a range from 20 $\mu$m to 1 mm, although not restricted thereto.

Figure 6:
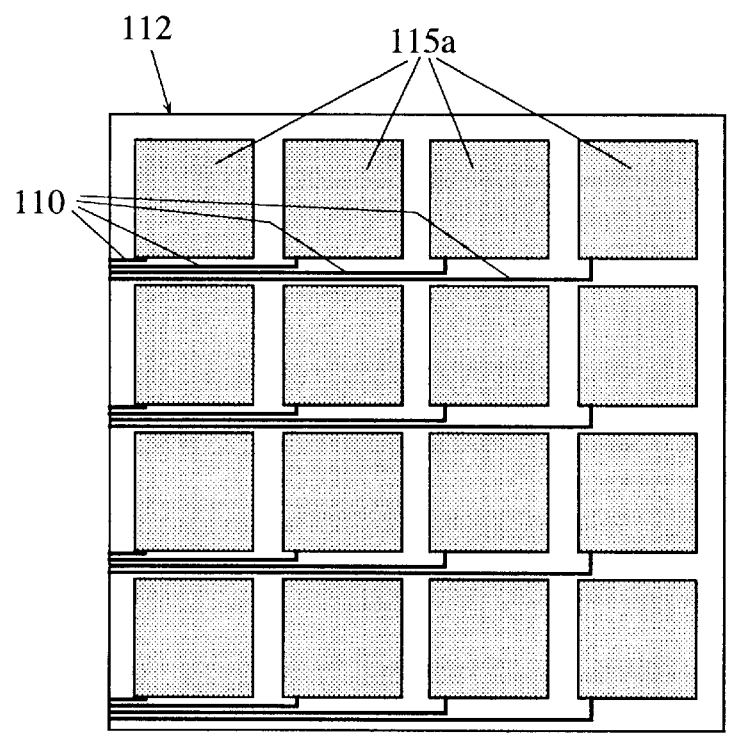
FIG. 6 is a plan showing the second sheet in the medium shown in FIG. 3 as well as independent electrodes formed on the second sheet.

The independent electrode 115a forming the second electrode 115 in the image display medium 11 is connected to or provided with a lead portion 110 as shown in FIG. 6, and is connected an electrode select circuit 117 through the lead portion as shown in FIG. 1. The electrode select circuit 117 is connected to a positive drive voltage generating circuit 118a, a negative drive voltage generating circuit 118b and a display data control portion 119. Each independent electrode 115a is independently supplied with a drive voltage from the electrode select circuit 117. The display data control portion 119 receives display data from display data output means (not shown) such as a computer, a word processor, a facsimile machine or the like, and controls the electrode select circuit 117 based on the supplied data. In other words, these electrode select circuit and others form an example of the electric field forming device or the image forming apparatus for the reversible image display medium provided with the electrodes.

Figure 7:
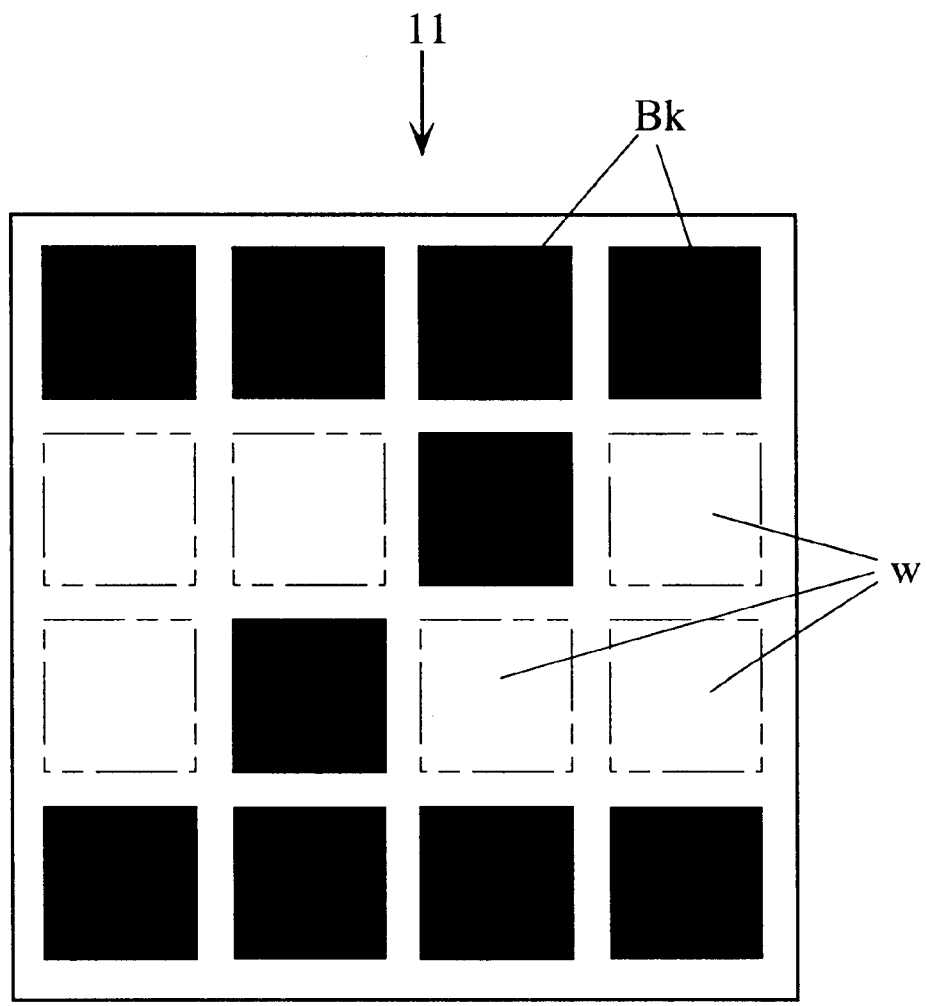
FIG. 7 shows an example of the image display on the medium shown in FIG. 3.

The first electrode 114 in the image display medium 11 is handled as the ground electrode, and the positive or negative drive voltage generating circuit 118a or 118b applies the predetermined voltage across the electrode 114 and each independent electrode 115a via the electrode select circuit 117, which is controlled to perform the desired image display by the display data control portion 119. Thereby, the predetermined electric field is formed for each pixel so that the developer particles WP and BP, which are mixed in the developer DL as shown in FIG. 3, move in accordance with the respective electric fields as shown in FIG. 4. In this manner, the image can be displayed in predetermined contrast. For example, image display can be performed as shown in FIG. 7. In FIG. 7, Bk indicates a portion displayed in black, W indicates a portion displayed in white.

A roller R2 shown in FIG. 4 will be described later.

Reversible Image Display Medium 12

Figure 8A:
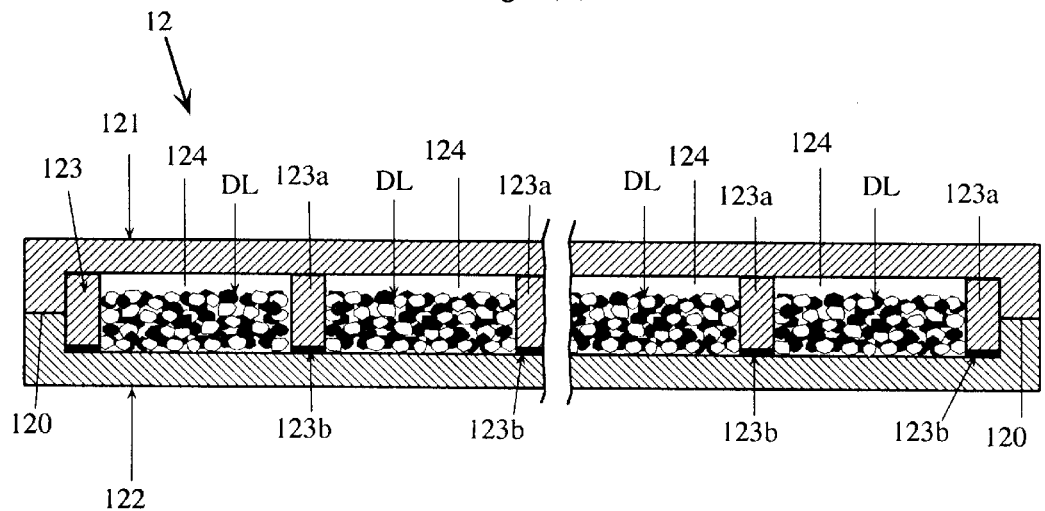
FIGS. 8(A) and 8(B) are cross sections showing another example of the reversible image display medium.
Figure 8B:
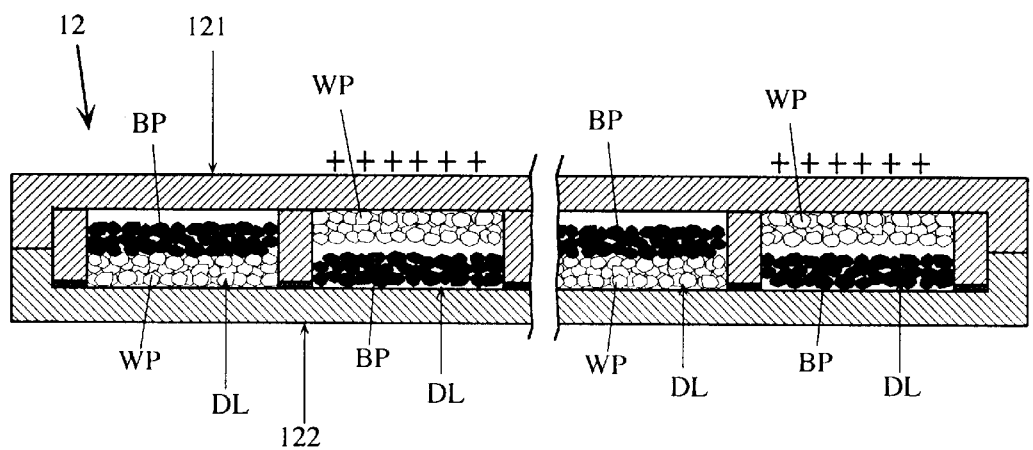
Figure 9:
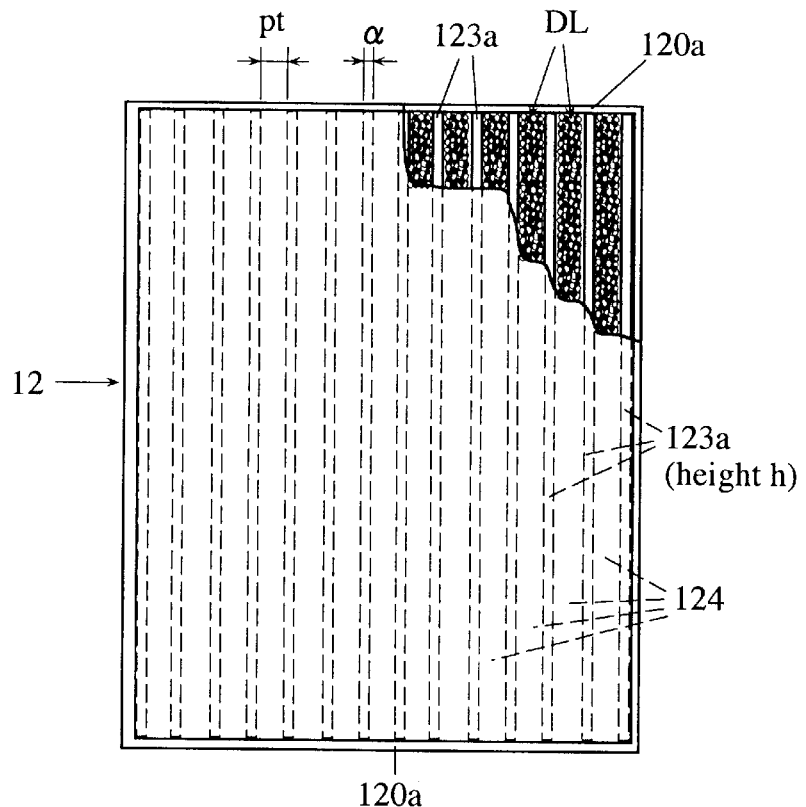
FIG. 9 is a plan showing the medium shown in FIG. 8 with a certain part cut away.

FIGS. 8(A), 8(B) and FIG. 9 show another example of the image display medium. FIG. 8(A) is a cross section of the reversible image display medium 12 before image display, and FIG. 8(B) is a cross section showing an example of the state during image display. FIG. 9 is a plan showing the medium 12 with a certain part cut away.

The image display medium 12 shown in FIGS. 8(A), 8(B) and FIG. 9 is rectangular as a whole, and includes first and second sheets 121 and 122 as well as a partition 123 between the sheets 121 and 122.

The first sheet 121 and the partition 123 are prepared by shaping a synthetic resin base member under an embossing pressure and a heat, and thus are integral with each other. At least the first sheet 121 is transparent, and is located on the image observation side. The second sheet 122 is likewise made of synthetic resin.

The partition 123 is formed of a plurality of longitudinal partition walls 123a, which extend parallel to the longitudinal side of the medium 12, and the developer accommodating cells 124 are formed between the neighboring longitudinal partition walls. Each cell 124 accommodates the developer DL including the white and black developer particles WP and BP, which are mutually frictionally charged.

At the periphery of the medium 12, the sheets 121 and 122 are heat-sealed to from a sealed portion 120. The sealed portion 120 includes portions 120a, which continue to the opposite ends of each longitudinal partition wall 123a, and thereby close the opposite ends of each cell, respectively. This portion 120a serves also as a partition wall defining the cell 124.

Each partition wall 123a has a width $\alpha$ and a height h, and is spaced by a distance pt from the longitudinal partition wall 123a neighboring thereto.

Each cell is sealed so that the developer DL does not leak from the cell.

The partition 123 (partition walls 123a) also serves as a spacer for maintaining a predetermined gap between the opposite sheets 121 and 122.

As already described, it is preferable that each of the sheets 121 and 122 has a thickness in a range from 5 $\mu$m to 100 $\mu$m, and the partition wall 123a has the height h (i.e., gap between the sheets) in a range from 20 $\mu$m to 300 $\mu$m. The whole thickness of the medium 12 is preferably in a range from 30 μm to 500 μm.

Preferably, the first sheet 121, on which the electrostatic latent image is to be formed, has a surface resistivity of $10^{10}$ ohm/square–$10^{16}$ ohm/square ($10^{10}$ Ω/□–$10^{16}$ Ω/□), and the second sheet 122 has a surface resistivity of $10^7$ ohm/square ($10^7$ Ω/□) or less.

Figure 11:
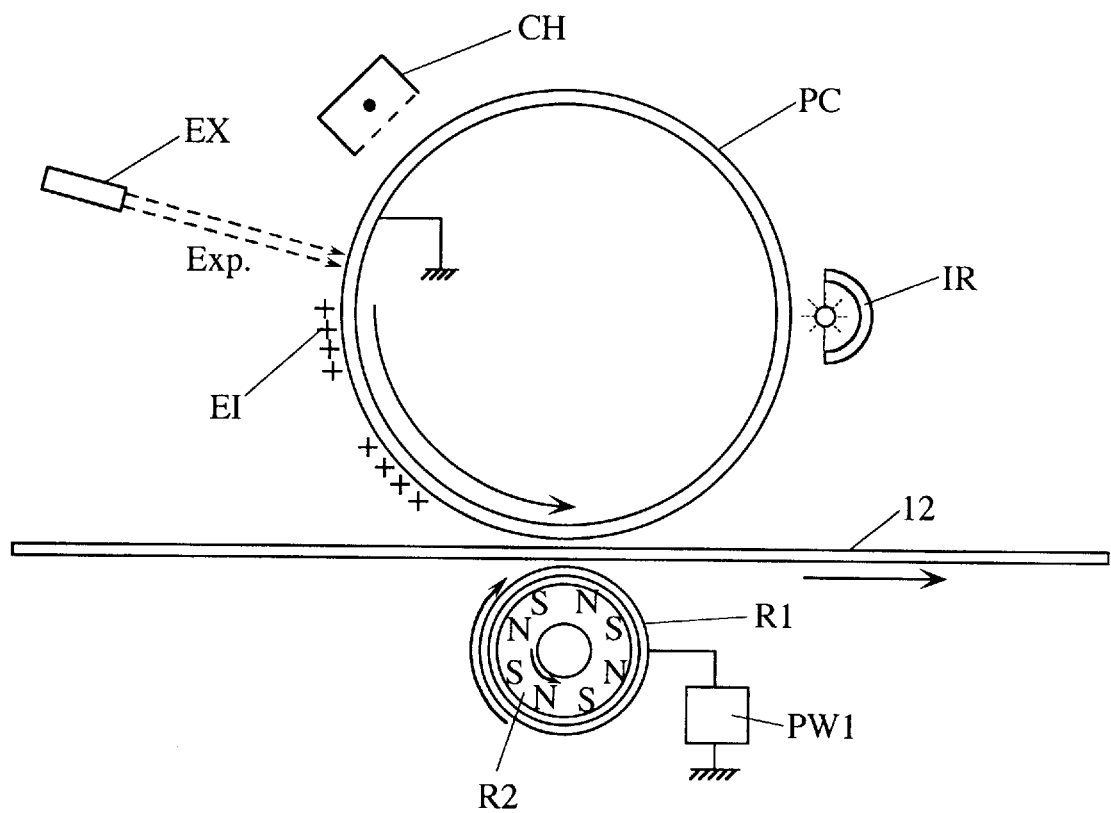
FIG. 11 shows by way of example a schematic structure of an image forming apparatus provided with an external electrostatic latent image forming device.

On the medium 12, an image forming apparatus, e.g., shown in FIG. 11 can display an image.

The image display device shown in FIG. 11 includes a photosensitive drum PC, which is driven to rotate in a direction indicated by an arrow in FIG. 11. Around the photosensitive drum PC, a Scorotron charger CH, a laser image exposure device EX and an eraser lamp IR are arranged. An electrode roller R1 which is driven to rotate is arranged under the photosensitive drum PC. The electrode roller R1 is a development electrode roller which can form an electrostatic field for the image display. The roller R1 is supplied with a bias voltage from a power source PWI. The roller R1 may be internally provided with a rotary magnetic pole roller R2, which is driven to rotate in the opposite direction with respect to the roller R1, or is driven to perform rotational reciprocation.

After charging the surface of the photosensitive drum PC by the charger CH, the exposure device EX performs the image exposure on the charged region to form an electrostatic latent image EI on the drum PC. The electrode roller R1 is supplied with a bias from the power source PWI.

In synchronization with the electrostatic latent image EI on the photosensitive drum PC, the medium 12 is fed to a position between the drum PC and the electrode roller R1.

Figure 10:
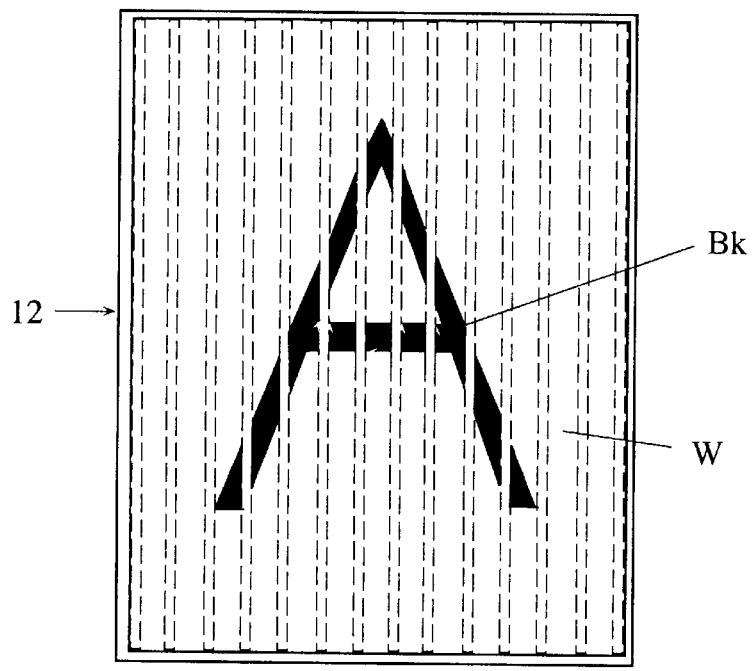
FIG. 10 shows an example of the image display on the medium shown in FIG. 8.

In this manner, a predetermined electrostatic field is formed for each pixel and is applied to the developer particles BP and WP of the developer DL accommodated in each cell 124 of the medium 12. Thereby, the Coulomb force acting between the electrostatic field and the charged developer particles moves the developer particles. The white and black particles WP and BPL, which are mixed in the developer D as shown in FIG. 8(A), move in accordance with the electric field as shown in FIG. 8(B). In this manner, the image can be displayed in predetermined contrast. For example, the image display can be performed as shown in FIG. 10. In FIG. 10, Bk represents a black displayed portion, and W indicates a white displayed portion.

After the image display described above, the eraser lamp IR erases the charges on the surface of the photosensitive drum PC for the next printing.

If the magnetic pole roller R2 is employed and rotated in the above image display operation, it stirs the developer DL in each cell 124 to promote the movement of the developer particles BP and WP so that the image can be displayed in further improved state, and the required drive voltage can be low.

The rotary magnetic pole roller R2 may likewise employed for the medium 11 shown in FIG. 3.

Reversible Image Display Medium 13

Figure 12:
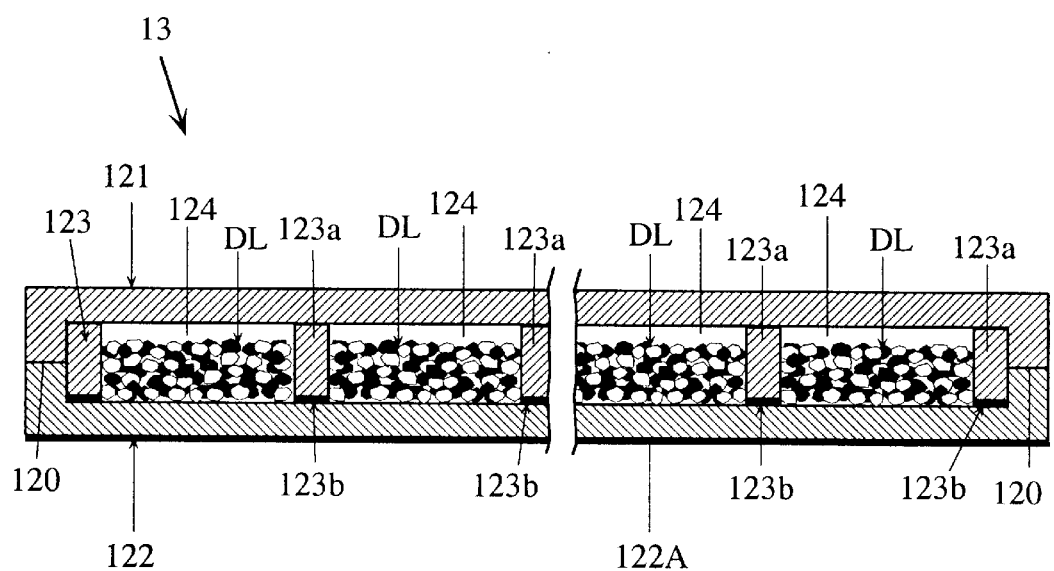
FIG. 12 is a cross section showing still another example of the reversible image display medium.

FIG. 12 is a cross section of still another example of the reversible image display medium. A image display medium 13 shown in FIG. 12 is the same as the medium 12 shown in FIG. 8(A) except for that an electrically conductive film 122A is formed on the outer surface of the second sheet 122 of the medium 12. The same portions bear the same reference numbers.

On this medium 13, the image formed, e.g., by the image forming apparatus shown in FIG. 11 can be displayed in predetermined contrast. Instead of electrode roller R1, the conductive film 122A on the surface of the second sheet 122 may be grounded.

Other Reversible Image Display Mediums

The following reversible image display mediums may also be employed.

(a) A medium having the same structure as one of the mediums 11–13 except for that the developer accommodating cell has another form selected from those shown in FIGS. 1(A)–1(I).

(b) A medium having the same structure as one of the mediums 11–13 except for that the developer accommodating cell is provided with the developer movement suppressing member selected from those shown in FIGS. 2(A)–2(H).

(c) A medium employing the developer accommodating cell other than those employed in the mediums 11–13, and employing any one of the developer movement suppressing members.

Each of the image display mediums already described with reference to the drawings or in the foregoing items (a)–(c) can repeat the image display and the image erasure. The developer particles WP and BP are contained in the cell, and it is not necessary to supply externally the developer into the cell. Thereby, it is possible to suppress significantly the use of mediums such as paper sheets and consumable materials such as developer, which are required for image display in the prior art. Since a heat energy for melting and fixing the toner onto the medium is not required in contrast to the conventional image display, the image forming energy can be reduced. Accordingly, it is possible to satisfy the present demand for reduction in environmental loads.

Since each of the mediums 11, 12 and 13 employs the dry developer DL including developer particles WP and BP of different colors, one kind of the developer particles WP (or BP) can hide the other kind of developer particles BP (or WP) to a higher extent so that the image display in higher contrast can be achieved.

The developer particles WP and BP accommodated in the cell are charged to the different polarities, respectively, and therefore can be easily moved for image display by the Coulomb force applied thereto. This also improves the contrast for image display, and can suppress remaining of the last image.

Further, employment of the dry developer DL can suppress settling and condensation of the developer particles so that lowering in contrast for the image display can be suppressed, and the image display can be stably performed for a long time. Since the settling and condensation of the developer particles are suppressed, remaining of the last displayed image can be suppressed. Since the change in quality with time is suppressed in the dry developer DL, this also allows stable image display for a long time.

Since each pixel can be small in size in the mediums 12 and 13 without an electrode, this allows image display in high resolution.

Owing to the above, the image display can be stably performed in good contrast, high resolution and high quality for a long time.

Then, further specific examples of the reversible image display medium as well as image display using them ill now be described.

EXAMPLE 1

The medium of the example 1 has the structure of the reversible image display medium, which is provided with the electrodes and is of the type shown in FIGS. 3 to 7, and is further configured as follows.

The first sheet 111 has a thickness of 100 μm, and is formed of film of PET (polyethylene terephthalate). The first electrode 114, which is formed of an ITO film and has a thickness of 500 Å, is formed on the whole surface of the first sheet 111 by a sputtering method.

Then, photoresist is applied to a PET film provided with an aluminum vapor-deposited layer on its whole surface. This photoresist film is patterned by exposure, development and etching, and then the photoresist layer is removed so that the second sheet 112 having the independent pixel electrodes 115a, which are arranged in two dimensions, is formed.

In a group of the transparent independent pixel electrodes 151a thus formed, square electrodes each having a side of 5 mm are arranged in a grid-like form with a space of 0.5 mm therebetween, e.g., as shown in FIG. 6. Lead portions 110 are patterned and connected to the independent electrodes for applying the voltages thereto, respectively.

A thick resist is repetitively applied onto a portion f the second sheet 112 other than the independent electrodes (i.e., portions between and around the independent electrodes) to form the grid-like partition 113 of 90 $\mu$m in height (see FIG. 5). Each concavity defined by the grid-like partition 113 is used as a space of the cell 116, in which developer DL filling 90% of its height is arranged. The developer DL is one kind of the developer DL (DLo) already exemplified, and contains the white developer particles WP (WP3, 10.1 $\mu$m) and the black developer particles BP (BPo, 25.0 $\mu$m).

Photo-setting adhesive 119a of a small thickness is applied onto only an upper portion of the partition 113, and then the first sheet 111 is intimately attached thereto, and is adhered thereto by irradiating the adhesive with ultraviolet light for setting it.

Thereafter, the peripheries of the first and second sheets 111 and 112 are sealed with an epoxy adhesive 119b as shown in FIG. 3 and others so that the reversible image display medium of the example 1 is completed.

As a comparative example for this medium 11, a comparative example medium E1 was also formed similarly to the medium 11 except for that each cell was filled with the foregoing developer liquid dl without gas bubbles.

Among the independent electrodes 115a in the medium of the example 1 described above, +100 V was applied to the electrodes corresponding to the pixels, which were to be displayed in black, and −100 V was applied to the electrodes, which were to be displayed in white. In the manner described above, the voltages corresponding to the display data were applied so that the desired image display could be performed, e.g., as shown in FIG. 7.

Similarly to the medium of the example 1, voltages of +100 V and −100 V were applied to the comparative image display medium E1 (not shown) for image display, and the image contrast thereof was evaluated together with the example 1.

For the evaluation of the contrast, the image densities of the black portion Bk and the white portion W were measured by a reflective densitometer (manufactured by KONIKA Co., Ltd., SAKURA DENSITOMETER PDA-65), and the evaluation was made based on the ratio of BK/W. If the reflective density ratio was 10.0 or more, the evaluation result was good (double circle). If it was equal to or larger than 7.0, and was smaller than 10.0, the evaluation result was allowable (circle). If it was smaller than 7.0, the result was unacceptable (X). Other evaluation, described later was performed under the same conditions unless otherwise specified.

The results of evaluation were as follows.
Medium of Example 1

The reflective density (BK) of the black portion was 1.5, and the reflective density (W) of the white portion was 0.1 so that the reflective density ratio was 15.0 and thus allowable (double circle).

COMPARATIVE EXAMPLE MEDIUM E1

The reflective density of the black portion was 0.6, and the reflective density of the white portion was 0.1 so that the reflective density ratio was 6.0 and thus unacceptable (x).

EXAMPLE 2

The medium of the example 2 has the structure of the reversible image display medium, which is not provided with the electrode and is of the type shown in FIGS. 8(A) to 10, and is further configured as follows.

The first sheet 121 having an average thickness of 25 $\mu$m and the partition 123, which are formed of the plurality of parallel partition walls 123a, are integrally prepared by shaping a transparent PET base member under an embossing pressure and a heat. Each partition wall 123a has a width $\alpha$ of 20 $\mu$m and a height h of 100 $\mu$m, and is spaced by a distance pt of 200 $\mu$m from the neighboring wall.

Each cell 124 defined between the neighboring partition walls 123a accommodates the developer DL filling 90% of its height. A photosetting adhesive 123b is applied only to the upper portion of the partition 123, and the second sheet 122 of 25 $\mu$m in thickness is intimately placed on the partition 123. The adhesive is then set by irradiation with ultraviolet light. The peripheries of the sheets 121 and 122 is heat-sealed to form the sealed portion 120. In this manner, the reversible image display medium of the example 2 is formed.

The developer DL (DLo) already described is used, and thus includes the white developer particles WP (WP3, 10.1 $\mu$m) and the black developer particles BP (BPo, 25.0 $\mu$m).

EXAMPLE 3

The medium of the example 3 has the same structure as the medium 12 of the example 2 except for that a conductive film 122A is formed on the outer surface of the second sheet 122 by vapor deposition of aluminum as shown in FIG. 12.

On the mediums of the examples 2 and 3, images were displayed by the image forming apparatus shown in FIG. 11 in the following manner.

The charger CH charged the surface of the photosensitive drum PC to +1000 V, and the electrostatic latent image E1 was formed on the charged region by the image exposure. Also, a bias of +500 V was applied to the electrode roller R1, and the medium 12 was moved through a position between the photosensitive drum PC and the electrode roller R1. In this operation, a peripheral speed ratio $\theta$ between the photosensitive drum PC and the opposite electrode roller R1 was constant and equal to 1 ($\theta$=1).

In this manner, the image shown in FIG. 10 could be displayed.

As a comparative example for the mediums of the examples 2 and 3, a comparative example medium E2 (not shown) was also formed similarly to the medium of the example 2 except for that each cell was filled with the foregoing developer liquid dl without gas bubbles.

The image forming apparatus shown in FIG. 11 was used to perform the image display on the mediums of the examples 2 and 3 as well as the comparative medium E2, and the evaluation of the image contrast was performed.

The results of evaluation were as follows.

Medium of the Example 2

The reflective density (BK) of the black portion was 1.5, and the reflective density (W) of the white portion was 0.1 so that the reflective density ratio was 15.0 and thus allowable (double circle).

Medium of the Example 3

The reflective density (BK) of the black portion was 1.6, and the reflective density (W) of the white portion was 0.1 so that the reflective density ratio was 16.0 and thus allowable (double circle).

COMPARATIVE EXAMPLE MEDIUM E2

The reflective density of the black portion was 0.6, and the reflective density of the white portion was 0.1 so that the reflective density ratio was 6.0 and thus unacceptable (x).

Description will now be given on the mediums of the examples 4–9 and mediums E3 and E4 of the comparative examples. These examples 4–9 represent the fact that the rate Sn/So of the area Sn of the non-image portion with respect to the unit area So in the image display medium is preferable in a range from 0.0001 to 0.5, and thus the aforementioned value of (1−Sa/Sb) is preferably in a range from 0.0001 to 0.5.

EXAMPLE 4

The medium of this example has the substantially same structure as the medium of the example 2, in which the partition wall has the thickness α of 20 μm and is spaced by the distance pt of 200 μm from the neighboring wall, and exhibits the ratio Sn/So equal to 0.091.

Figure 13A:
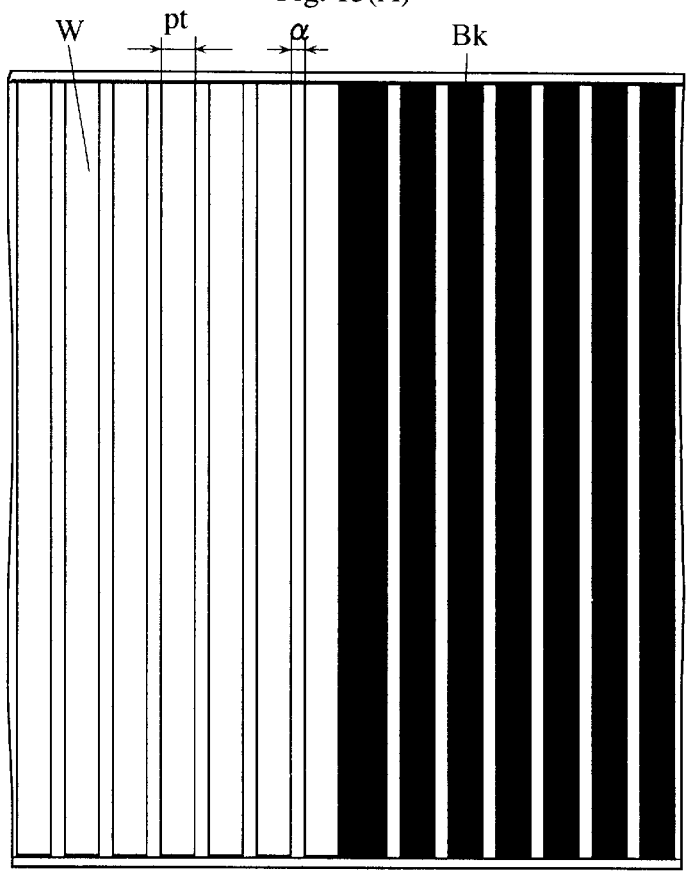
FIG. 13(A) is a plan showing further another example of the image display.

For the evaluation of the image contrast, the image forming apparatus shown in FIG. 11 was used to display the image, which included the black portion Bk and the white portion W on the right and left halves as shown in FIG. 13(A), respectively. For the image formation, the charger CH charged the surface of the photosensitive drum PC to +1000 V, and the electrostatic latent image E1 was formed on the charged region by the image exposure. Also, a bias of +500 V was applied to the electrode roller R1, and the medium 12 was moved through a position between the photosensitive drum PC and the electrode roller R1. In this operation, a peripheral speed ratio θ between the photosensitive drum PC and the opposite electrode roller R1 was constant and equal to 1 (θ=1).

The result of the image contrast evaluation was as follows. The reflective density of the black portion was 1.65, and the reflective density of the white portion was 0.133 so that the reflective density ratio (Bk/W) was 12.4 and thus allowable (double circle).

EXAMPLE 5

The medium of this example has the substantially same structure as the medium of the example 2 except for that the developer accommodating cells have the forms and are arranged as shown in FIG. 1(D), the partition wall defining the cell has the thickness (width) α of 20 μm, is spaced by the distance pt of 200 μm from the neighboring partition wall (i.e., the cell has the sizes of 200 μm×200 μm), and Sn/So is equal to 0.174.

On this medium, the image was formed by the image forming apparatus under the image forming conditions, which were the same as the device and conditions for the medium of the example 4.

The result of the image contrast evaluation was as follows. The reflective density of the black portion was 1.52, and the reflective density of the white portion was 0.135 so that the reflective density ratio (Bk/W) was 11.2 and thus allowable (double circle).

EXAMPLE 6

The medium of this example has the substantially same structure as the medium (having the grid-like cells) of the example 1 except for that the cell has the space sizes of 200 μm×200 μm, the partition wall 113 defining the cell has the thickness (width) of 20 μm, and Sn/So is equal to 0.174.

On this medium, the image similar to that shown in FIG. 13(A) was formed by the image forming apparatus under the image forming conditions, which were the same as the device and conditions for the medium of the example 1.

The result of the image contrast evaluation was as follows. The reflective density of the black portion was 1.59, and the reflective density of the white portion was 0.135 so that the reflective density ratio (Bk/W) was 11.8 and thus allowable (double circle).

EXAMPLE 7

The medium of this example has the substantially same structure as the medium of the example 2 except for that developer movement suppressing members each having sizes of β1×β2=60 μm×10 μm are arranged similarly to the structure shown in FIG. 2(A), each suppressing member is disposed in the medium unit area of γ1×γ2=1000 μm×800 μm, and Sn/So is equal to 0.0008.

On this medium, the image was formed by the image forming apparatus under the image forming conditions, which were the same as the device and conditions for the medium of the example 4.

The result of the image contrast evaluation was as follows. The reflective density of the black portion was 1.80, and the reflective density of the white portion was 0.130 so that the reflective density ratio (Bk/W) was 13.8 and thus allowable (double circle).

EXAMPLE 8

The medium of this example has the substantially same structure as the medium of the example 2 except for that developer movement suppressing members each having sizes of β1×β2=60 μm×10 μm are arranged similarly to the structure shown in FIG. 2(F), each suppressing member is spaced by the distance of δ=1000 μm from the neighboring member, and Sn/So is equal to 0.101.

On this medium, the image was formed by the image forming apparatus under the image forming conditions, which were the same as the device and conditions for the medium of the example 4.

The result of the image contrast evaluation was as follows. The reflective density of the black portion was 1.63, and the reflective density of the white portion was 0.133 so that the reflective density ratio (Bk/W) was 12.3 and thus allowable (double circle).

EXAMPLE 9

The medium of this example has the substantially same structure as the medium of the example 2 except for that developer accommodating cells have the forms and are arranged as shown in FIG. 1(D), the partition wall defining the cell has the thickness (width) α of 50 μm, is spaced by the distance pt of 150 μm from the neighboring partition wall (i.e., the cell has the sizes of 150 μm×150 μm), the suppressing members each having sizes of β1×β2=60 μm×10 μm are disposed at a rate of one for each cell, and Sn/So is equal to 0.468.

On this medium, the image was formed by the image forming apparatus under the image forming conditions, which were the same as the device and conditions for the medium of the example 4.

The result of the image contrast evaluation was as follows. The reflective density of the black portion was 1.03, and the reflective density of the white portion was 0.144 so that the reflective density ratio (Bk/W) was 7.2 and thus acceptable (circle).

COMPARATIVE EXAMPLE MEDIUM E3

The medium of this example has the substantially same structure as the medium of the example 2 except for that developer movement suppressing members each having sizes of β1×β2=20 μm×20 μm are arranged similarly to the structure shown in FIG. 2(H), each suppressing member is disposed in the medium unit area of γ1×γ2=5000 μm×2000 μm, and Sn/So is equal to 0.00004.

On this medium, the image was formed by the image forming apparatus under the image forming conditions, which were the same as the device and conditions for the medium of the example 4.

The result of the image contrast evaluation was as follows. The reflective density of the black portion was 0.90, and the reflective density of the white portion was 0.186 so that the reflective density ratio (Bk/W) was 4.8 and thus unacceptable (x).

Irregularities in density were present in both the black and white solid image portions.

COMPARATIVE EXAMPLE MEDIUM E4

The medium of this example has the substantially same structure as the medium of the example 2 except for that the partition wall has the thickness α of 160 μm, is spaced by the distance pt of 140 μm from the neighboring partition wall, and Sn/So is equal to 0.53.

On this medium, the image was formed by the image forming apparatus under the image forming conditions, which were the same as the device and conditions for the medium of the example 4.

The result of the image contrast evaluation was as follows. The reflective density of the black portion was 0.84, and the reflective density of the white portion was 0.146 so that the reflective density ratio (Bk/W) was 5.8 and thus unacceptable (x).

Solid black image portions to be formed between the partition walls were displayed merely as stipes.

The structures of the mediums of the examples 4–9 are represented in the following table 1.

The results of image contrast evaluation relating to the mediums of the examples 4–9 as well as the mediums E3 and E4 of the comparative examples are represented in the following table 2.

TABLE 1

|  |  | Structure | Non-Image Portion Area ratio | Unit Cell | Partition Thickness | Developer Movement Suppressing Member | distance δ |
|---|---|---|---|---|---|---|---|
| Example | 4 | Continuous Groove Cell | 0.091 | Unit Cell Width 220 μm | 20 μm |  |  |
|  | 5 | Independent Cell | 0.174 | 220 μm × 220 μm | 20 μm |  |  |
|  | 6 | Independent Cell with Electrode | 0.174 | 220 μm × 220 μm | 20 μm |  |  |
|  | 7 | Developer Movement Suppressing Member | 0.0008 | 1000 μm × 800 μm |  | 60 μm × 10 μm |  |
|  | 8 | Continuous Groove Cell + Suppressing Member | 0.101 | Unit Cell Width 220 μm | 20 μm | 60 μm × 10 μm | 1000 μm |
|  | 9 | Independent Cell + Suppressing Member | 0.468 | 200 μm × 200 μm | 50 μm | 60 μm × 20 μm |  |
| Comparative Example | E3 | Independent Suppressing Member | 0.00004 | 5000 μm × 2000 μm | 20 μm |  |  |
|  | E4 | Continuous Groove Cell + Thick Partition | 0.533 | Unit Cell Width 300 μm | 160 μm |  |  |

TABLE 2

|  |  | Structure | Non-Image Portion Area ratio | Evaluation | Contrast | Reflective density Black | Reflective density White |
|---|---|---|---|---|---|---|---|
| Example | 4 | Continuous Groove Cell | 0.091 | ◉ | 12.4 | 1.65 | 0.133 |
|  | 5 | Independent Cell | 0.174 | ◉ | 11.2 | 1.52 | 0.135 |
|  | 6 | Independent Cell with Electrode | 0.174 | ◉ | 11.8 | 1.59 | 0.135 |
|  | 7 | Developer Movement Suppressing Member | 0.0008 | ◉ | 13.8 | 1.80 | 0.130 |
|  | 8 | Continuous Groove Cell + Suppressing Member | 0.101 | ◉ | 12.3 | 1.63 | 0.133 |
|  | 9 | Independent Cell + Suppressing Member | 0.468 | ○ | 7.2 | 1.03 | 0.144 |

TABLE 2-continued

|  | Structure | Non-Image Portion Area ratio | Evaluation | Contrast | Reflective density Black | Reflective density White |
|---|---|---|---|---|---|---|
| Comparative Example | E3 Independent Suppressing Member | 0.00004 | X | 4.8 | 0.90 | 0.186 |
|  | E4 Continuous Groove Cell + Thick Partition | 0.533 | X | 5.8 | 0.84 | 0.146 |

Figure 13B:
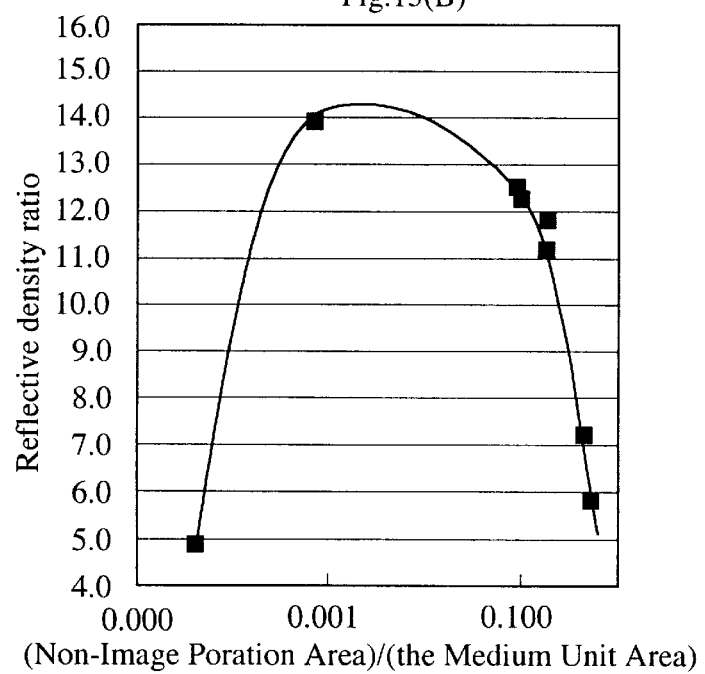
FIG. 13(B) is a graph showing a relationship between a non-image portion area rate of (non-image portion area)/(medium unit area) and a reflection density ratio.

FIG. 13(B) is a graph showing a relationship between the rate of (non-image portion area)/(the medium unit area) and the reflective density ratio.

According to the image display mediums of the examples 4 to 8, images which exhibited high contrast and included no image irregularity were obtained. The image display medium of the example 9 could achieve practically allowable image display although the contrast was slight low, because the rate of the non-image portion area was high.

In the comparative example medium E3, the rate of the non-image portion was excessively small. Therefore, the gap between the sheets could not be sufficiently kept so that image irregularities occurred. Further, the reflective density of the black portion lowered, and the reflective density of the white portion increased. These were observed.

In the comparative example medium E4, the rate of the non-image portion was excessively large so that the sufficient contrast could not be obtained. This was caused by the fact that the solid black portion was displayed as black/white stripes so that the reflective density of the black display lowered. Further, the reflective density of the non-image region was large in the white display so that the reflective density of the sold white increased.

In the reversible image display medium, it is preferable that each sheet has the thickness of 5 $\mu$m–100 $\mu$m, the gap between the sheets is equal to 20 $\mu$m–300 $\mu$m, the whole thickness is equal to 30 $\mu$m to 500 $\mu$m, one of the two sheets has the surface resistivity of $10^{10}$ ohm/square–$10^{16}$ ohm/square on its outer surface, and the other sheet has the surface resistivity of $10^7$ ohm/square or less. Description will now be given on mediums of examples 10–21 and the comparative example mediums E5–E12 for showing the above.

EXAMPLES 10–14, COMPARATIVE EXAMPLE MEDIUMS E5–E8

The mediums have the substantially same structures as the medium of the example 2, in which each sheet has the thickness of 25 $\mu$m and is spaced from the other sheet by 100 $\mu$m, but differ from each other in the surface resistivities of the first and second sheets 121 and 122.

In these mediums as well as mediums of examples 15–21, which will be described later, the surface resistivity of the first sheet 121 is controlled by applying a surface active agent to the sheet surface. The surface resistivity of the second sheet 122 is controlled by changing a content of the conductive carbon added to the material of the sheet 122. The surface resistivity was measured in accordance with the measuring method ASTM D-257 in an environment of 65% RH.

The mediums of the examples 10–14 and the comparative example mediums E5–E5 are represented in the table 3.

EXAMPLE 15

The medium of this example is substantially the same as the medium of the example 3, which has the aluminum vapor-deposited film on the second sheet, except for that the first sheet 121 has the surface resistivity of $1.20 \times 10^{15}$ ohm/square ($1.20 \times 10^{15}$ $\Omega/\square$), and the second sheet 122 has the surface resistivity of $8.50 \times 10^{-1}$ ohm/square ($8.50 \times 10^{-1}$ $\Omega/\square$).

EXAMPLES 16–21 AND COMPARATIVE EXAMPLE MEDIUMS E9–E12

The mediums have the substantially same structures as the medium of the example 15, but differ from each other in the sheet thickness and the gap between the sheets, although each sheet has the same surface resistivity.

The mediums of the examples 16–21 and the comparative example mediums E9–E12 are represented in the table 3.

TABLE 3

| Reversible Image Display Medium | 1st Sheet (On Image Display Side) | | 2nd Sheet (Opposite Side) | | Gap $\mu$m |
|---|---|---|---|---|---|
|  | Thickness $\mu$m | Surface Resistivity $\Omega$ | Thickness $\mu$m | Surface Resistivity $\Omega$ |  |
| Example 10 | 25 | $1.2 \times 10^{15}$ | 25 | $2.20 \times 10^6$ | 100 |
| Example 11 | 25 | $4.20 \times 10^{13}$ | 25 | $1.20 \times 10^4$ | 100 |
| Example 12 | 25 | $2.20 \times 10^{11}$ | 25 | $4.20 \times 10^2$ | 100 |
| Comparative Example E5 | 25 | $2.30 \times 10^9$ | 25 | $4.20 \times 10^6$ |  |
| Comparative Example E6 | 25 | $2.30 \times 10^9$ | 25 | $1.10 \times 10^8$ | 100 |
| Comparative Example E7 | 25 | $1.20 \times 10^{15}$ | 25 | $1.20 \times 10^8$ | 100 |
| Example 13 | 25 | $1.10 \times 10^{10}$ | 25 | $1.00 \times 10^7$ | 100 |
| Comparative Example E8 | 25 | $2.30 \times 10^9$ | 25 | $4.20 \times 10^2$ | 100 |
| Example 14 | 25 | $2.20 \times 10^{11}$ | 25 | $3.50 \times 10^5$ | 100 |
| Example 15 | 25 | $1.20 \times 10^{15}$ | 25 | $8.50 \times 10^4$ | 100 |
| Example 16 | 5 | $1.20 \times 10^{15}$ | 5.2 | $8.50 \times 10^4$ | 100 |
| Comparative Example E9 | 4.5 | $1.20 \times 10^{15}$ | 4.3 | $8.50 \times 10^4$ | 100 |
| Example 17 | 50 | $1.20 \times 10^{15}$ | 50 | $8.50 \times 10^4$ | 100 |
| Example 18 | 100 | $1.20 \times 10^{15}$ | 98 | $8.50 \times 10^4$ | 100 |
| Comparative Example E10 | 105 | $1.20 \times 10^{15}$ | 110 | $8.50 \times 10^4$ | 100 |
| Example 19 | 25 | $1.20 \times 10^{15}$ | 25 | $8.50 \times 10^4$ | 20 |
| Comparative Example E11 | 25 | $1.20 \times 10^{15}$ | 25 | $8.50 \times 10^4$ | 10 |
| Example 20 | 25 | $1.20 \times 10^{15}$ | 25 | $8.50 \times 10^4$ | 200 |
| Example 21 | 25 | $1.20 \times 10^{15}$ | 25 | $8.50 \times 10^4$ | 300 |
| Comparative Example E12 | 25 | $1.20 \times 10^{15}$ | 25 | $8.50 \times 10^4$ | 350 |

Figure 16A:
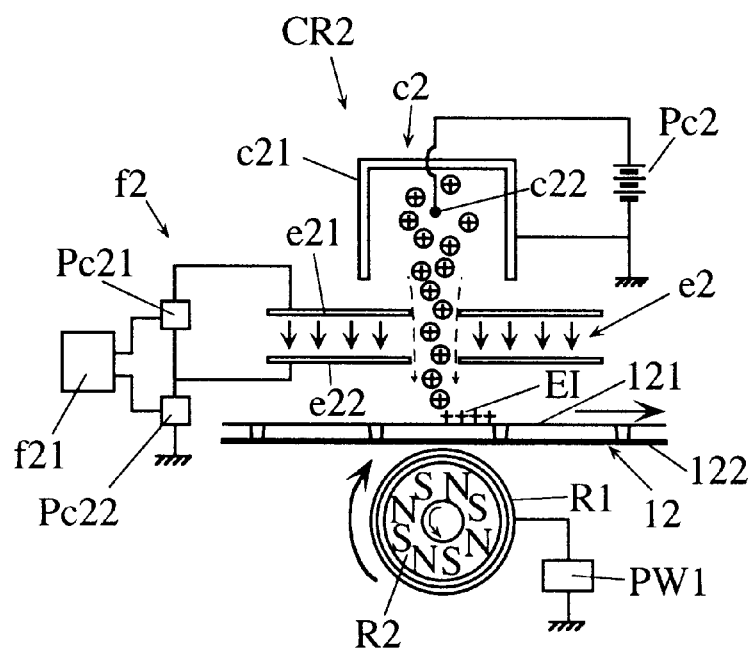
FIGS. 16(A) and (B) show a schematic structure of still another example of the image forming apparatus provided with the direct electrostatic latent image forming device of the ion flow type.
Figure 16B:
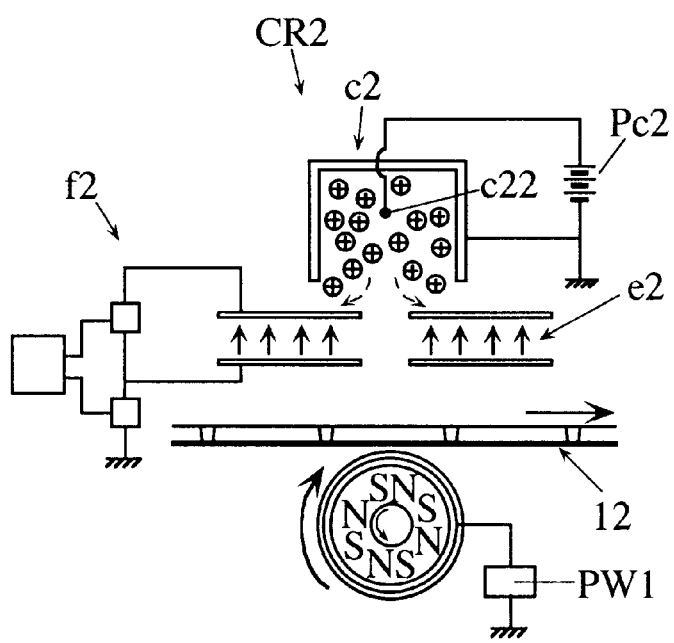

On each of the mediums of the examples 10–21 and the comparative example mediums E5–E12, the image shown in FIG. 13(A) was formed by the image forming apparatus shown in FIGS. 16(A) and 16(B), and the image contrast was evaluated. The image forming apparatus shown in FIGS. 16(A) and 16(B) utilizes a direct electrostatic latent image forming device of an ion flow type. This will be described later.

The evaluation was performed as follows. The maximum and minimum reflective densities were measured from each of the black and white portions, and the average reflective density of each of the black and white portions Bk and W was obtained. From the average reflective density, the reflective density ratio was obtained, and the evaluation was performed based on the ratio thus obtained. In this case, the reflective density ratio of 10.0 or more was evaluated as acceptable (circle), and the ratio smaller than 10.0 was evaluated as unacceptable (x).

The image irregularities were also evaluated. For the evaluation of the image irregularities, the reflective density of the black portion was measured by the reflective densitometer (manufactured by KONIKA Co., Ltd., SAKURA DENSITOMETER PDA-65), and a difference between the maximum and minimum values of the image density was obtained. If the image density difference was equal to 0.2 or less, the evaluation result was allowable (circle). If it was smaller than 0.2, the result was unacceptable (X).

The results of the above evaluation are represented in the table 4, in which unacceptabilty or failure marks are also shown for the unacceptable contrast.

In the table 4, "max/d*" represents Maximum Reflective density. "min/d*" represents Minimum Reflective density. "avr/d*" represents Average Reflective density. "Contrast*" represents (Average Reflective density of Black Portion)/(Average Reflective density of White Portion). "Irregularities*" represents (Maximum Reflective density of Black Portion)−(Minimum Reflective density of Black Portion)

sheets is provided with the conductive film, and the electrode is not employed, similarly to the medium 13 shown in FIG. 12.

Figure 14:
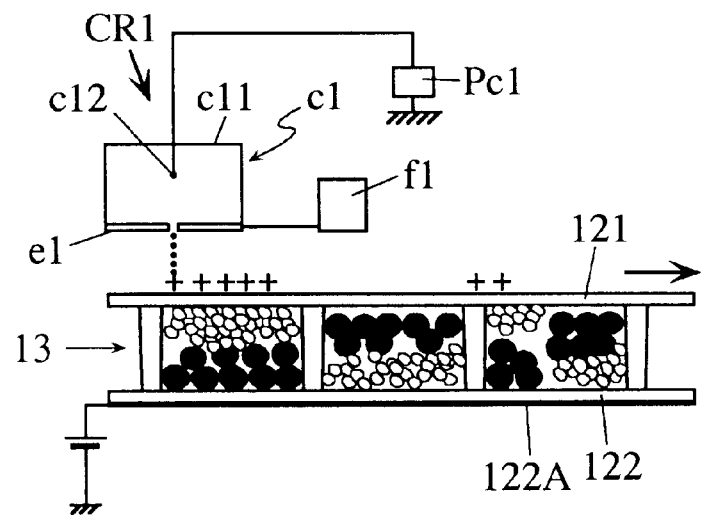
FIG. 14 shows a schematic structure of an example of an image forming apparatus provided with a direct electrostatic latent image forming device of an ion flow type.

The image forming apparatus shown in FIG. 14 is provided with a direct electrostatic latent image forming device CR1 of the ion flow type. The device CR1 includes a corona ion generating portion c1 for generating corona ions, a write electrode e1 for leading the corona ions generated by the generating portion c1 to the surface of the sheet 121, and a write electrode control circuit f1 for applying to the write electrode e1 the voltage, which is used for leading the positive or negative corona ions to the pixel corresponding portion on the surface of the sheet 121 in accordance with the image to be displayed. The electrode control circuit f1 includes a control power source and a bias power source, although not shown.

The corona ion generating portion c1 includes a shield casing c11 and a corona wire c12, which is formed of, e.g., a gold-plated tungsten wire of 60 $\mu$m–120 $\mu$m in diameter, and is stretched in the casing c11, although not restricted to this structure. A power source Pc1 supplies a positive or negative voltage of, e.g., 4 kV–10 kV to the wire for generating the corona ions.

The write electrode e1 is opposed to the portion of the shield casing c11, which faces the first sheet 121 of the medium (e.g., medium 13), and is provided at its center with a through-hole for passing a corona ion flow therethrough.

The electrode control circuit f1 can apply to the electrode e1 the ion leading voltage corresponding to the positive or negative polarity of the ions to be led toward the medium 13.

TABLE 4

| (Example)/ | Black Portion | | | White Portion | | | | | |
|---|---|---|---|---|---|---|---|---|---|
| (Comparative Example) | max/d* | min/d* | avr/d* | max/d* | min/d* | avr/d* | Contrast* | Irregularities* | Evaluation |
| Example 10 | 1.55 | 1.45 | 1.5 | 0.11 | 0.1 | 0.105 | 14.29 | 0.10 | ○ |
| Example 10 | 1.52 | 1.45 | 1.485 | 0.12 | 0.11 | 0.115 | 12.91 | 0.07 | ○ |
| Example 12 | 1.5 | 1.44 | 1.47 | 0.11 | 0.1 | 0.105 | 14.00 | 0.06 | ○ |
| Comparative Example E5 | 1.25 | 1.15 | 1.2 | 0.2 | 0.15 | 0.175 | 6.86 | 0.10 | X |
| Comparative Example E6 | 1.35 | 1.12 | 1.235 | 0.22 | 0.15 | 0.185 | 6.86 | 0.23 | X |
| Comparative Example E7 | 1.55 | 1.34 | 1.445 | 0.12 | 0.11 | 0.115 | 12.57 | 0.21 | X |
| Example 13 | 1.45 | 1.3 | 1.375 | 0.13 | 0.11 | 0.12 | 11.46 | 0.15 | ○ |
| Comparative Example E8 | 1.35 | 1.3 | 1.325 | 0.2 | 0.15 | 0.175 | 7.57 | 0.05 | X |
| Example 14 | 1.5 | 1.45 | 1.475 | 0.11 | 0.1 | 0.105 | 14.05 | 0.05 | ○ |
| Example 15 | 1.61 | 1.6 | 1.605 | 0.1 | 0.1 | 0.1 | 16.05 | 0.01 | ○ |
| Example 16 | 1.75 | 1.56 | 1.655 | 0.1 | 0.1 | 0.1 | 16.55 | 0.19 | ○ |
| Comparative Example E9 | 1.76 | 1.51 | 1.635 | 0.15 | 0.1 | 0.125 | 13.08 | 0.25 | X |
| Example 17 | 1.59 | 1.58 | 1.585 | 0.11 | 0.1 | 0.105 | 15.10 | 0.01 | ○ |
| Example 18 | 1.29 | 1.22 | 1.255 | 0.13 | 0.12 | 0.125 | 10.04 | 0.07 | ○ |
| Comparative Example E10 | 1.1 | 1.09 | 1.095 | 0.15 | 0.13 | 0.14 | 7.82 | 0.01 | X |
| Example 19 | 1.42 | 1.3 | 1.36 | 0.13 | 0.125 | 0.1275 | 10.67 | 0.12 | ○ |
| Comparative Example E11 | 1.2 | 1.1 | 1.15 | 0.2 | 0.18 | 0.19 | 6.05 | 0.10 | X |
| Example 20 | 1.55 | 1.5 | 1.525 | 0.1 | 0.1 | 0.1 | 15.25 | 0.05 | ○ |
| Example 21 | 1.23 | 1.2 | 1.215 | 0.12 | 0.11 | 0.115 | 10.57 | 0.03 | ○ |
| Comparative Example E12 | 1.25 | 1.19 | 1.22 | 0.13 | 0.125 | 0.1275 | 9.57 | 0.06 | X |

The following can be understood from the results of evaluation. Thus, it is preferable that each sheet has the thickness of 5 $\mu$m–100 $\mu$m, the gap between the sheets is equal to 20 $\mu$m–300 $\mu$m, the whole thickness is equal to 30 $\mu$m to 500 $\mu$m, one of the two sheets has the surface resistivity of $10^{10}$ ohm/square–$10^{16}$ ohm/square on its outer surface, and the other sheet has the surface resistivity of $10^7$ ohm/square or less on its outer surface.

Figure 15:
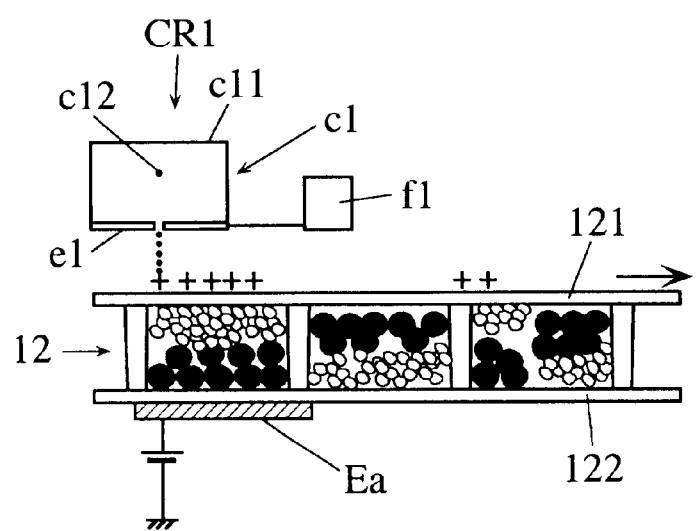
FIG. 15 shows a schematic structure of another example of the image forming apparatus provided with the direct electrostatic latent image forming device of the ion flow type.

The image forming apparatus shown in FIGS. 16(A) and 16(B) is prepared by developing the image forming apparatuses, of which principle is shown in FIGS. 14 and 15.

The image forming apparatus shown in FIG. 14 is suitable to the image display medium of the type, in which one of the In this manner, the medium 13 is moved relatively to the device CR1 while keeping the second sheet 122 at the ground potential (or applying a bias voltage of the same polarity as the electrostatic latent image but lower in potential than the latent image). At the same time, the positive or negative corona ions are led to the pixel corresponding portion of the surface of the sheet 121 in accordance with the image to be displayed. Thereby, electrostatic latent image charges are applied to the surface of the sheet 121, and at the same time, the electrostatic field is formed to move the developer particles in the medium 13 to display the image.

The image forming apparatus shown in FIG. 15 is suitable to the image display medium such as the medium 12 shown in FIG. 8(A) and others, and more specifically to the image display medium, in which the sheet is not provided with the conductive film, and the electrode is not employed. The image forming apparatus in FIG. 15 has an electrode Ea, which is in contact with the sheet 122 opposite to the sheet 121 for forming the electrostatic latent image. Similarly to the case shown in FIG. 14, a bias voltage may be applied to the electrode Ea. Structures other than the above are the same as that shown in FIG. 14.

The image forming apparatus, which is shown in FIGS. 16(A) and 16(B) and is used in the foregoing evaluation experiments, includes a direct electrostatic latent image forming device CR2 of the ion flow type. The device CR2 includes a corona ion generating portion c2 for generating corona ions, a write electrode e2 for leading the corona ions generated by the ion generating portion onto the surface of the sheet 121, a write electrode control circuit f2 for applying to the write electrode e2 the voltage, which is used for leading the positive or negative corona ions to the pixel corresponding portion on the surface of the sheet 121 in accordance with the image to be displayed.

The corona ion generating portion c2 includes a shield casing c21 and a corona wire c22, which is stretched in the casing 21 similarly to the device CR1 shown in FIG. 14. A power source Pc2 applies a positive or negative voltage to the wire c22 for generating the corona ions.

The write electrode e2 is opposed to a portion of the shield casing c21, which faces to the first sheet 121 of the medium (medium 12 in the figure) of the same type as the mediums 12 and 13. The write electrode e2 is formed of upper and lower electrodes e21 and e22, and is provided at its center with a hole, through which the corona ions can flow.

The electrode control circuit f2 includes a control power source Pc21, a bias power source Pc22 and a control portion f21. The control portion f21 can apply to the electrodes e21 and e22 the ion leading voltages corresponding to the polarity of the ions to be led toward the medium 12.

Under the control by the control portion f21, the positive and negative voltages are applied to the upper and lower electrodes e21 and e22, respectively, whereby the positive corona ions can be led to the medium (FIG. 16(A)). By applying the negative and positive voltages to the upper and lower electrodes e21 and e22, respectively, the positive corona ions can be confined (FIG. 16(B)).

The electrode roller R1 is opposed to the write electrode e2, and is supplied with a positive bias voltage from the power source PW1. The roller R1 is internally provided with a magnetic pole roller R2, which is driven to rotate.

The medium 12 is moved relatively to the device CR2. At the same time, the electrode roller R1 is driven to rotate in the medium feed direction, and the magnetic pole roller R2 is rotated in the opposite direction. In accordance with the instruction by the control portion f21, positive corona ions are led to the predetermined pixel corresponding portion corresponding to the image to be displayed among the plurality of pixel corresponding portions on the surface of the first sheet 121, as shown in FIG. 16(A), and outflow of the ions are prevented for the other pixels as shown in FIG. 16(B).

In the image evaluation experiments described above, the positive corona ions were led to the predetermined pixel corresponding portions corresponding to the image to be displayed among the plurality of pixel corresponding portions on the surface of the first sheet 121, and thereby the predetermined pixel corresponding portions were charged to bear the potential from +500 V to +600 V. Also, only the bias voltage of +250 V was applied to the other pixels. Thereby, in the portion carrying the positive corona ions, a white appearance was exhibited by the negatively chargeable white developer particles WP. In the portion not carrying the positive corona ions, a black appearance was exhibited by the positively chargeable black developer particles. In this manner, the image display was performed.

The discharging wires c12 and c22 in the devices CR1 and CR2 may be replaced with solid discharging elements.

The electrostatic latent image forming devices CR1 and CR2 shown in FIGS. 14–16(B) utilize the discharging phenomenon. Instead of them, electrostatic latent image forming devices of various discharging types other than the above may be utilized.

Figure 17:
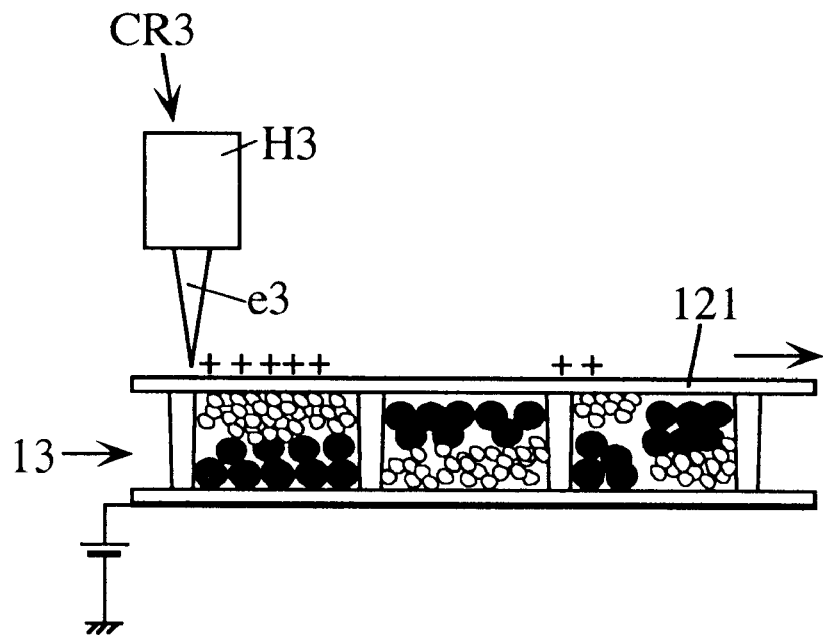
FIG. 17 shows a schematic structure of an example of the image forming apparatus provided with the direct electrostatic latent image forming device of the multi-stylus type.
Figure 18:
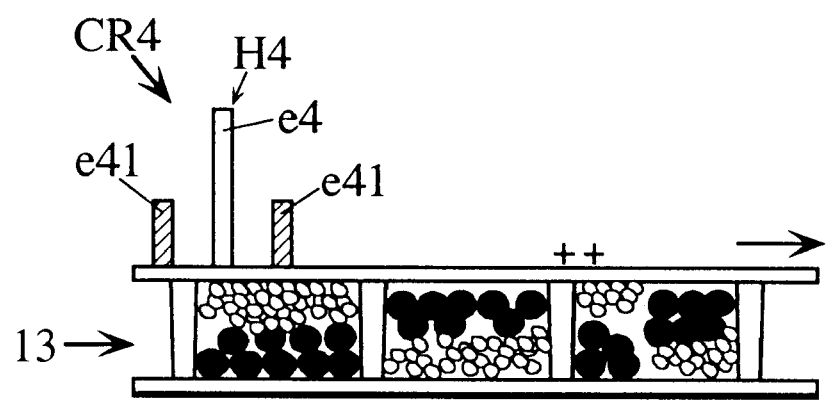
FIG. 18 shows a schematic structure of an example of the image forming apparatus provided with the electrostatic latent image forming device of the multi-stylus type having adjacent control electrodes.

Instead of the image forming apparatuses shown in FIGS. 14 to 16(A), image forming apparatuses shown in FIGS. 17 and 18 may be employed for image display.

The image forming apparatus shown in FIG. 17 includes a direct electrostatic latent image forming device CR3 of the multi-stylus type. The device CR3 includes a multi-stylus head H3 having a plurality of electrodes e3, which are arranged in the main scanning direction of, e.g., medium 13, and are arranged close to the first sheet 121. A signal voltage is applied to each electrode e3 for applying electrostatic latent image charges to the pixel corresponding portion on the surface of the first sheet 121 in accordance with the image to be displayed. The medium 13 is transported relatively to the head H3, e.g., while applying a bias to the second sheet 122 on the opposite side so that the image display is performed.

The image forming apparatus shown in FIG. 18 includes a direct electrostatic latent image forming device CR4 of the charge injection type. The device CR4 is of a multi-stylus type, and has an electrostatic record head H4, in which a plurality of record electrodes e4 are arranged in the main scanning direction of the medium, and neighboring control electrodes e41 are arranged close to the record electrodes e4. This head is located, e.g., near the medium 13, and the control electrodes e41 of the head H4 are successively and sequentially supplied with a voltage nearly equal to half the voltage (record voltage) required for the image recording. Also, the record electrodes e4 are supplied with the image signal voltage nearly equal to half the record voltage. Thereby, the electrostatic latent image can be formed on the medium located immediately under the record electrode.

It is advantageous to form the electrostatic latent image. This will now be described with reference to, e.g., the image forming apparatus provided with an external electrostatic latent image forming device shown in FIG. 11.

Equivalent circuits of the above apparatus are shown in FIGS. 19(A) to 19(D), respectively. In these figures, C1, C2 and C0 indicate electrostatic capacitances of an electrostatic latent image carrier such as a photosensitive drum, an image display medium and an air layer between them, respectively.

It is assumed that the electrostatic latent image carrier (which will be referred to as an "image carrier" hereinafter) bears electrostatic latent image charges Q (at potential V) provided by the charger and the image exposing device.

Figure 19A:
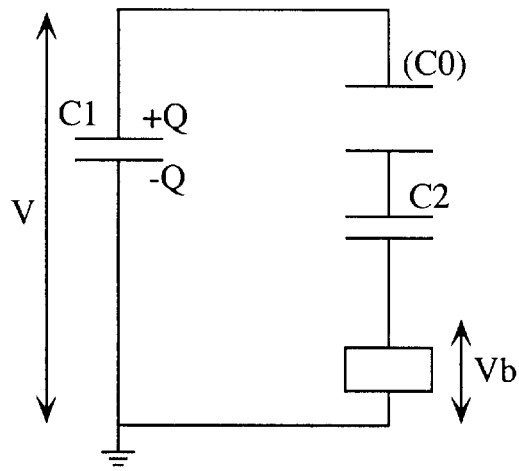
FIGS. 19(A)–19(D) show equivalent circuits of the image forming apparatus provided with the external electrostatic latent image forming device.

FIG. 19(A) shows the equivalent circuit, in which the image carrier is spaced from the image display medium. In this state, since C1 and C2 are much larger than C0, the charges Q do not move, and the medium is not affected by the electrostatic latent image.

Figure 19B:
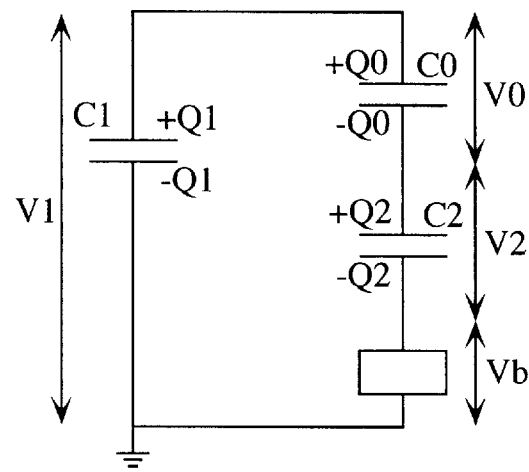

When the image carrier and the medium move relatively to each other, C0 increases, and the charges kept in C1 and C2 are induced by electrostatic induction so that the state in FIG. 19(B) is attained. FIG. 19(B) shows the equivalent circuit, in which the electrostatic induction is caused by moving the image carrier and the image display medium relatively toward each other.

In the state shown in FIG. 19(B), the induced charges cause potential differences V1, V2 and V0 in the image carrier, the medium and the air layer, respectively. These potential differences V1, V2 and V0 are expressed by the following formulas (1), (2) and (3), respectively.

$$V0 = \frac{C1 \cdot C2 \cdot (V - Vb)}{C0 \cdot C1 + C1 \cdot C2 + C2 \cdot C0} \quad (1)$$

$$V1 = \frac{C1 \cdot (C0 + C2) \cdot V + C0 \cdot C2 \cdot Vb}{C0 \cdot C1 + C1 \cdot C2 + C2 \cdot C0} \quad (2)$$

$$V2 = \frac{C0 \cdot C1 \cdot (V - Vb)}{C0 \cdot C1 + C1 \cdot C2 + C2 \cdot C0} \quad (3)$$

In the above formulas, V represents the latent image surface potential of the image carrier, and Vb represents the bias value.

The medium contains the developer. In the electric field, the developer particles transport the electric charges. Therefore, the developer layer is apparently similar to the conductive layer. Thus, the electrostatic capacitance C2 of the medium is similar to the composite capacity of the two, i.e., upper and lower resin sheets.

For transferring the electrostatic latent image charges on the image carrier onto the medium, insulation breakdown must occur in the air layer to move the electric charges. If the insulation breakdown do not occur, the apparatus returns to the state shown in FIG. 19(A) when the image carrier and the medium are spaced from each other. Therefore, the transfer of the electrostatic latent image does not occur.

For example, if V0 is small, the induced electrostatic field moves the particles, but the latent image is not transferred.

For causing the insulation breakdown in the air layer formed of the gap, e.g., of 10 μm, V0 must be equal to or larger than about 370 V according to the Paschen's law.

When the bias value Vb is set to −1000 V, V is equal to 1000 V, and the ratio C1:C2:C0 among the electrostatic capacitances is equal to 18:5:12, V0 (potential difference of the air layer) is equal to 480 V, and the insulation breakdown occurs so that the latent image is transferred.

The above ratio among the electrostatic capacitances is determined based on the assumption the image carrier is an organic photosensitive member, the medium has the composite capacitance of the foregoing structure, and the air layer has a size of about 10 μm, which promotes the insulation breakdown.

Under the conditions that (V−Vb) is equal to or larger than about 1500 V, the latent image is transferred as described above. Under the conditions other than the above, the electrostatic induction is caused when the image carrier is close to the medium, but the latent image is not transferred.

In the electrostatic latent image on the image carrier, the charges move between the charged portion and the medium, and the charges do not move in the uncharged portion (exposed portion). Therefore, a difference in surface potential occurs on the medium. After the movement of charges in the charged portion, the surface potential on the medium is expressed by the following formula (4), and the surface potential on the medium for the uncharged portion is expressed by the foregoing formula (3).

Figure 19C:
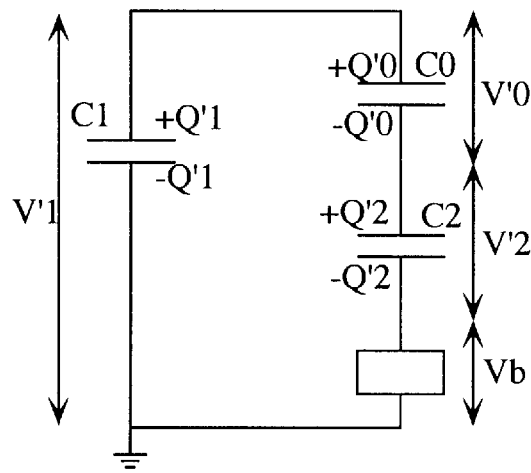
Figure 19D:
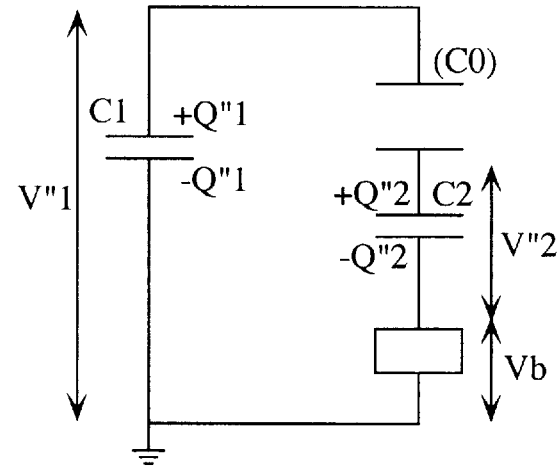

FIG. 19(C) shows the equivalent circuit in the state where the insulation breakdown causes the movement of charges.

In the state where the insulation breakdown causes the movement of charges, the following formula (4) is established.

$$V'2 = \frac{C0 \cdot C1 \cdot (V1 - V'0 - Vb) + C2 \cdot (C0 + C1) \cdot V2}{C0 \cdot C1 + C1 \cdot C2 + C2 \cdot C0} + Vb \quad (4)$$

In the formula (4), V'0 represents the minimum potential difference, which can cause the discharging. V1 and V2 are represented by the foregoing formulas (2) and (3), respectively.

For example, in the foregoing setting conditions, the surface potential of about +265 V is kept on the region of the medium corresponding to the charged portion, and about −340 V is kept on the region corresponding to the uncharged portion.

When the opposite electrode roller is supplied with an arbitrary bias (or grounded), the electric fields in mutually opposite directions are formed in the regions corresponding to the charged portion and uncharged portion, respectively, so that the developer particles move along the electric field to form the image.

When the image carrier and the medium are then spaced from each other, induced charges move, and the surface potential on the medium changes. The surface potentials with respect to the charged portion and the uncharged portion return to about +275 V and about 0 V, respectively, and the latent image can be formed on the medium.

The foregoing description has been given on the case where the electrostatic latent image carrier is the photosensitive drum (photoconductive member). However, a dielectric drum may be used. The electrostatic latent image may be negative. The developer particles may have an opposite chargeable polarity.

As described above, not only the manner of moving the latent image toward the medium but also the manner of, e.g., transferring or directly forming the latent image onto or on the medium are employed, whereby an electrostatic attraction force occurs on the developer particles and the reversible image display medium even after passage through the region where the electrostatic latent image carrier are opposed to the opposite electrode. Therefore, it can be understood the good image holding properties can be achieved. In summary, it is advantageous that the electrostatic latent image is formed on the medium. In particular, advantages relating to the image holding can be achieved in the case where the developer has high flowability, or the flowability is increased by the developer stirring processing prior to the image display.

Description will now be given on example mediums (examples 22–30) and comparative example mediums E13–E28. In the developer particles contained in the developer, it is preferable that the nonconductive developer particles have a volume average particle diameter of 1 μm to 50 μm, and the magnetic developer particles have a volume average particle diameter of 1 μm to 100 μm. The examples 22–30 show the above.

Each of these mediums has the same structure as the medium of the example 2 except for that the partition 123 has the height h of 150 μm, the distance pt between the neighboring partitions 123a is 250 μm, and the cells 124 accommodate different kinds of developer particles.

Image contrast on these mediums was evaluated. For the evaluation, the image forming apparatus shown in FIG. 11 was used, and an image, which had a black portion (Bk) in the right half and a white portion (W) in the left half as shown in FIG. 13(A), was formed.

If the reflective density ratio (Bk/W) was 9 or more, the evaluation result was good (double circle). If it was equal to or larger than 7.0, and was smaller than 9.0, the evaluation result was allowable (circle). If it was equal to or larger than 5.0, and was smaller than 7, the evaluation result was unpreferable (triangle). If it was smaller than 5.0, the result was unacceptable (X).

These mediums and the evaluation results are shown in the table 5. In the table 5, WP1–WP5 and BP1–BP5 represent nonconductive white developer particles and magnetic black developer particles having the particle diameters already described. The examples 22–30 employ the developer DL1–DL9 already described, and the comparative examples E13–E28 employ the comparative example developer De1–De16 already described.

In the table 5, and particularly in each cell of the table representing the results of the example or the comparative example, the mark at the upper right position represents the result of contrast evaluation, a value in the middle position represent the reflective image density ratio, a value in the right bottom represents the reflective density of the black image portion, and a value in the center bottom represents the density of the white image portion.

The image erasing device EL1 includes a roller pair formed of upper and lower electrode rollers R3 and R4. The upper electrode roller R3 is connected to a bias power source PW3, but may be grounded. The lower electrode roller R4 is connected to a bias power source PW4, but may be grounded.

According to this image forming apparatus, the electric field corresponding to the potential difference between the biases, which are applied to the electrode rollers R3 and R4 of the image erasing device EL1 prior to the image display, is formed for the medium 12. Thereby, one kind of the particles BP between the different kinds of developer particles BP and WP having different chargeable polarities are collected on or near one of the sheets, and the other kind of particles WP are collected on or near the other sheet so that the image is erased. After this image erasing processing, the medium 12 is fed to a position between the photosensitive drum PC and the opposite electrode roller R1 for forming a new image thereon.

Figure 20:
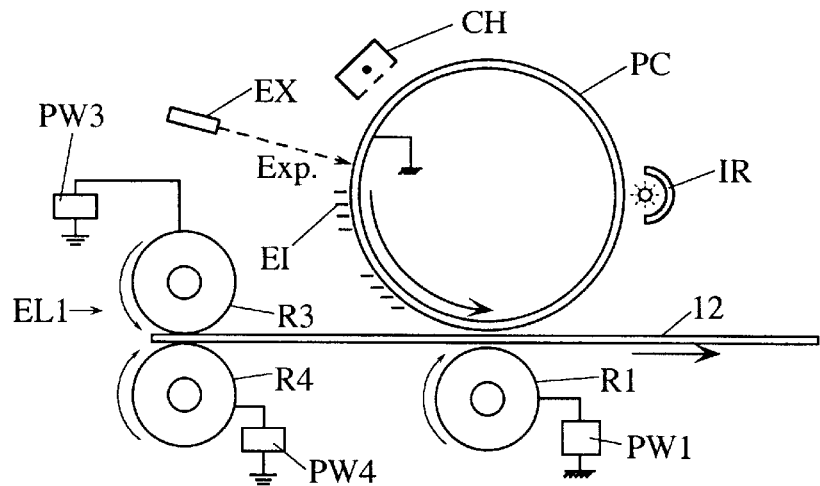
FIG. 20 shows a schematic structure of an example of an image forming apparatus provided with an image erasing device.

Using the apparatus shown in FIG. 20, an experiment for image erasure and image formation was performed under the following conditions.

In the electrostatic latent image on the photosensitive drum PC, the potential on the charged portion was set to

TABLE 5

| Developer Black Particle | White particle Particle Diameter μm | WP1 0.7 | WP2 2.1 | WP3 10.1 | WP4 46.2 | WP5 55.3 |
|---|---|---|---|---|---|---|
| BPI | 0.8 | Comparative X Example E13 3.2 0.30 0.95 | Comparative Δ Example E14 6.4 0.15 0.99 | Comparative ○ Example E15 7.1 0.14 0.99 | Comparative X Example E16 4.2 0.23 0.96 | Comparative X Example E17 2.4 0.40 0.96 |
| BP2 | 3.0 | Comparative Δ Example E18 5.8 0.28 1.63 | Example 22 ◎ 11.8 0.14 1.65 | Example 23 ◎ 12.6 0.13 1.64 | Example 24 ○ 7.5 0.22 1.66 | Comparative X Example E19 4.7 0.35 1.64 |
| BP3 | 25.1 | Comparative Δ Example E20 5.9 0.28 1.65 | Example 25 ◎ 11.9 0.14 1.66 | Example 26 ◎ 12.9 0.13 1.68 | Example 27 ○ 7.5 0.22 1.65 | Comparative Δ Example E21 5.0 0.33 1.66 |
| BP4 | 87.7 | Comparative X Example E22 4.9 0.31 1.52 | Example 28 ◎ 10.3 0.15 1.55 | Example 29 ◎ 10.9 0.14 1.53 | Example 30 ○ 7.1 0.21 1.50 | Comparative X Example E23 4.6 0.32 1.48 |
| BP5 | 121 | Comparative X Example E24 2.6 0.30 0.78 | Comparative Δ Example E25 5.5 0.14 0.77 | Comparative Δ Example E26 5.7 0.14 0.80 | Comparative X Example E27 4.0 0.20 0.79 | Comparative X Example E28 2.4 0.33 0.78 |

As can be seen from the table 5, it is preferable in the developer particles contained in the developer that the nonconductive developer particles (white particles in this case) have the volume average particle diameter of 1 μm–50 μm, and the magnetic developer particles (black particles in this case) have the volume average particle diameter of 1 μm to 100 μm.

Description will be given on the image forming method, in which image erasing processing is performed before the image display. For executing this image display method, the image display medium (represented as the medium 12 in the following description) of the foregoing example 2 is employed.

Figure 21:
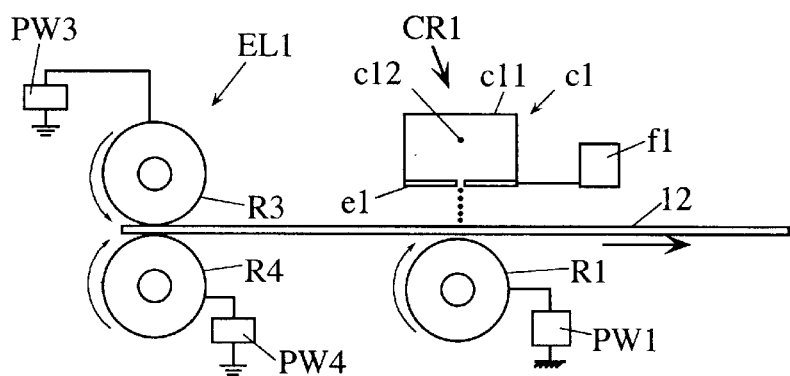
FIG. 21 shows a schematic structure of another example of the image forming apparatus provided with the image erasing device.
Figure 22:
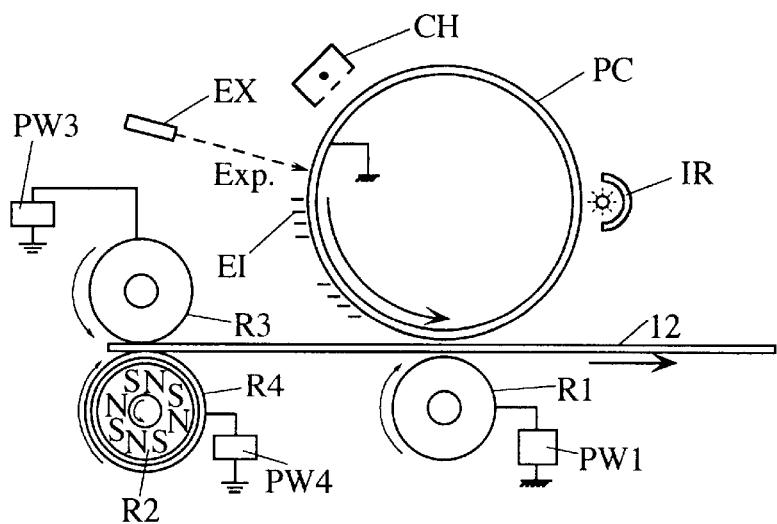
FIG. 22 shows a schematic structure of still another example of the image forming apparatus provided with the image erasing device.

FIGS. 20–22 show examples of the image forming apparatus for implementing the image display method, and particularly show the image forming apparatuses each provided with an image erasing device.

The image forming apparatus shown in FIG. 20 is the substantially same as the image forming apparatus shown in FIG. 11 (but not provided with the rotary magnetic pole roller R2) except for that an image erasing device EL1 is arranged upstream, in the relative transporting direction of the medium 12 indicated by a straight arrow in the figure, to the opposition region between the photosensitive drum PC and the electrode roller R1.

−800 V, and the potential of the uncharged portion (exposed portion) was set to −100 V. A bias of −100 V was applied to the opposite electrode roller R1. In the erasing device EL1, the electrode roller R4 was grounded, and a bias of +1000 V was applied to the electrode roller R3. The developer received the Coulomb force caused by the electric field when passing between the electrode rollers R3 and R4. In this case, the white particles WP were charged negatively, and the black particles BP were charged positively so that the white particles moved upward in the figure, and the black particles moved downward in the figure. The previously displayed image was fully erased. The medium 12 exhibited an entirely white appearance when viewed from a higher position in the figure.

Thereafter, the medium 12 subjected to the entire image erasure moved to the region between the photosensitive drum PC and the electrode roller R1, where the electric field was formed in accordance with the electrostatic latent image, and the Coulomb force was applied to the developer DL. In the charged portion on the photosensitive drum PC, the electric field (upward electric field in the figure) of 700 V was formed by the potential difference between the electrode roller R1 and the charged portion so that the white particles moved downward. In the uncharged portion, since there was no potential difference, the particles did not move, and the white particles stayed on the upper surface. The image thus formed exhibited a black portion corresponding to the charged region and a white portion corresponding to the uncharged region, when viewed from the upper side.

As described above, the image can be formed by moving merely the developer particles corresponding to the charged portion, and thereby the intensity of the electric field for moving the developer particles can be increased.

The experiment was also performed under the following conditions. The potential on the charged portion of the photosensitive drum PC was set to −800 C, the potential of the uncharged portion (exposed portion) was set to −100 V, and the bias applied to the opposite electrode roller R1 was set to −800 V. In the erasing device EL1, the bias of the electrode roller R4 was set to +1000 V, and the electrode roller R3 was grounded.

In this case, after the medium 12 moved through a position between the electrode rollers R4 and R3, the white particles moved downward in the figure, and the black particles moved upward in the figure so that the previously displayed image was entirely erased. Thereby, the medium 12 exhibited an entirely black appearance when viewed from an upper position.

Thereafter, in the uncharged portion on the photosensitive drum PC, the electric field (downward electric field in the figure) of 700 V was formed by the potential difference between the electrode roller R1 and the uncharged portion so that the white particles moved upward. In the charged portion, since there was no potential difference, the particles did not move, and the white particles stayed on the lower side. The image thus formed exhibited a black portion corresponding to the charged region and a white portion corresponding to the uncharged region, when viewed from the upper side.

The image forming device in FIG. 21 includes the electrode roller R1, which is opposed to the electrostatic latent image forming device CR1 of the ion flow type shown in FIG. 14, and also includes the image erasing device EL1 having the same structure as that shown in FIG. 20 and located upstream to the opposition region between the device CR1 and the roller R1.

The image forming apparatus shown in FIG. 22 is the substantially same as the image forming apparatus shown in FIG. 20 except for that the lower electrode roller R4 in the erasing device EL1 is internally provided with the rotary magnetic pole roller R2. Structures other than the above are the same as those of the apparatus in FIG. 20. The rotary magnetic pole roller R2 rotates in one direction, or performs rotational reciprocation to form an oscillating magnetic field for the medium 12. This affects the black magnetic developer particles BP to stir the developer DL. By this developer stirring operation, the developer particles are frictionally charged to a higher extent so that the speed of movement by the Coulomb force increases in the image display, and the flowability of the developer particles is improved, resulting in increase in movement efficiency of the developer particles.

The image erasing device can be applied to the image forming devices in FIGS. 15–18 and others.

Description will now be given on the image display method, in which the developer is stirred for the image display. For implementing the image display method, the image display medium (medium 12) of the foregoing example 2 is employed.

FIGS. 23 to 29 show examples of the image forming apparatus implementing the above image display method. In particular, these figures show the image forming apparatuses provided with the developer stirring devices. The image forming apparatus shown in FIG. 4 may be provided with the rotary magnetic pole roller R2. The image forming apparatus shown in FIG. 11 may be provided with the rotary magnetic pole roller R2, which is internally arranged in the development electrode roller R1 opposed to the photosensitive drum PC. The magnetic pole roller R2 thus arranged is drive to rotate in one direction or to perform rotational reciprocation. In these cases, the magnetic pole roller R2 functions as the developer stirring device.

Description will now be given on experimental examples, in which stirring of the developer and the image display were performed by the image forming apparatus shown in FIG. 11.

The potential of the charged portion of the photosensitive drum PC was set to +500 V, the potential of the uncharged portion (exposed portion) was set to +100 V, and the bias applied to the development electrode roller R1 was set to +300 V. The magnetic pole roller R2 within the electrode roller R1 was rotated counterclockwise in the figure with the maximum magnetic flux density of 400 gauss, the magnetic poles of 8 in number and the rotation speed of about 100 rpm.

Under the above conditions, the white particles WP corresponding to the charged portion were forced upward in the figure, and thus oppositely to the electric field, and the black particles BP were forced downward in the figure, and thus along the electric field. At the same time, the black particles BP were stirred by the oscillating magnetic field so that the developer particles moved efficiently.

Figure 23:
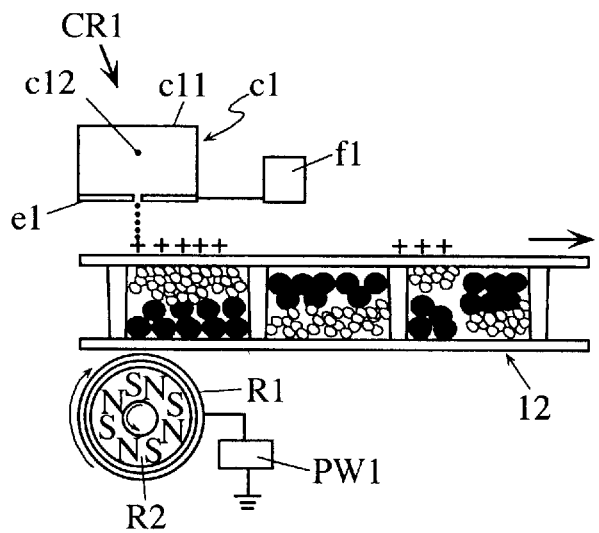
FIGS. 23–29 show schematic structures of different examples of an image forming apparatus provided with a developer stirring device, respectively.

The image forming apparatus shown in FIG. 23 is the substantially same as the image forming apparatus shown in FIG. 14 except for that the development electrode roller R1 is opposed to the electrostatic latent image forming device CR1 of the ion flow type, and the rotary magnetic pole roller R2 is arranged within the development electrode roller R1.

With this apparatus, the experiment relating to the developer stirring and image display was performed under the following conditions. The potential of the charged portion of the medium 12 was set to +500 V, the potential of the uncharged portion (exposed portion) was set to about 0 V, and the bias applied to the development electrode roller R1 was set to +300 V. The magnetic pole roller R2 was rotated counterclockwise in the figure with the maximum magnetic flux density of 400 gauss, the magnetic poles of 8 in number and the rotation speed of about 100 rpm.

Under the above conditions, the white particles WP corresponding to the charged portion were forced upward in the figure, and thus oppositely to the electric field, and the black particles BP were forced downward in the figure, and thus along the electric field. At the same time, the black particles BP were stirred by the oscillating magnetic field so that the developer particles moved efficiently. The image forming apparatus described above is an example of the apparatus, which is basically configured such that the electrostatic latent image is formed correspondingly to the image to be displayed on the outer surface of one of the two sheets of the reversible image display medium, the electrostatic field is formed based on the electrostatic latent image in the image display step simultaneously with the electrostatic latent image formation, and the stirring of the developer is performed simultaneously with the formation of the electrostatic field.

Figure 24:
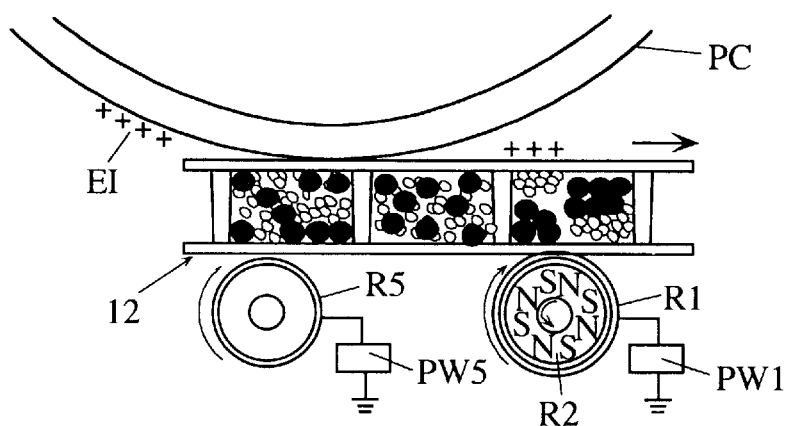
Figure 25:
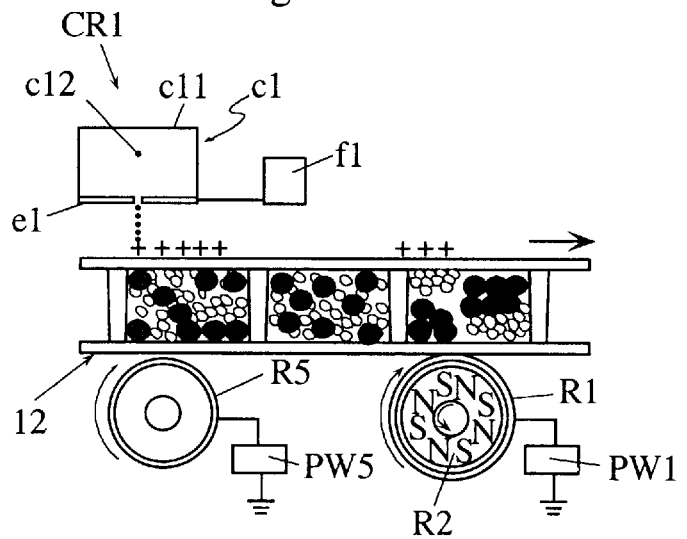

Image forming apparatuses, which are shown in FIGS. 24 and 25, respectively, and will be described below, are basically configured such that the electrostatic latent image is formed correspondingly to the image to be displayed on the outer surface of one of the two sheets of the reversible image display medium, the electrostatic field is formed based on the electrostatic latent image in the image display step after the electrostatic latent image formation, and the stirring of the developer is performed after the formation of the electrostatic latent image and simultaneously with the formation of the electrostatic field.

In the image forming apparatus shown in FIG. 24, a transfer electrode roller R5 for transferring the electrostatic latent image is disposed in the same position as the development electrode roller R1 in the image forming apparatus shown in FIG. 11, and the development electrode roller R1 for forming the electrostatic field and the rotary magnetic pole roller R2 arranged therein are disposed downstream from the opposition region between the photosensitive drum PC and the transfer electrode roller R5.

In the image forming apparatus shown in FIG. 25, the transfer electrode roller R5 for transferring the electrostatic latent image is disposed in the same position as the development electrode roller R1 in the image forming apparatus shown in FIG. 23, and the development electrode roller R1 for forming the electrostatic field and the rotary magnetic pole roller R2 arranged therein are disposed downstream from the opposition region between the electrostatic latent image forming device CR1 and the opposite electrode roller R5.

The opposite electrode roller R5 is connected to a bias power source PW5, and the electrode roller R1 is connected to a bias power source PW1.

In the image forming apparatuses shown in FIGS. 24 and 25, the electrostatic latent image is formed on the medium 12 in the region where the photosensitive drum PC or the electrostatic latent image forming device CR1 is opposed to the transfer (opposite) electrode roller R5, and then the medium comes into contact with the development electrode roller R1 so that the electrostatic field is formed for each pixel in accordance with the electrostatic latent image, and thereby the image is displayed. In this operation, the magnetic pole roller R2 is driven to rotate in one direction or to perform rotational reciprocation to generate the oscillating magnetic field. By the influence of this magnetic field, the developer particles are stirred in the image display operation. The stirring of the developer particles increases the amount of charges on the developer particles, and increases the flowability of the developer particles. This allows smooth display of good images. The magnetic pole roller R2 may be disposed between the electrode rollers R1 and R5.

Figure 26:
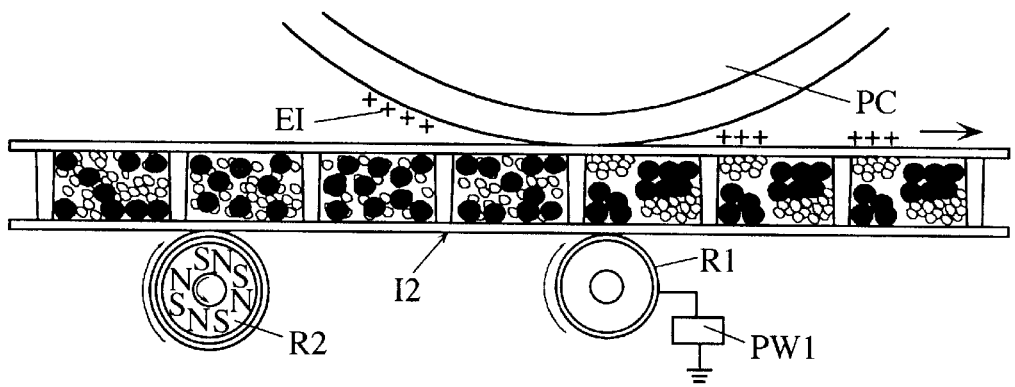
Figure 27:
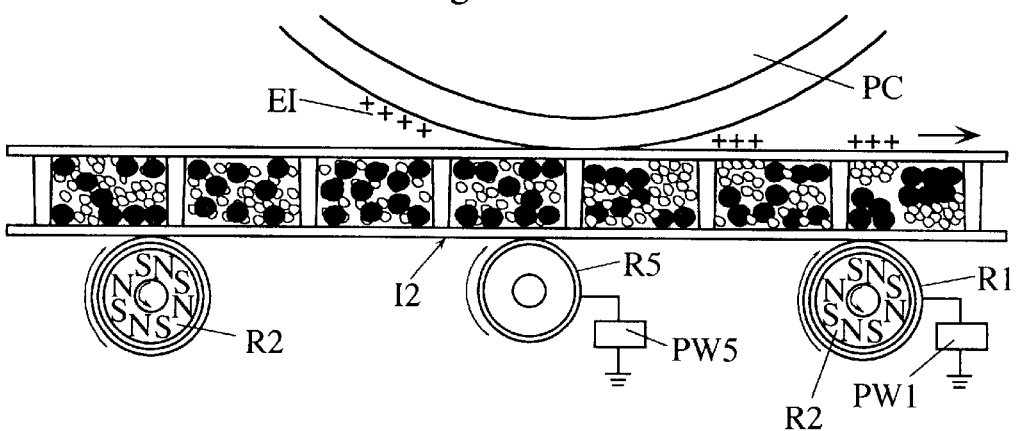

Image forming apparatuses, which are shown in FIGS. 26 and 27, respectively, and will be described below, are basically configured such that the electrostatic latent image is formed correspondingly to the image to be displayed on the outer surface of one of the two sheets of the reversible image display medium, the electrostatic field is formed based on the electrostatic latent image in the image display step simultaneously with or after the electrostatic latent image formation, and the stirring of the developer is performed before the formation of the electrostatic latent image.

The image forming apparatus shown in FIG. 26 differs from the image forming apparatus shown in FIG. 11 in that the electrode roller R1 is not internally provided with the magnetic pole roller, and the rotary magnetic pole roller R2 is disposed upstream to the opposition region between the photosensitive drum PC and the electrode roller R1. The magnetic pole roller R2 is driven to rotate in one direction or to perform rotational reciprocation, whereby the oscillating magnetic field for stirring the developer is formed.

The electrode roller R1 is connected to the bias power source PW1.

In this image forming apparatus, the potential of the charged portion of the photosensitive drum PC was set to +500 V, the potential of the uncharged portion (exposed portion) was set to +100 V, and the bias applied to the development electrode roller R1 was set to +300 V. Thereby, the white particles corresponding to the charged portion were forced upward in the figure, and thus oppositely to the electric field, and the black particles were forced downward in the figure, and thus along the electric field. Since the developer particles were already stirred, the amount of charges and the flowability were increased so that the developer particles could move efficiently.

The image forming apparatus shown in FIG. 27 differs from the image forming apparatus shown in FIG. 24 in that the rotary magnetic pole roller R2 is disposed upstream to the opposition region between the photosensitive drum PC and the electrode roller R5. The magnetic pole roller R2 is drive to rotate in one direction or to perform rotational reciprocation, whereby the oscillating magnetic field for stirring the developer is formed.

Figure 28:
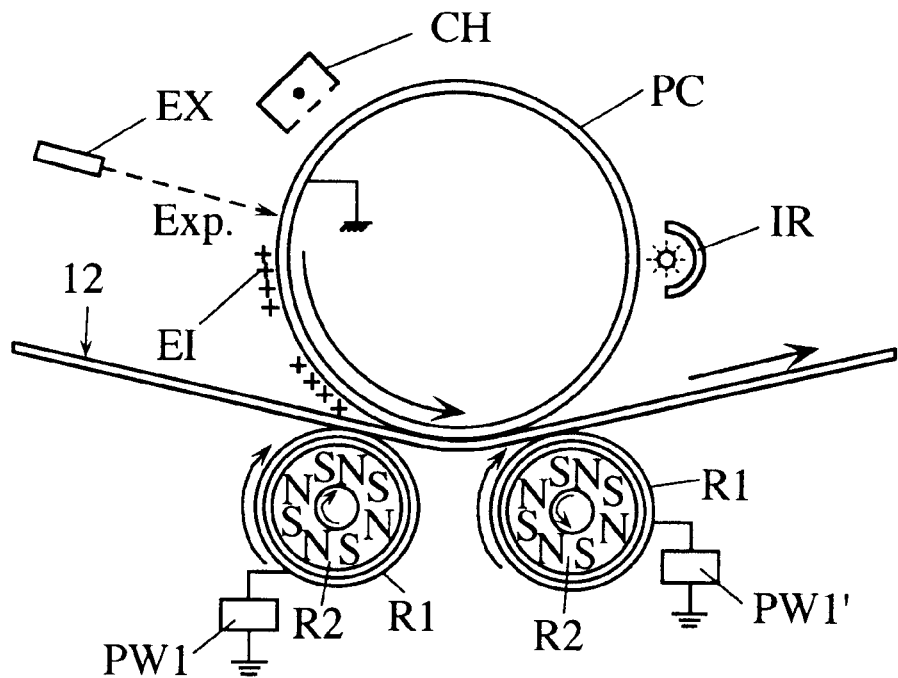

The image forming apparatus shown in FIG. 28 is configured in view of the unpreferable possibility that the magnetic developer particles BP are locally collected in the developer accommodating cell due to the magnetic filed formed by the one magnetic pole roller R2. The apparatus is basically configured to employ a plurality of (two in this example) developer stirring devices along the medium transporting direction for forming the oscillating magnetic field.

The example shown in FIG. 28 differs from the image forming apparatus shown in FIG. 11 in that the two development electrode rollers R1 each internally provided with the rotary magnetic pole roller R2 are opposed to the photosensitive drum PC. The rollers R1 are connected to the power sources PW1 and PW1', respectively. The two rotary magnetic pole rollers R2 are driven to rotate in the opposite directions, respectively. Thereby, local collection of the magnetic developer particles (black particles BP in this example) in the cell can be suppressed.

Figure 29:
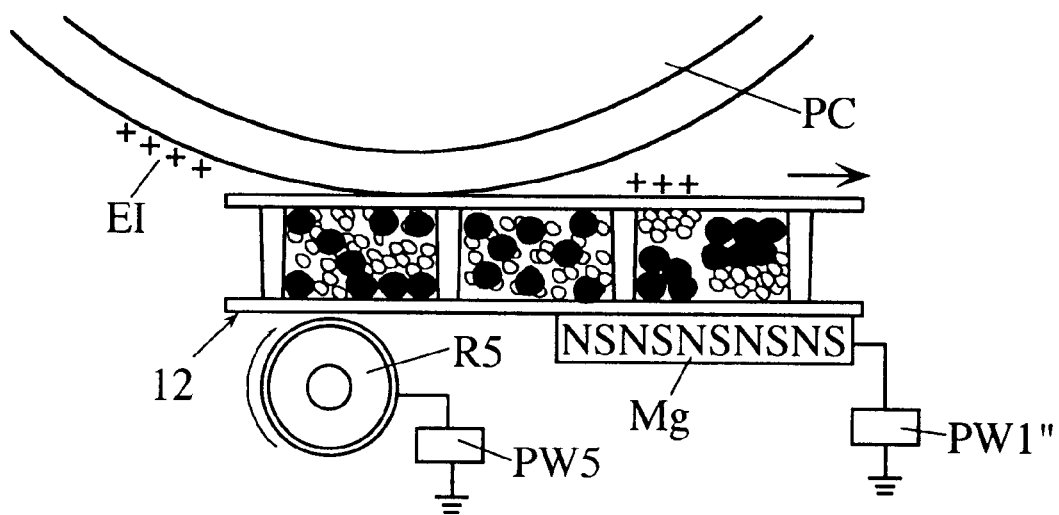

The image forming apparatus shown in FIG. 29 differs from the image forming apparatus shown in FIG. 24 in that the development electrode roller R1 and the magnetic pole roller R2 are replaced with magnetic members Mg provided with alternately arranged N- and S-poles. The member Mg is arranged downstream from the photosensitive drum PC for contact with the coming medium 12, and is connected to a development bias power source PW1".

AS the medium 12 moves relatively to the member Mg, an oscillating magnetic field is formed for the medium 12.

Description will now be given on the image display method, in which an electrostatic latent image is formed on the surface (sheet surface) of the image display medium, the medium surface is uniformly charged to a predetermined potential before the formation of the electrostatic latent image, and the electrostatic latent image is formed on the charged region. For implementing this image display method, the image display medium (medium 12 in this example) of the example 2 already described may be employed.

Figure 30:
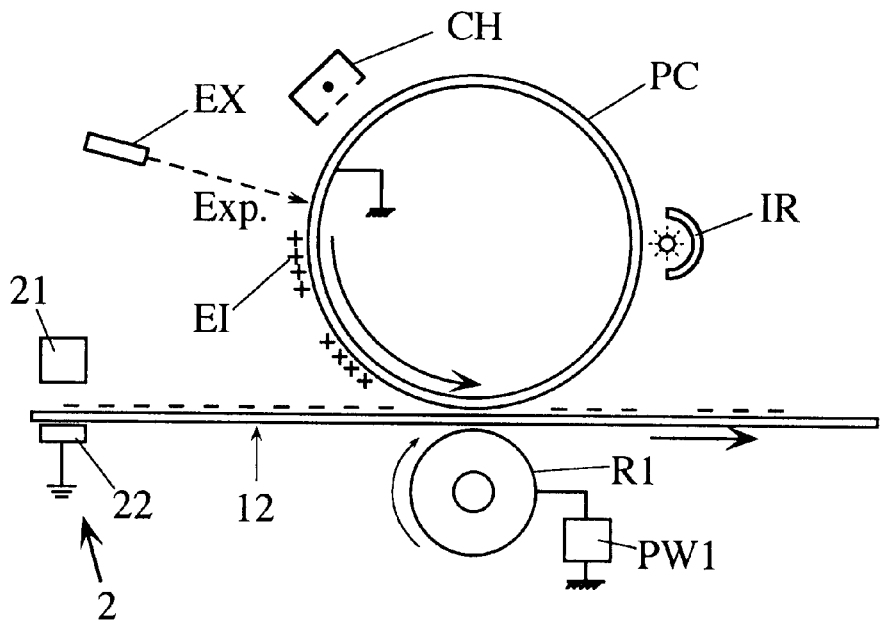
FIG. 30 shows a schematic structure of an example of a image forming apparatus provided with a preliminary charging device.
Figure 31:
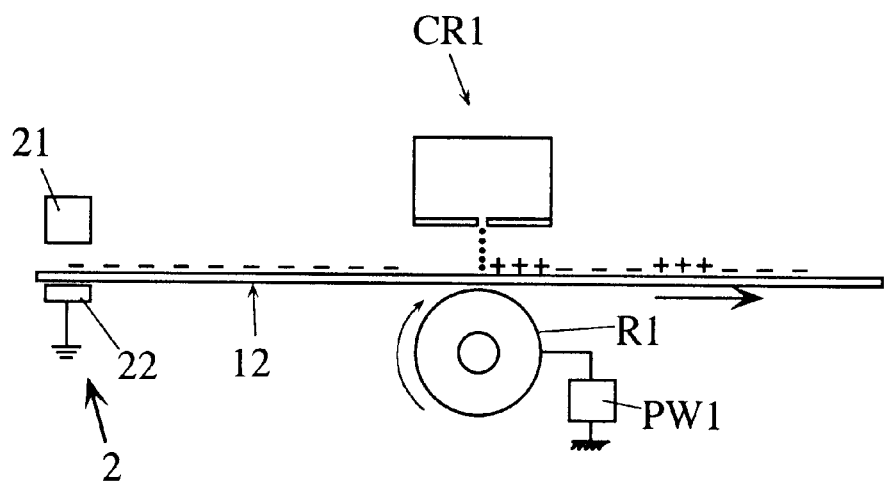
FIG. 31 shows a schematic structure of another example of the image forming apparatus provided with the preliminary charging device.

FIGS. 30 and 31 show examples of the image forming apparatus for implementing this image display method, respectively. Particularly, FIGS. 30 and 31 show the image forming apparatuses each provided with the charging device for uniformly charging the medium surface to the predetermined potential before formation of the electrostatic latent image.

The image forming apparatus shown in FIG. 30 differs from the image forming apparatus shown in FIG. 11 in that the development electrode roller R1 is not internally provided with the magnetic pole roller R2, and a preliminary charging device 2 is arranged upstream to the opposition region between the photosensitive drum PC and the electrode roller R1. The charging device 2 is formed of a charger 21, which is to be opposed to the surface of the medium 12 on the electrostatic latent image formation side, and a ground electrode 22 opposed to the charger 21 with the medium path therebetween. The electrode roller R1 may be grounded in some cases.

The image forming apparatus shown in FIG. 31 differs from the image forming apparatus shown in FIG. 21 in that the foregoing preliminary charging device 2 is arranged instead of the image erasing device EL1 in the position upstream to the electrostatic latent image forming device CR1. The electrode roller R1 may be grounded.

In these image forming apparatuses, the surface of the medium 12 is uniformly charged by the preliminary charging device prior to the image display. In the example shown in FIG. 30, the electrostatic latent image formed on the photosensitive (drum PC is transferred and written onto the charged region thus formed. In the example shown in FIG. 31, the electrostatic latent image forming device CR1 writes the electrostatic latent image onto the charged region thus formed. In each example, the polarity of the region, which was uniformly charged in advance, is opposite to the polarity of the region, where the electrostatic latent image was written. By setting the bias of the electrode roller R1 to the ground potential or an appropriate potential, the electric fields in the different directions are formed on the regions, where the electrostatic latent image was written, and the other region, respectively, so that the developer particles can be moved to form the image.

In the example shown in FIG. 30, the surface of the medium 12 is uniformly charged to the polarity opposite to that of the electrostatic latent image to be formed later, whereby the insulation breakdown in the medium 12 can be prevented, and the latent image can be reliably transferred onto the medium 12. Since the electrostatic latent image is reliably transferred, the image holding property can be good.

In the example shown in FIG. 31, it is possible to increase the potential difference between the image portion and the non-image portion when forming the electrostatic latent image. For example, the charging device 2 preliminarily performs the uniform charging to attain the negative potential of −1000 V, the electrostatic latent image is written to provide the positively charged portion of +1000 V, and the bias of the electrode roller R1 is grounded. Thereby, a potential difference of 1000 V is formed with respect to each of the image portion and the non-image portion, whereby the developer particles can be driven. Since the developer particle drive electric field can be increased, it is possible to increase the moving speed of the developer particles.

The polarity of the uniformly charged region may be the same as that of the region where the electrostatic latent image was written. In this case, the bias of the electrode roller R1 is set to a potential intermediate the potential on the region carrying the electrostatic latent image and the potential on the other region, whereby the electric fields in the different directions are formed so that the image can be formed.

The potential on the region carrying the electrostatic latent image may be equal to 0 V. In this case, the bias of the electrode roller R1 is likewise set to a potential intermediate the potential on the region carrying the electrostatic latent image and the potential on the other region, whereby the electric fields in the different directions are formed so that the image can be formed.

As described above, the electrostatic attracting force is generated between the developer particles and the sheet of the medium 12 even after the medium 12 passed through the opposition region where the photosensitive drum PC or the electrostatic latent image forming device CR1 is opposed to the electrode roller R1. Therefore, good image holding property can be achieved.

The polarity of the electrostatic latent image may be negative.

The chargeable polarities of the white and black developer particles may be opposite, respectively.

The electrostatic latent image forming device is not restricted to the those shown in FIGS. 30 and 31, but the electrostatic latent image forming devices described before may be employed.

It is advantageous that the medium surface is uniformly charged before formation of the electrostatic latent image onto the medium surface, and the electrostatic latent image is formed on the charged region. This will now be described with reference to the image forming apparatus provided with the external electrostatic latent image forming device shown in FIG. 11.

Equivalent circuits of the apparatus are shown in FIGS. 32(A)–32(E). In these figures, the electrostatic latent image carrier such as a photosensitive drum, the image display medium and the air layer between them have the electrostatic capacitances C1, C2 and C0 respectively.

The electrostatic latent image carrier (which will be referred to as an "image carrier" hereinafter) carries the electrostatic latent image charges Q at a potential V, which are applied by the charger and the image exposing device, and the medium carries the charges Q' at a potential V' applied by the preliminary charging device.

Figure 32A:
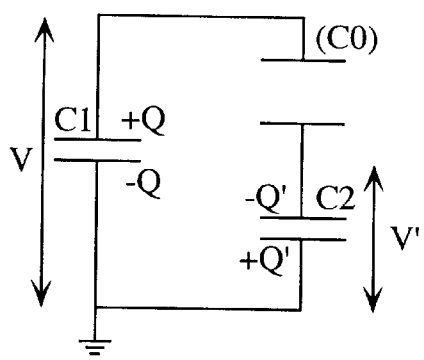
FIGS. 32(A)–32(E) show equivalent circuits of the image forming apparatus provided with the external electrostatic latent image forming device and configured to charge the medium before formation of the electrostatic latent image.

FIG. 32(A) stows the equivalent circuit in the state, where the image carrier is spaced from the image display medium. Since C1 and C2 are much larger than C0 so that the charges Q do not move, and the medium is not affected by the electrostatic latent image.

Figure 32B:
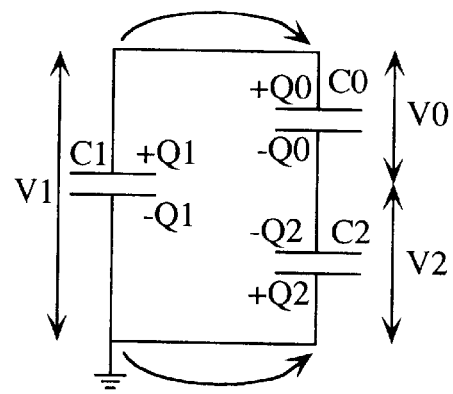

When the image carrier and the medium relatively move toward each other, C0 increases, and the charges kept in C1 and C2 are induced by the electrostatic induction so that the state shown in FIG. 32(B) is attained. FIG. 32(B) shows the equivalent circuit in the state, where the image carrier is close to the image display medium for causing the electrostatic induction. In the state shown in FIG. 32(B), the induced charges cause the potential differences V1, V2 and V0, which are expressed by the following formulas (5), (6) and (7), respectively, in the image carrier, the medium and the air layer. This description relates to the case where the bias is not applied, but the grounding is performed.

$$V0 = \frac{C1 \cdot C2}{C0 \cdot C1 + C1 \cdot C2 + C2 \cdot C0} \cdot (V - V') \tag{5}$$

$$V1 = V - \frac{C0 \cdot C2}{C0 \cdot C1 + C1 \cdot C2 + C2 \cdot C0} \cdot (V - V') \tag{6}$$

$$V2 = V - \frac{C2 \cdot (C0 + C1)}{C0 \cdot C1 + C1 \cdot C2 + C2 \cdot C0} \cdot (V - V') \tag{7}$$

In the above formulas, V represents the latent image surface potential on the image carrier, and V' represents the surface potential on the medium.

The medium accommodates the developer. Under the electric field, the developer particles transport the charges so that the developer layer apparently becomes similar to the conductive layer. Thus, the electrostatic capacitance C2 of the medium is approximately equal to the composite capacitance of the upper and lower (i.e., two) resin sheets.

For transferring the electrostatic latent image charges on the image carrier onto the medium, the insulation breakdown must occur in the air layer to move the electric charges. If the insulation breakdown do not occur, the apparatus returns to the state shown in FIG. 32(A) when the image carrier is spaced from the medium so that the latent image transfer is not performed.

For example, if V0 is small, the induced electrostatic field moves the particles, but the latent image is not transferred, For causing the insulation breakdown in the air layer formed of the gap, e.g., of 10 μm, V0 must be equal to or larger than about 370 V according to the Paschen's law.

When V is equal to 1000 V, V' is equal to −1000 V and the ratio C1:C2:C0 among the electrostatic capacitances is equal to 18:5:12, V) (potential difference of the air layer) is equal to 480 V, and the insulation breakdown occurs so that the latent image is transferred. The potential difference applied to the medium is about 200 V, and the insulation breakdown in the medium can be prevented. The above ratio among the electrostatic capacitances is determined based on the assumption the image carrier is an organic photosensitive member, the capacitance of the medium is the composite capacitance of the foregoing structure, and the air layer has a size of about 10 μm, which promotes the insulation breakdown.

In the electrostatic latent image on the image carrier, the charges move between the charged portion and the medium, and the charges do not move in the uncharged portion (exposed portion). Therefore, a difference in surface potential occurs on the medium. After the movement of charges in the charged portion, the surface potential on the medium is expressed by the following formula (8), and the surface potential on the medium for the uncharged portion is expressed by the foregoing formula (7).

Figure 32C:
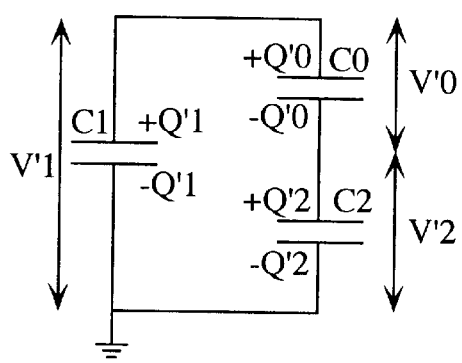
Figure 32D:
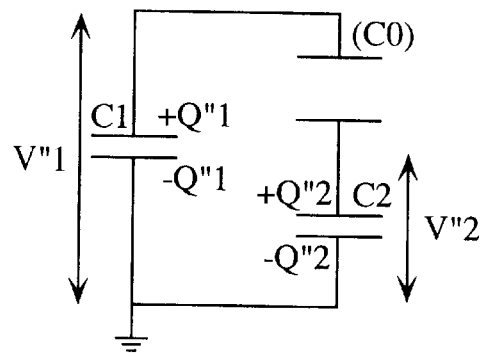
Figure 32E:
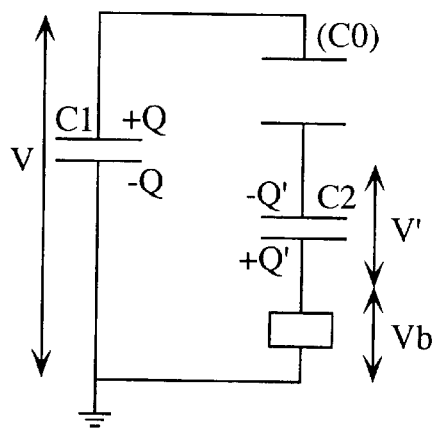

FIG. 32(C) shows the equivalent circuit in the state where the insulation breakdown causes the movement of charges. In the state where the insulation breakdown causes the movement of charges, the following formula (8) is established.

$$V'2 = \frac{C0 \cdot C1(V1 - v0) + C2 \cdot (C0 + C1) \cdot V2}{C0 \cdot C1 + C1 \cdot C2 + C2 \cdot C0} \qquad (8)$$

In the formula (8), V0 represents the minimum potential difference, which can cause the discharging. V1 and V2 are represented by the foregoing formulas (6) and (7), respectively.

For example, in the foregoing setting conditions, the surface potential of about +260 V is kept on the region of the medium corresponding to the charged portion, and about −340 V is kept on the region corresponding to the uncharged portion.

When the opposite electrode roller is grounded, the electric fields in mutually opposite directions are formed in the regions corresponding to the charged portion and uncharged portion, respectively, so that the developer particles move along the electric field to form the image.

When the image carrier and the medium are then spaced from each other, induced charges move, and the surface potential on the medium changes. The surface potentials with respect to the charged portion and uncharged portion return to about −720 V and about −1000 V, respectively, and the latent image can be formed on the medium (see FIG. 32(D)).

The foregoing description has been given on the case where the opposite electrode roller R1 is grounded. However, the roller may be supplied with an appropriate bias, in which case (V'+Vb') is substituted for V' in the foregoing description. FIG. 37(E) shows the equivalent circuit in this case.

Also, the foregoing description has been given on the case where the electrostatic latent image carrier is the photosensitive drum (photoconductive member). However, the dielectric drum may be used. The electrostatic latent image may be negative. The developer particles may have an opposite chargeable polarity.

As described above, the medium surface is uniformly charged to the predetermined potential before transferring the latent image by generating the insulation breakdown between the electrostatic latent image and the medium, and thereby the potential difference within the medium can be suppressed so that the image holding property can be improved.

Further different examples of the reversible image display medium will now be described with reference to FIGS. 33 and 34.

Figure 33:
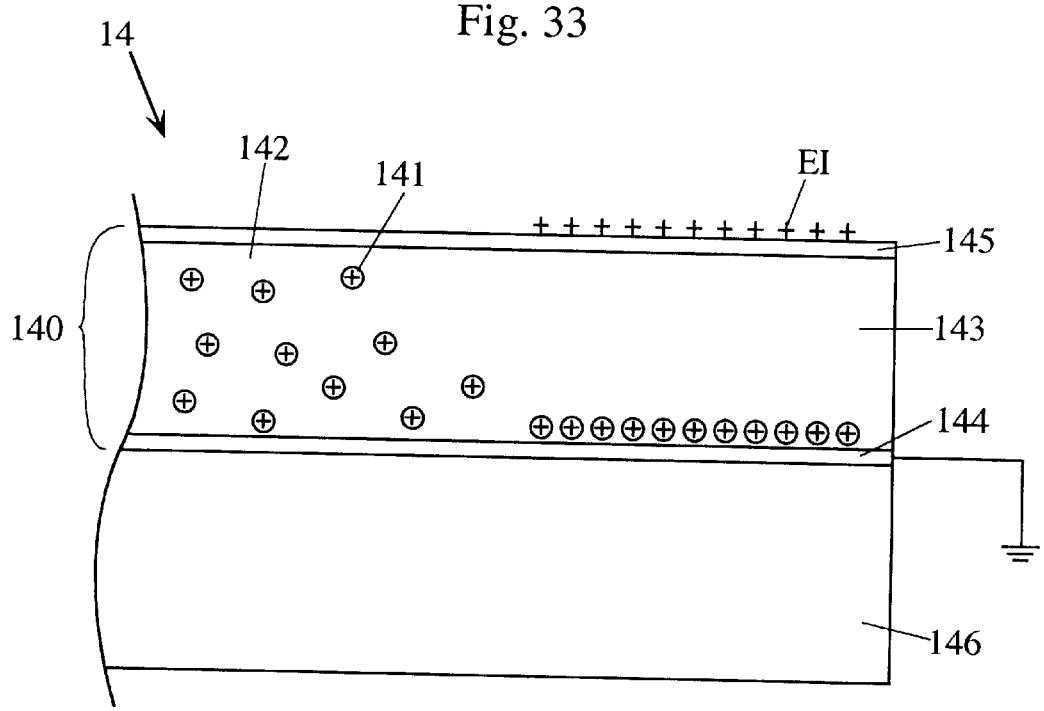
FIGS. 33 and 34 are cross sections showing further different examples of the reversible image display medium, respectively.

A reversible image display medium 14 shown in FIG. 33 is an example of a medium of an electrophoretic type.

The medium 14 includes an electric field coloring layer 140 carried on a transparent carrier substrate 146. The electric field coloring layer 140 is formed of a liquid layer 143, which includes charged and colored particles 141 dispersed in insulating liquid 142, and is sealingly held between a transparent conductive layer 144 and an insulating layer 145. The insulating liquid 142 is a mixture of high-purity petroleum (Esso Co., Ltd., trade name: Isoper) and an organic material, which contains an ionic surfactant and dyes. The ionic surfactant is adhered onto the organic colored particles 141 containing the pigment so that the particles are charged electrochemically stably and exhibit electrophoretic characteristics.

When an electric field is not applied to the medium 14, or an electric field opposite to the predetermined electric field is applied to the medium 14, the dyes in the insulating liquid 142 can be externally viewed. When the electrostatic latent image is written, the charged and colored particles 141 move toward the transparent and conductive layer 144 so that the pigment can be externally viewed.

For the image display using the medium 14, the image forming apparatus, e.g., shown in FIG. 30 or 31 can be used, and the surface of the medium 14 is uniformly charged to the predetermined potential prior to the image display. Further, the electrostatic latent image E1 is formed on the charged medium surface. Based on the electrostatic latent image, the predetermined electric field is formed for each pixel corresponding to the image to be displayed, and is applied to the charged developer particles (charged and colored particles) 141 dispersed in the insulating liquid 142 within the medium. Thereby, the image display is performed. By charging the surface of the medium 14 prior to the formation of the electrostatic latent image, and forming the electrostatic latent image on the charged region, the image holding property can be improved as compared with the image display using a conventional electrophoretic image display medium, on which an image is formed without preliminary charging.

Figure 34:
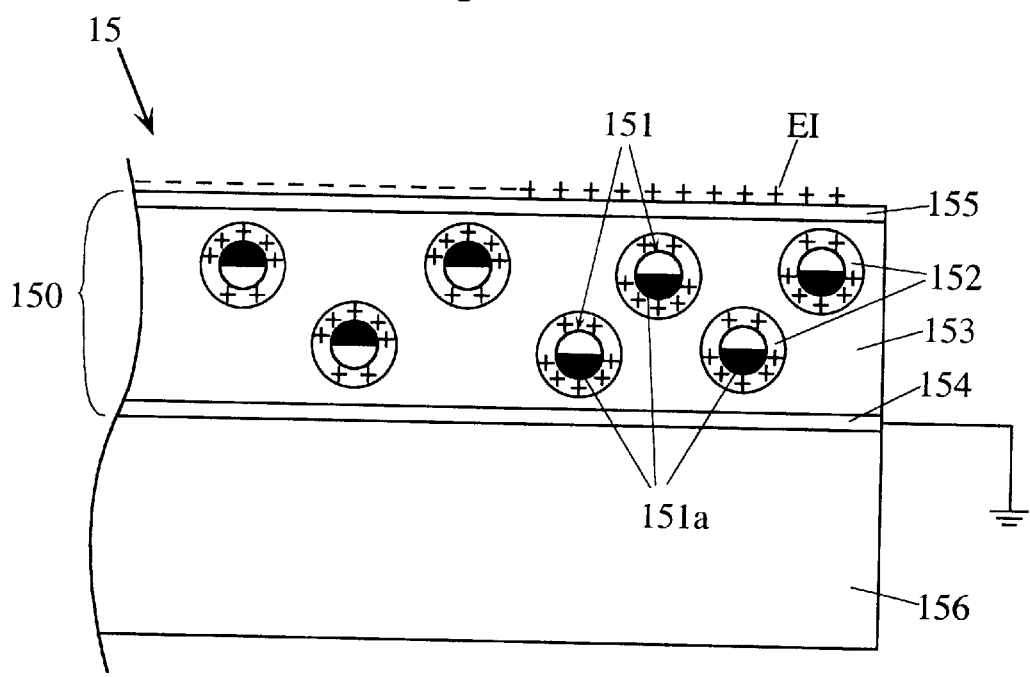

A reversible image display medium 15 shown in FIG. 34 is an example of a display medium of a rotary particle type.

The medium 15 has an electric field coloring layer 150 carried on a transparent carrier substrate 156. The electric field coloring layer 150 includes one-side colored balls 151 each having a colored portion 151a on one side. The balls 151 are surrounded by insulating liquid 152, and are buried together with the liquid 152 in an insulation holding medium material 153. A transparent conductive layer 154 and an insulating layer 155 are formed on the opposite sides of the medium material 153, respectively.

The one-side colored ball 151 is prepared, e.g., in such a manner that white balls of glass primarily made of $TiO_2$ are uniformly arranged on an appropriate table, and chrome or the like is vapor-deposited thereto. The ball 151 may have a size from 30 μm to 100 μm. If it is equal to or smaller than 10 μm, the resolution is further improved.

The one-side colored balls 151 are dispersed in the insulation holding medium material 153 such as elastomer, and the medium material 153 is swelled by immersing it in a solution prepared by dissolving an ionic surfactant in organic solvent such as toluene. Thereby, the insulating liquid 152 is kept around the one-side coloring ball 151. In this manner, the one-side colored ball 151 is surrounded by the insulating liquid layer 152, and is rotatably buried together with the liquid in the insulation holding medium material 153.

The one-side colored ball 151 have one and the other halves, which are different in properties, and therefore are different in amount of absorbable ions. By applying the electric field, the direction of the surface of the one-side colored particle 131 changes depending on the direction of the electric field. Accordingly, the image is displayed by selectively and externally exhibiting the colored or uncolored surface of the one-side colored ball 151.

For the image display using the medium 15, the image forming apparatus, e.g., shown in FIG. 30 or 31 is used, and the surface of the medium 15 is uniformly charged to the predetermined potential prior to the image display Further, the electrostatic latent image E1 is formed on the charged medium surface. Based on the electrostatic latent image, the predetermined electric field is formed for each pixel corresponding to the image to be displayed, and is applied to the one-side colored balls 151 floating in the insulating liquid 152 within the medium. Thereby, the image display is performed with good image holding property.

For the mediums 14 and 15, the image display and the image erasure can be repeated.

The image display on the mediums 14 and 15 may be performed by the image forming apparatuses already described, provided that the good image display can be performed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A reversible image display medium comprising:
   two sheets opposed to each other with a predetermined gap therebetween;
   one or more developer accommodating cells formed between said two sheets, and each having a periphery surrounded by a partition wall; and
   dry developer contained in each of said cell(s), wherein
   said dry developer contains at least two kinds of frictionally chargeable dry developer particles having different chargeable polarities and different optical reflection densities.

2. An image display method comprising the steps of:
   preparing said reversible image display medium according to claim 1 having at least two kinds of said dry developer particles forming said dry developer within said developer accommodating cell(s), and frictionally charged to have the charged polarities different from each other; and
   displaying an image by forming a predetermined electrostatic field for each pixel in accordance with the image to be displayed and thereby moving the developer particles, with the developer particles contained in each of the cell(s) being in the frictionally charged state.

3. A reversible image display medium comprising:
   two sheets opposed to each other with a predetermined gap therebetween;
   one or more developer accommodating cells formed between said two sheets, and each having a periphery surrounded by a partition wall;
   dry developer contained in each of said cell(s);
   an electrode formed on an inner surface of one of said sheets; and
   an electrode formed on an inner surface of the other sheet, and opposed to said electrode, wherein
   said dry developer contains at least two kinds of frictionally chargeable dry developer particles having different chargeable polarities and different optical reflection densities.

4. The reversible image display medium according to claim 3, wherein
   said electrode on the inner surface of one of said two sheets is formed of a group of independent electrodes for respective pixels.

5. An image display method comprising the steps of:
   preparing said reversible image display medium according to claim 3 having at least two kinds of said dry developer particles forming said dry developer within said developer accommodating cell(s), and frictionally charged to have the charged polarities different from each other; and
   displaying an image by forming a predetermined electrostatic field for each pixel in accordance with the image to be displayed by applying a voltage across said electrodes and thereby moving the developer particles, with the developer particles contained in each of the cell(s) being in the frictionally charged state.

6. A reversible image display medium comprising:
   two sheets opposed to each other with a predetermined gap therebetween;
   one or more developer accommodating cells formed between said two sheets, and each having a periphery surrounded by a partition wall; and
   dry developer contained in each of said cell(s), wherein
   said dry developer contains at least two kinds of frictionally chargeable dry developer particles having different chargeable polarities and different optical reflection densities,
   each of said sheets has a thickness from 5 μm to 100 μm,
   the gap between said sheets is in a range from 20 μm to 300 μm, and
   said medium has a whole thickness of 30 μm to 500 μm.

7. An image display method comprising the steps of:
   preparing said reversible image display medium according to claim 6 having at least two kinds of said dry developer particles forming said dry developer within said developer accommodating cell(s), and frictionally charged to have the charged polarities different from each other; and displaying an image by forming a predetermined electrostatic field for each pixel in accordance with the image to be displayed and thereby moving the developer particles, with the developer particles contained in each of the cell(s) being in the frictionally charged state.

8. A reversible image display medium comprising:

two sheets opposed to each other with a predetermined gap therebetween;

one or more developer accommodating cells formed between said two sheets, and each having a periphery surrounded by a partition wall; and dry developer contained in each of said cell(s), wherein said dry developer contains at least two kinds of frictionally chargeable dry developer particles having different chargeable polarities and different optical reflection densities, and at least one of said two sheets has a surface resistance of $10^{10}$ ohm/□–$10^{16}$ ohm/□ on its outer surface.

9. An image display method comprising the steps of:

preparing said reversible image display medium according to claim 8 having at least two kinds of said dry developer particles forming said dry developer within said developer accommodating cell(s), and frictionally charged to have the charged polarities different from each other; and displaying an image by forming a predetermined electrostatic field for each pixel in accordance with the image to be displayed and thereby moving the developer particles, with the developer particles contained in each of the cell(s) being in the frictionally charged state.

10. A reversible image display medium comprising:

two sheets opposed to each other with a predetermined gap therebetween;

one or more developer accommodating cells formed between said two sheets, and each having a periphery surrounded by a partition wall; and dry developer contained in each of said cell(s), wherein said dry developer contains at least two kinds of frictionally chargeable dry developer particles having different chargeable polarities and different optical reflection densities, and at least one of said two sheets has a surface resistance of $10^7$ ohm/□ or less on its outer surface.

11. An image display method comprising the steps of:

preparing said reversible image display medium according to claim 10 having at least two kinds of said dry developer particles forming said dry developer within said developer accommodating cell(s), and frictionally charged to have the charged polarities different from each other; and displaying an image by forming a predetermined electrostatic field for each pixel in accordance with the image to be displayed and thereby moving the developer particles, with the developer particles contained in each of the cell(s) being in the frictionally charged state.

12. A reversible image display medium comprising:

two sheets opposed to each other with a predetermined gap therebetween;

one or more developer accommodating cells formed between said two sheets, and each having a periphery surrounded by a partition wall; and dry developer contained in each of said cell(s), wherein said dry developer contains at least two kinds of frictionally chargeable dry developer particles having different chargeable polarities and different optical reflection densities, and at least one kind of the developer particles are electrically nonconductive particles.

13. The reversible image display medium according to claim 12, wherein said nonconductive developer particles have a volume average particle diameter of 1 μm to 50 μm.

14. The reversible image display medium according to claim 7, wherein one of said two sheets is provided at its inner surface with an electrode, and the other sheet is provided at its inner surface with an electrode opposed to said electrode.

15. A reversible image display medium comprising:

two sheets opposed to each other with a predetermined gap therebetween;

one or more developer accommodating cells formed between said two sheets, and each having a periphery surrounded by a partition wall; and dry developer contained in each of said cell(s), wherein said dry developer contains at least two kinds of frictionally chargeable dry developer particles having different chargeable polarities and different optical reflection densities, and at least one kind of the developer particles are magnetic particles.

16. The reversible image display medium according to claim 15, wherein said magnetic developer particles have a volume average particle diameter of 1 μm to 100 μm.

17. A reversible image display medium comprising:

two sheets opposed to each other with a predetermined gap therebetween;

one or more developer accommodating cells formed between said two sheets, and each having a periphery surrounded by a partition wall; and dry developer contained in each of said cell(s), wherein said dry developer contains at least two kinds of frictionally chargeable dry developer particles having different chargeable polarities and different optical reflection densities, and a rate Sn/So of an area Sn of a non-image portion with respect to a medium unit area So is in a range from 0.0001 to 0.5.

18. The reversible image display medium according to claim 17, wherein one of said two sheets is provided at its inner surface with an electrode, and the other sheet is provided at its inner surface with an electrode opposed to said electrode.

19. A reversible image display medium comprising:

two sheets opposed to each other with a predetermined gap therebetween;

one or more developer accommodating cells formed between said two sheets, and each having a periphery surrounded by a partition wall; and dry developer contained in each of said cell(s), wherein said dry developer contains at least two kinds of frictionally chargeable dry developer particles having different chargeable polarities and different optical reflection densities, and a value of (1−Sa/Sb) in a range from 0.0001 to 0.5 is obtained from arbitrary one of said developer accommodating cell(s) or arbitrary two or more successively arranged developer accommodating cells, assuming that Sa represents an area of an image display region provided by said one developer accommodating cell or said cell group including the plurality of successively arranged developer accommodating cells, and Sb represents an area surrounded by a center line of the partition wall defining an outer periphery of said one developer accommodating cell or an area surrounded by a center line of the partition wall defining an outer periphery of said cell group including the plurality of developer accommodating cells.

20. A reversible image display medium comprising:

two sheets opposed to each other with a predetermined gap therebetween;

one or more developer accommodating cells formed between said two sheets, and each having a periphery surrounded by a partition wall; and dry developer contained in each of said cell(s); and a developer movement suppressing member arranged between said two sheets for suppressing movement of said dry developer within said developer accommodating cell(s), wherein said dry developer contains at least two kinds of frictionally chargeable dry developer particles having different chargeable polarities and different optical reflection densities.

21. The reversible image display medium according to claim 20, wherein said partition wall defining said developer accommodating cell also serves as a spacer for maintaining the predetermined gap between said two sheets.

22. The reversible image display medium according to claim 20, wherein said developer movement suppressing member also serves as a spacer for maintaining the predetermined gap between said two sheets.

23. The reversible image display medium according to claim 20, wherein a rate Sn/So of an area Sn of the non-image portion in a medium unit area So is in a range from 0.0001 to 0.5.

24. The reversible image display medium according to claim 20, wherein a value of (1−Sa/Sb) in a range from 0.0001 to 0.5 is obtained from arbitrary one of said developer accommodating cell(s) or arbitrary two or more successively arranged developer accommodating cells, assuming that Sa represents an area of an image display region provided by said one developer accommodating cell or said cell group including the plurality of successively arranged developer accommodating cells, and Sb represents an area surrounded by a center line of the partition wall defining an outer periphery of said one developer accommodating cell or an area surrounded by a center line of the partition wall defining an outer periphery of said cell group including the plurality of developer accommodating cells.

* * * * *